(12) United States Patent
Rao et al.

(10) Patent No.: US 10,681,225 B1
(45) Date of Patent: Jun. 9, 2020

(54) IMAGE AND AUGMENTED REALITY BASED NETWORKS USING MOBILE DEVICES AND INTELLIGENT ELECTRONIC GLASSES

(71) Applicants: Sunil K Rao, Palo Alto, CA (US); Rekha K Rao, Palo Alto, CA (US); Rekha K Rao, Palo Alto, CA (US)

(72) Inventors: Sunil K Rao, Palo Alto, CA (US); Rekha K Rao, Palo Alto, CA (US); Raman K Rao, Palo Alto, CA (US)

( * ) Notice: Subject to any disclaimer, the term of this patent is extended or adjusted under 35 U.S.C. 154(b) by 0 days.

(21) Appl. No.: 15/949,002

(22) Filed: Apr. 9, 2018

Related U.S. Application Data

(63) Continuation of application No. 15/184,559, filed on Jun. 16, 2016, now Pat. No. 9,942,420, which is a continuation of application No. 14/579,497, filed on Dec. 22, 2014, now Pat. No. 9,380,177, which is a continuation of application No. 13/751,049, filed on Jan. 26, 2013, now Pat. No. 8,965,460.

(51) Int. Cl.
| | |
|---|---|
| *H04N 1/00* | (2006.01) |
| *G02B 27/01* | (2006.01) |
| *H04L 12/725* | (2013.01) |
| *G06K 9/62* | (2006.01) |
| *G06T 19/00* | (2011.01) |
| *H04W 40/02* | (2009.01) |
| *G06F 3/00* | (2006.01) |
| *H04N 21/414* | (2011.01) |
| *H04N 21/235* | (2011.01) |
| *H04N 7/14* | (2006.01) |

(52) U.S. Cl.
CPC ....... *H04N 1/00244* (2013.01); *G02B 27/017* (2013.01); *G06F 3/005* (2013.01); *G06K 9/6202* (2013.01); *G06T 19/006* (2013.01); *H04L 45/306* (2013.01); *H04N 1/00095* (2013.01); *H04N 1/00214* (2013.01); *H04N 1/00307* (2013.01); *H04N 7/14* (2013.01); *H04N 21/2353* (2013.01); *H04N 21/41407* (2013.01); *H04W 40/02* (2013.01); *G02B 2027/014* (2013.01); *G02B 2027/0138* (2013.01); *G02B 2027/0178* (2013.01); *G02B 2027/0187* (2013.01); *H04N 2007/145* (2013.01)

(58) Field of Classification Search
CPC ......... H04N 1/00244; H04N 21/41407; G02B 27/017; G02B 2027/0178; G06T 19/006
See application file for complete search history.

(56) References Cited

U.S. PATENT DOCUMENTS

| | | | |
|---|---|---|---|
| 2009/0058611 A1* | 3/2009 | Kawamura | H04N 7/185 340/10.1 |
| 2012/0038549 A1* | 2/2012 | Mandella | G06F 3/011 345/156 |
| 2013/0141576 A1* | 6/2013 | Lord | G08G 1/04 348/148 |

* cited by examiner

*Primary Examiner* — Ayodeji O Ayotunde

(57) ABSTRACT

A mobile communication system based on digital content including images and video that may be acquired, processed, and displayed using a plurality of mobile devices, smartphones, tablet computers, stationary computers, intelligent electronic glasses, and servers.

20 Claims, 33 Drawing Sheets

IMAGE AND AUGMENTED REALITY BASED NETWORKS USING MOBILE DEVICES AND INTELLIGENT ELECTRONIC GLASSES

CROSS REFERENCE TO RELATED APPLICATIONS

The present application is a continuation of co-pending parent U.S. patent application Ser. No. 15/184,559, filed on Jun. 16, 2016, which is a continuation of Ser. No. 14/579,497, filed on Dec. 22, 2014, now U.S. Pat. No. 9,380,177, which is a continuation of Ser. No. 13/751,049, filed Jan. 26, 2013, now U.S. Pat. No. 8,965,460; the present application claims priority and incorporates by reference in the entirety the afore mentioned patent applications.

BACKGROUND OF THE INVENTION

In the prior art the primary methods of communication are primarily voice based such as by means of a communication device such as the telephone, cellular telephone or other mobile devices augmented as needed by textual methods such as handwriting. In recent times the communication methods have expanded to include such digital and electronic methods as e-mail with the ability to receive files of voice, audio, video and data files as attachments and the means for recoding, playing and or viewing these files. In the prior art these files are discrete and separate and do not necessarily exist as one composite file thus limiting utility.

However, the primary means of communication in the prior art is not visual based whereas human beings by nature relate better to image based communication and visual stimuli. Hence, there is a need for a high quality visual web comprising of images and videos. There is a need for a plurality of mobile devices including smartphones and glasses to aid in acquisition and presentation of this information. The ability of human beings to recognize an image and respond to an image may be far superior to other cognitive senses and may be preferred by itself and or in combination with other methods such as voice. The communication systems of the prior art have a number of limitations making communication between individuals that have a physical limitation such as a hearing impairment or a language barrier difficult. Consequently, it is desirable to have a means for communicating primarily by means of images coupled as desired by the user with one or more other methods selected by the user, such as voice, audio, text and data and other methods as deemed appropriate for the desired application. In the prior art the means for interfacing with a mobile device such as cell phone has certain limitations for data entry being key stroke based, pen based for touch screens or voice based. There is a need for image based communication since the integration of image acquisition capabilities with a mobile device allow for the sending and receiving of images on a mobile device. However, the prior art just enables the viewing of the images and does not enable the image to be endowed with different types of related information thus rendering the images of the prior art to have limited utility and no functionality that could be associated with the image and or launched by touching an entire image or a subset of an image such as a photo.

Further the means of acquiring images in the prior art remain limited. There is a need for multimodal and multi-function mobile device including intelligent electronic glasses and discrete image acquisition sensors.

The present disclosure is intended to solve the problem enumerated above and other problems. The present disclosure teaches multifunction mobile devices including smartphones and glasses that allow for computing to be better integrated into every day activities. As an example, glasses worn on the face may allow continuous access to an electronic display. These glasses may further allow for continuous capture of images, video, and audio. These glasses may bridge the physical and virtual worlds and provide an augmented reality experience.

The present disclosure describes and teaches a novel method for constructing image network/augmented reality networks for efficient and intelligent communication between one or more mobile devices/intelligent electronic glasses/headset, stationary devices, servers and individuals using images as a medium of communication with related device profiles and user profiles. The present disclosure additionally teaches novel means for associating the image with one or more attributes and characteristics coupled with other forms of communication such as text, voice, data and other methods. The present disclosure in a novel manner leverages the ability to digitize all types of data inclusive of images, voice, text, data and other information enabling the establishment of relationships with the different types of the data components coupled with the ability to use the mobile device/intelligent electronic glasses/headset by itself and one or more servers in conjunction with the mobile device/intelligent electronic glasses/headset to deliver unique and novel utility not offered by the prior art.

The image network/augmented reality networks of the present disclosure are constructed enabling secure and trusted communication by means of encryption and other novel security features. Images by their very nature require the processing and storage of a large amount of digital data. Additionally, when an image is coupled with various types of other data such as text, voice, and digital data, the resulting combination requires significant real time processing and storage. The present disclosure teaches a novel method for enabling the real time processing and storage of images by means of the mobile device/intelligent electronic glasses/headset acting by itself and or in conjunction with other mobile devices/intelligent electronic glasses/headsets, and local, central and or network servers.

The present disclosure additionally teaches the system level means for associating the image of an animate or inanimate aspect with collateral information relating to the aspect acquired by one or more means inclusive of, image sensors, NFC and RFID tags also known as radio frequency identification tags to enable intelligent image network/augmented reality networks that are capable of being integrated into a larger digital network existing locally or on the Internet.

The present disclosure teaches the system for using the image that is displayed on a standard display or the image that is displayed on a touch sensitive display to be associated with various profiles relating to the image comprising of audio, voice, text, data, function and other information; further providing the means for actuation and control of functions and applications based on images and or subsets of the images being displayed.

SUMMARY OF THE INVENTION

This disclosure generally relates to a plurality of multi-modal and multifunction input and output mobile device including intelligent electronic glasses. It is an attribute of the present disclosure to enable mobile devices, advanced smartphones, cellular telephones, tablet computers, smart goggles, intelligent electronic glasses, cameras, smart projectors, smart watches, smart headgear, smart headphones, smart headsets, smart necklaces, smart earrings, and other accessories to provide digital media content acquisition, presentation, and interaction. These mobile device/intelligent electronic glasses/headset may allow for continuous and always-on acquisition of audio, image, video, location, and other content using a plurality of input methods including images sensors. Further, the mobile device/intelligent electronic glasses/headset may display content on a variety of displays and surfaces.

It is an aspect of the present disclosure to enable image based communication between mobile device/intelligent electronic glasses/headset, distributed image sensors, stationary devices, and servers by wired or wireless communication means.

The mobile device/intelligent electronic glasses/headset may enable device or server control including gesture control, retinal control, facial control, and other user interface activities for a variety of electronic devices. In this system, image sensors may be integrated into various mobile devices. Image sensors may also be coupled to a variety of traditional non-electronic devices. As an example, a camera may be integrated into a pair of sunglasses and a display may be affixed to the lens or area proximate to the lens of the glasses. Communication between the mobile devices/intelligent electronic glasses/headset and other devices including Internet or network servers may be completed using wireless transmit and receive radios integrated into the devices.

It is an embodiment in the system to have intelligent electronic glasses or headsets configured to be worn on the body. These intelligent electronic glasses or headsets may be enabled with the full or partial functions previously resident on a smartphone or stationary electronic device. The intelligent electronic glasses may leverage the processing capability of a smartphone or a local or network server and continuously acquire, transmit, and receive digital content.

The intelligent electronic glasses or headset may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, ethernet, USB, firewire, 1394, VGA, or HDMI; wireless transmit and receive units such as Bluetooth, WiFi (802.11a,b,c,n,x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; lens; fingerprint resistant lens; replaceable lens; see thru lens; filters; audio and video playback; and various other components. Components may be integrated into ASICs, integrated housing, separated components, or swappable components.

The mobile device may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, Ethernet, USB, firewire, 1394, VGA, or HDMI; wireless transmit and receive units such as Bluetooth, WiFi (802.11x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; lens; fingerprint resistant lens; replaceable lens; see thru lens; filters; audio and video playback; and various other components. Components may be housed in various integrated ASICs, integrated housing; separated components, or swappable components.

A watch may comprise a full set or subset of these components including: processor; multicore processor; graphics processor; display; high definition display; LCD, LED, see thru LED, see thru mirror display, see thru LCD/LED mirror display or other displays; dual displays for each eye; keyboard; projected keyboard; on screen keyboard; programmable buttons; microphone; noise isolation or noise cancellation; speakerphone; in-ear speaker; digital still camera; digital video camera; front facing camera; back facing camera; side facing camera; eye tracking camera; high definition (HD, 720p, 1020p) camera; light/flash; laser; projector; infrared or proximity sensor; vibration device; LEDs; light sensor; accelerometer; gyroscope; x-y-z positioning; GPS; compass including solid state compass; memory such as flash memory; buffer memory; power sources; battery; rechargeable battery; multiple data and video input and output ports such as audio, ethernet, USB, firewire, 1394, VGA, or HDMI; wireless transmit and receive units such as Bluetooth, WiFi (802.11x), Cellular (GSM, Edge, CDMA, others); transmission protocol software such as TCP/IP; one or more antennas including antennas fitted into the frame of the glasses; operating system; software such as image recognition software; access to an software application store; smartphone/tablet, server, cloud, or desktop synchronization software; audio, pictures, and video streaming software; Internet configuration; UI command and control such as gesture control, retinal control, face and expression control; audio and video playback; and various other components. Components may be housed in various integrated ASICs, integrated housing; separated components, or swappable components. The watch may function as a second screen or "n-th" screen device for another display such as a smartphone or television.

The cellular telephone, glasses, watch, and other electronic devices may communicate with each other and with local or network servers.

The glasses can be used to take a single picture, a series of pictures, or full motion video through the use of a camera that is mounted on the housing of the glasses frame or integrated into the lens. In the integrated camera model, the camera electronics may be integrated into the frame of the glasses and the lens of the glasses is used as the lens for the camera. Image and video data can be wirelessly uploaded to a remote server or alternatively stored locally on the glasses.

In another aspect of the invention, the glasses may project text on to a physical object.

In another aspect, the intelligent electronic glasses may record an individual touching of an object and classify the object in a data and the object is connected to various meta-data including location, time of day, temperature, proximity to people and other factors.

In another aspect, the intelligent electronic glasses may present in a first lens an advertising or product purchase placement that is viewed in the second lens.

In another aspect, one lens of the intelligent electronic glasses may display all of the prior history associated with an object, such as how many times that object was touched, whether the product is under warranty or not, what the current price of the product is on a used market, what the price of the product.

In another aspect, the user can access an inventory database consisting of all objects in the room or loaned out to a third party. This information may be displayed on the mobile device including intelligent electronic glasses or watch.

In another aspect, a user can trace whether an object is broken based upon how many times an object was used by that member. As an example, an older child may blame this on the younger child if he is accused of breaking something. A camera may record usage of a device, store the history of this usage, analyze the usage, and present recommended view periods of the potential breaking incident.

In another aspect, one lens can browse the internet and the other lens of the glass can present image, video, or text.

In another aspect, the glasses can change from one tint to another to decrease exposure to the eye.

In another aspect, the glasses have a wireless transmit and receive radio built-into the device for continuous and real-time streaming to a local or network server.

In another aspect, the wire frame may be configured as one or more antennas for one or more wireless radios.

In another aspect, the glasses record conversations and auto playback for repeating conversations and agreements of conversations. This may be useful for auditing of contracts, agreements, or events. Alternatively, it may be useful in recording a person's life events.

In another aspect, dual cameras may be used simultaneously. For example, one camera may take a picture and the other camera may acquire video while a microphone captures audio. Alternatively, multiple cameras may be used simultaneously to provide a 360 degree experience. Alternatively, one camera may be a 3D camera.

In another aspect, the camera may work in conjunction with the specific displays on the mobile device, glasses, or watch. For example, a user may select to activate a rear camera so that it is displayed in the left or right lens.

In another aspect, the camera can provide magnification of content by allowing for a zoom function. This may be useful in experiments and thereby obviate the need for a microscope. It may be useful in the driving context to identify road hazards. It may be useful outside to identify stars, clouds, and other items.

In another aspect, the zoom function is done through interpolation thereby providing optical and digital zoom capabilities.

In another aspect, glasses include a micro-projector so that they can display content on to a hand, wall, pavement.

In another aspect, the projected content may be obtained in real time from another set of glasses, video, internet site, or stored media on a server.

In another aspect, a first camera on the glasses captures movement and the second glasses captures movement so as to provide a touch like interface without a surface.

Alternatively, a sensor may send a light pulse to gauge the distance between the hand and the projected image so as to identify where contact was made on the projected image.

Alternatively, a sound may sound may be used to detect distance from the hand to the glasses or may be used to track the send and receive of the signal.

Alternatively, a laser may be used to track and identify gestures.

Alternatively, the glasses may leverage the processing power resident on a second device including a cellular phone, watch or other mobile device.

In another aspect, content acquired from the glasses may be displayed on a TV, watch, or mobile phone.

In another aspect, the glasses may include a flash for pictures or a light and may be integrated into the device or be an attachment.

In another aspect, the resolution of the images may be modified using various lenses varying distance between the eye and the lens or other approaches.

Alternatively, a mobile device may be used and may display on the screen images acquired from a separate camera such as those on a pair of glasses where the images are annotated with content acquired from an internet server or local object. In turn each object may broadcast using RFID or other means information about itself to glasses, phones, server, or other devices. This RFID may be a label and can affix it to other devices.

Alternatively, the label may be a bar code or other image. This label may be a physical or virtual label and may include a barcode or other identifier. A table stored on a server or other device may map the label to data about the object. An owner, gifter, seller, or other person or system may create a data table including object location and other meta data, including purchase data, purchase price, ownership, useful life, willingness to sell object at an offer price. The data set may also pull in real time data including current price used on various exchanges. These objects may be automatically placed on an internet auction for immediate sale. A user may set an aspiration price including for family heirlooms. This obviates the need for the owner to manually post these items on an online exchange.

A user may then use their interface component such as glasses or mobile phone to assess the value of all objects within a home or environment.

The camera mounted on the glasses, smartphone, vacuum cleaner, or other robot may automatically scan home environment. For example, a robotic vacuum cleaner of a hotel may constantly scan a room to determine whether any objects are missing. This map of objects and paths may also be posted to an Internet server or database.

In another embodiment, a user may move an virtual object in a display and have the object move in the physical world by a robot. For example, a chef may move virtual images of objects such as a tomato and a robot may move the tomato in the physical world. This may enable remote cooking for elderly people or friends.

In another embodiment, it may be that one eye or multiple eyes may be impaired. The display may alter resolution, magnification, and other factors by lens to compensate for physical deficiencies.

In another aspect, the mobile device/intelligent electronic glasses/headset/watch may be able to convert spoken audio to text in real time and post the information on one or more displays. As an example, a conversation may appear in the left lens of the glasses as a person is speaking. In the right lens, a set of conversation topics or Internet search terms related to the spoken content may appear.

In another aspect, distance may be measured by modifying one lens and another lens to focus on different focal areas.

In another aspect, a camera at the top of the glasses may zoom in on a hands and a projector may display an image of a keyboard so as to allow typing on the air. A laser may be used to track the gestures. Alternatively an inward facing camera may be used to track eye movement to understand the focus areas of the individual and map these focus areas to the gestures or control activities.

In another aspect, eye-tracking may be enabled on a camera focused on an individuals eyes. This camera may be integrated into the intelligent electronic glasses. Alternatively, it may be a second camera on a mobile phone. This may be used to measure advertising effectiveness such as when an individual watches television or when an individual walks down a street and sees billboards.

Alternatively, eye tracking may be used for fatigued drivers and they may measure pupil dilation, eye strain redness and other factors to assess exhaustion and the potential of falling asleep at the wheel. Alternatively, the glasses may measure physiological problems for medical diagnosis such as glaucoma and cataracts.

In another aspect, the glasses may be used for gaming including scavenger hunts or other activities.

In yet another aspect, the mobile device/intelligent electronic glasss/headset may be used to control actions in a different area. As an example, a person may be at the office and wish to control appliances at home. The display may show the inside of the person's house and allow the individual to make gestures such as turn off and on lights in the virtual reality view. These actions and commands may be recorded by mobile device/intelligent electronic glasss/headset, sent to a server, and in turn sent to a home server or the home device to implement the action. This may allow full home automation and control using the mobile devices/intelligent electronic glasses/headset from remote locations.

The glasses may be part of a network and allow a first individual to take control of another person's glasses. Glasses may be identified by IP address or another unique numeric or alphanumeric ID. In this instance, a user or system may login to the glasses device, update configurations and software, and change the camera acquisition activities and display. As an example, an individual wearing glasses that enters a retail store, may not find a retail store employee to help with a purchase. The store may allow for virtual retail assistants or avatars that can be activated on the display of the glasses or external display. This may allow for automated sales without the need for people. Other payment mechanisms including RFID, NFC, and cloud based storage of credit card information may be used to allow for immediate purchases of products.

In yet another embodiment, digital content may be recorded, streamed, or viewed on a time lapsed basis.

In yet another embodiment, objects and items may be automatically tagged with location, context, purchase, and other related data. For example this may aid a person in identifying where the person left their keys. Information about the last known locatin of the keys may be automatically recorded by the camera or tagged by the device. This content may be indexed and searched. Alternatively, it may allow a person to run a search query such as identifying all the items in house that were touched.

In yet another embodiment, various statistical, behavioral, and predictive models may be built based on the large or big data obtained from the input devices. As an example, a prediction function may suggest to a concerned family member the likely activities of a relative. Alternatively, a prediction may be made by a server on which types of people tend to look at certain objects and which types tend to ignore certain objects. This could be helpful for a real-estate ad-network.

In yet another object, the mobile device/intelligent electronic glasses/headsets and distributed camera arrays may be used as a security system. Multiple people may opt their devices into a centralized sharing server that may be searched and used for various predictions. This may be helpful in identifying erratic behavior.

In yet another embodiment, various micro-expressions and emotions may be detected by the facial expressions of a person.

In yet another embodiment, a camera may perform lip reading to understand spoken words when audio is not available. This may enable a person wearing intelligent electronic glasses to read the lips of a person far across a room.

Example: Variants of Glasses

In yet another embodiment, the glasses may be manufactured with various versions that account for design, cost, weight, brand, and other factors. One variant of the glasses may include a full helmet or goggles which provide a housing to encompass additional processors, memory, wireless radios, antennas, cameras, GPS, multiple displays, microphone, speakerphone, and battery. Another version off the glasses may only require a low-power processor, battery, memory, camera, Bluetooth, and WiFi radio without a display. Yet another version may be sold with a display. Other versions may be sold with various protocols.

In another embodiment, multiple displays may be provided targeted at both the left and the right eye.

In yet another embodiment, the lens may be split into a multiple areas, where one area may comprise an display, such as an LCD display, and a second area may be clear to provide traditional viewing. In one instance this may be a bifocal lens where one area of the lens is an electronic display and another area of the lens is a traditional non-electronic lens.

In another embodiment, the device may include an over the ear clip, microphone, in-ear speaker, battery, and display configured to wrap around the forehead and positioned in front of the left or right eye. This item may include a rotatable hinge located above the over the ear component to allow for the display in front of the eye to be moved up or down. It is anticipated that the electronics including sensors and memory will continue to improve in efficiency and capabilities so as to increase the features offered in a smaller lighter package.

In yet another aspect, the functions of the glasses may also integrated into earrings, headsets and necklaces. These devices may be configured with one or more antennas, one or more wireless or wired transmit and receive radios, one or more processors, one or more buttons, one or more cameras, one or more lasers, one or more microphones, one or more speakerphones, one or more touch or non-touch screen displays, a miniaturized projector, battery, and power input and output.

In another variation of the glasses, the glasses may be configured with multiple cameras including a front facing camera and a back-facing camera.

In another variation of the system is for the glasses to be configured with replaceable frames and lenses. It is another variation for the lenses to be configured with varying levels of polarization. The polarized may enable the frames to reduce glare. These polarized lenses may have a variety of filters associated with them. The filters may be integrated into the lens. Alternatively, the frames may be equipped with several lenses that may be attached to the device simultaneously. A lens may be moved from an active position and rotated 90 degrees up to an inactive position. Alternatively, a lens may be configured with multiple filters.

In yet another embodiment, a contact lens may be configured into an electronic contact lens enabled with a display, transmit and receive component, antenna, and micro battery. The battery may be charged or the lens transmission may be powered by natural fluid movement in the eye or by blinking the eye.

In another variation of the glasses, the polarization may be modified by physical replacement of the lens. The glasses may provide an easy pop-in and pop out of the lenses. Alternatively the frame may also be easily replaceable, where the side frames of the glasses may be affixed to the center frame of the glasses using screws or clips.

In another variation of the glasses, the polarization may be modified by a physical dial on the glasses. Alternatively, the polarization may be modified automatically using a light sensor integrated into the glasses, a CT/MD, a watch, or other proximate or remote device.

In another variation of the glasses, the polarization may be modified by a cellular telephone or mobile device. An application configured to run on the cellular telephone or mobile device may present various settings to the control the glasses. The application may provide various configuration settings for a user to manage their glasses. As an example, the application may provide a calibration setting where the CT/MD, glasses, watch, or other device captures the ambient light including wavelengths, and appropriate determines a filter to apply to the glasses.

In yet another embodiment of the lenses, the may be configured with anti-reflective lens or progressive lens and other glare reduction means.

In yet another embodiment, the lens may be include prescription lens or sunglass lens.

In yet another embodiment, the lens may be configured with a wide field of view.

In yet another embodiment, reflected light may be removed when displayed.

Example: Glasses for Physical Activities and Sports

It is another aspect, the system may allow for a user to be able to define the activity that is currently being performed and match the filter on the glasses to the activity. As an example, an individual that is playing tennis may desire for the filter to provide more clarity on a yellow tennis ball and the white markings on the court.

In yet another variation the mobile device/intelligent electronic glasses/headset may be enabled with training specific software. A laser configured on the housing of the glasses, headband, necklace or other external device may be used to assess the speed of objects or people. A laser on the glasses may target a tennis ball. A camera may image the tennis ball. A specialized miniaturized radio transmitter and receiver such as a radar gun including various radar forms could be used to determine the speed of the ball by transmitting a signal focused on the object, measuring the return signal, and calculating the frequency of the signal. The data captured associated with the device may be processed in real time by a local device or a remote server to predict the movement of the object. The predicted position of the object may be used to allow an individual more time to react to the object. For example, the tennis ball may be shown in glasses in a virtual representation as being closer to the individual than in the physical world so that a user may react more quickly to the ball if the user is shown to be responding slow to the tennis balls. Alternatively, the perception may be a calibration setting that can be configured on the glasses, a CT/MD, or a server. The speed of the ball may be displayed on the glasses, a CT/MD, posted to an Internet web page, or stored on a server.

In yet another embodiment, the mobile device/intelligent electronic glasses/headset may also be used in other sports such as golf In this embodiment, a camera may image the golf ball, stroke, and distance of the ball from the tee.

Alternatively, the mobile device/intelligent electronic glasses/headset may be used in a football context where the ball may be measured for the appropriate spin, speed, and distance. In yet another embodiment, a biker may use the mobile device/intelligent electronic glasses/headset while biking on city streets or through nature. In this embodiment, the glasses may identify cars around the biker. The mobile device/intelligent electronic glasses/headset may further provide a speedometer, acceleration, and various other statistics about the movement of the individual.

Example: Transportation and Glasses in Moving Vehicles

In yet another variation, the intelligent electronic glasses may be used in a car. The glasses may image the cars in front, on the side and/or behind the vehicle that an individual is presently in. The glasses may send the data to the CT/MD for further processing, a watch, wireless processor enabled necklace, server located in the car, or a remote server. The glasses may acquire the images of the vehicles in close proximity to the current vehicle, measure the speed of the neighboring vehicles, and track the trajectory of the vehicle. If a vehicle is moving closer than predicted by the system to the present user, the glasses may present a warning indicator on the screen of the classes; a spoken audio through the speakerphone of the CT/MD or car; a vibration of the phone or the glasses. A camera may further be integrated a car vehicle on the top and/or sides of the car. These images may further be sent to the displays in the car, on the mobile device, or the intelligent electronic glasses/headset.

The glasses when used by a driver may also be a tool to give feedback on the driving experience, potential for road hazards or incorrect driver behavior. The glasses may image the road ahead of the vehicle. The images may highlight potholes, sharp turns, obstructions in the roadway, animals, and other objects. The glasses may send the images acquired using the camera to the CT/MD or server for further processing or the glasses may optionally be configured with a higher end processor to perform some level of processing. The CT/MD may assess the danger of the object such as a pothole and suggest a corrective action to the driver. The corrective action may be a synthesized spoken audio command indicating the action to take or it may be a visual message that appears on the lens of the glasses or projected from the glasses onto the windshield of the car.

In yet another embodiment, the mobile device/intelligent electronic glasses/headset may be enabled with thermal imaging capabilities or with radiation scanner which identifies radiation such as terahertz radiation. This may be used by TSA personnel to scan a person in an airport or by local police to scan individuals in a crowd for illicit objects.

Example: Electronic Earrings, Necklace, and Shoes

In another embodiment, a variety of other items including earrings, necklaces, and shoes may be enabled with electronic components to provide I/O and control. Alternatively, a camera and microphone may be clipped onto a shirt or object to capture images and video.

In another variation, a see thru LED, LCD, or other type of mirror may function as a display.

Example: Location Positioning Using Networks and Cameras

In yet another variation, a camera network may continuously capture data about people, objects, and environmental factors. As an example, a location of an individual may be obtained by a reading from image and facial recognition of an picture obtained from a camera.

In yet another variation, the song and music information may be shown in the display. A song played in a coffee shop may be recognized and the meta information about the song may be shown in the display of the glasses or mobile device.

In yet another embodiment, the mobile device/intelligent electronic glasses/headsets may be used in academic or science environment. This may allow a student to use the camera as a microscope or telescope.

In yet another embodiment, the mobile device/intelligent electronic glasses/headsets may allow for complete video acquisition of an event and then subsequent replay of that event. For example, a person with the camera may record a full 360 immersive show and then allow the show to be replayed on another display in real time or time shifted. As an example, a music concert may be recorded using the mobile device/intelligent electronic glasses and then replayed later. Alternatively, meta data about the songs and the concert may be added in real time. Content may be magnified or zoomed in.

In yet another embodiment, a person wearing the mobile device/intelligent electronic glasses/headset may have a room automatically imaged. In this situation, the people may be recognized either by the spoke audio using voice recognition or facial recognition. A list of all the people and social data about the people may displayed on a screen or the lens of the glasses. The system may further suggest conversation topics for each person in the room.

In yet another embodiment, a person's activities may be automatically posted to a public or private web pages, social network, data storage server, or synchronized across devices.

In yet another embodiment, the mobile device/intelligent electronic glasses/headset may be used to scan and ISBN, QR, barcode, or recognize an image of a product based on the design or label and provide reviews, ratings, comparison shopping data, or other information about the recognized product.

In yet another embodiment, an advertiser may be able to bid on all the advertisements associated with a specific person's view in the intelligent electronic glasses.

In yet another embodiment, a person wearing the glasses may patch in avatars, images, and objects into the environment. As an example, absent family member may be patched in for dinner. The person may be connected to an audio of that individual or pre-recorded messages from the individual. These pre-recorded messages may have been obtained from a database or recorded audio.

In a related embodiment, a camera may scan a person's iris for retinal data and perform a match between the retinal scan and a stored image in a server. The match can identify the location of a user as being proximate to the image sensor that acquired the iris shot. Alternatively, an image or video or related content may be projected on to the retina or displayed in very close proximity to the retina.

It is an aspect of the present disclosure to enable the construction and implementation of virtual image based networks.

It is an aspect of the present disclosure to enable images to be associated inherently or by specific selection with one or more other methods of communication such as text, voice, audio, data and other forms.

It is an aspect of the present disclosure to enable image network/augmented reality network s to be composed of a series of images to form a video with the explicit intention that the definition and the use of the term image network/augmented reality network s is inclusive of various types of photos, graphics, still images and video rendered one at a time or sequentially and continuously.

It is an aspect of the present disclosure to define the acquisition means of the image to include by means of light in various wave lengths, inclusive of methods such as night vision spectra, night vision goggles, and other electro magnetic means.

It is an aspect of the present disclosure to enable the image by itself to be processed as digital data and combined selectively or inherently with other forms of digital data such as text, voice, audio, data and other forms to form one composite resultant entity for the desired utility in an image network/augmented reality network.

It is an aspect of the present disclosure to encode, decode, compress, de compress the digitized image data by itself with various methods for encryption, decryption, compression and decompression that are best suited for each type of images or subset of an image to enable secure and efficient communication.

It is an aspect of the present disclosure to encode and decode the digitized text, voice, audio and other data by themselves and or in combination with various methods for encryption, decryption, compression and decompression that are best suited for each form and type of data to enable secure and efficient communication.

It is an aspect of the present disclosure to enable a unique encryption and compression key to be associated with the image and the other data associated with the specific image, sub set of the image or the specific image network/augmented reality network that the image is part of by means of the mobile device/intelligent electronic glasses/headset acting by itself and or in conjunction with the central server acting as a trusted escrow server.

It is an aspect of the present disclosure to enable a unique decryption and decompression key to be associated with the image and the other data associated with the specific image, sub set of the image or the specific image network/augmented reality network that the image is part of by means of the mobile device/intelligent electronic glasses/headset acting by itself and or in conjunction with the central server acting as a trusted escrow server.

It is an aspect of the present disclosure to enable a unique encryption, decryption, compression and decompression keys to be associated with the image and the other data associated with the specific image, sub set of the image or the specific image network/augmented reality network that the image is part of by means of one or more mobile device/intelligent electronic glasses/headsets directly exchanging the keys for a specific image based communication with said keys being enabled for a specific purpose, at a specific time or for a specific duration.

Yet another aspect of the present disclosure teaches the system level means for associating the image of an animate or inanimate object with collateral information relating to the object acquired by one or more wired or wireless means inclusive of, image sensors and RF ID tags also known as radio frequency identification tags to enable intelligent image network/augmented reality networks that are capable of being integrated into a larger digital network existing locally or on the Internet.

Another aspect of the disclosure is to enable an image to be dynamically constructed and or deconstructed as a virtual digital image entity by software means of the image itself and or in association with other related parameters such as voice, text, data and other related information.

Another aspect of the disclosure is to enable a digital image entity to be dynamically constructed and deconstructed such that the digital image entity comes into existence at a specified time, exists for a desired duration of time, and ceases to exist at a set time, with the additional features of being launched for a specific purpose.

Another aspect of the disclosure is to enable a digital image entity to be dynamically constructed and deconstructed such that the digital image entity is transformed by one or more algorithms to another digital image entity based on factors such as the security levels, the physical networks being traversed, the specific mobile device/intelligent electronic glasses/headset being used and the individuals using the specific mobile device/intelligent electronic glasses/headset.

Another aspect of the disclosure is to enable a digital image entity to be characterized by form and function wherein the image entity conveys descriptive attributes and or executable functions resulting in the desired actions being actuated, wherein such actions specifically relate to the entire image entity and or sub image entities comprising of the entire image entity.

Another aspect of the disclosure is to enable a digital image entity to be characterized by form and function wherein the image entity consists of executable functions which may be actuated by pen based touch, finger based touch, voice, audio, sound, speech, light or other pointer means actuation methods by wired or wireless communication means to deliver the desired output such as audio, video and text, voice and speech in one or more languages.

Another aspect of the disclosure is to enable a digital image entity or an entire image network/augmented reality network to be propagated across a network of mobile device/intelligent electronic glasses/headsets, stationary devices and servers to one or more selected mobile device/intelligent electronic glasses/headsets at the desired time and in the desired sequence, wherein such propagation of the image entity or the image network/augmented reality network causes the image network/augmented reality network existing on the mobile device/intelligent electronic glasses/headset prior to the propagation to be updated instantaneously or at the desired time.

Another aspect of the disclosure is to enable a digital image entity or an entire image network/augmented reality network to be propagated across a network of users based on the profiles of the user, at the desired time and in the desired sequence to cause one or more social networks, professional networks, personal networks, family networks, or other networks of the user to be updated.

Another aspect of the disclosure is to enable a digital image entity, a subset of an image entity or an entire network of images to be propagated across a network of intelligent devices and display devices such a computer, TV, monitor or other devices based on the profiles of the mobile device/intelligent electronic glasses/headsets and or the user, at the desired time and in the desired sequence for the desired utility.

Another aspect is to enable a display for a TV or monitor or a display for mobile device/intelligent electronic glasses/headset to be configured for high definition quality by enabling images to be viewed as image entities and for the entire screen or portion of the screen to be modified and or controlled in a granular manner.

Another embodiment is to enable the screen image as an image network/augmented reality network that is as a network or image entities for the provision of better quality multimedia experience.

Another embodiment is to enable control, actuation of functions by touching a specific portions of the screen or subsets of the screen or touching a surface or creating gestures in the air to launch one or more applications and or control functions and or actuation functions related to other intelligent devices. It is an aspect of this disclosure, that various electronic and mobile devices including smartphones, cellular telephones, tablet computers, watches, necklaces, earrings, shoes, headsets, headbands and other devices may be enabled with one ore more components such as cameras and displays to allow for input, output, processing, and transmit and receive. Further, the devices may communicate with one another and state their capabilities including connection speed and processing power.

Other aspects, features and advantages of the present disclosure will become apparent from the following detailed description when taken in conjunction with the accompanying drawings.

BRIEF DESCRIPTION OF THE SEVERAL
VIEWS OF THE DRAWING

The accompanying drawings, being incorporated in and forming a part of this specification, illustrate embodiments of the disclosure and, together with the description, serve to explain the principles of the present disclosure:

FIG. 1 shows a mobile device/intelligent electronic glasses/headset comprising of a plurality of device profiles and user profiles with the capability to acquire images and related information, capability to recognize the images and compare the images, and the capability to send, receive, process and store by wired or wireless communication means. The image further being described as a virtual image entity by software means wherein the image entity comprises of an image profile that associates the image with collateral information such as audio, voice, text, speech, location, time data, handwriting, encryption/decryption, compression/decompression, description, behavior, function and relationships to other images/objects to form an image profile.

FIG. 2 shows a network of image entities that are virtually connected to each other by software means. Each of the images entities are described as having a relationship to the other enabling an intelligent image network/augmented reality network to be constructed.

FIG. 3 shows an enlarged image network/augmented reality network comprising of one or more image entities connected together defined by a virtual relationship. Each image entity each further comprises of one or more sub image entities that are connected to a specific image entity by their own sub relationships. This figure shows a hierarchical relationship of an image entity to sub image entities, showing an image network/augmented reality network within an image network/augmented reality network.

FIG. 4 shows an even more extended and enlarged image network/augmented reality network forming a super image network/augmented reality network, comprising of one or more super image entities being connected together defined by a virtual relationship between the super images. Each super image entity further comprises of one or more image entities that form an image network/augmented reality network wherein each image network/augmented reality network comprises of sub image entities forming a sub image network/augmented reality network.

FIG. 5 shows a mobile phone device/intelligent electronic glasses/headset configured with image acquisition capabilities such as by means of a built in or external camera, means for wired or wireless communication by transmit/receive functions, means for display, said display being touch screen or non touch screen enabled. The mobile device/intelligent electronic glasses/headset is part of a physical network formed by an image switch/router, servers, intelligent devices and sensors having the ability to communicate with a people network, a device network, an object network, and an image network/augmented reality network.

Figure 12:
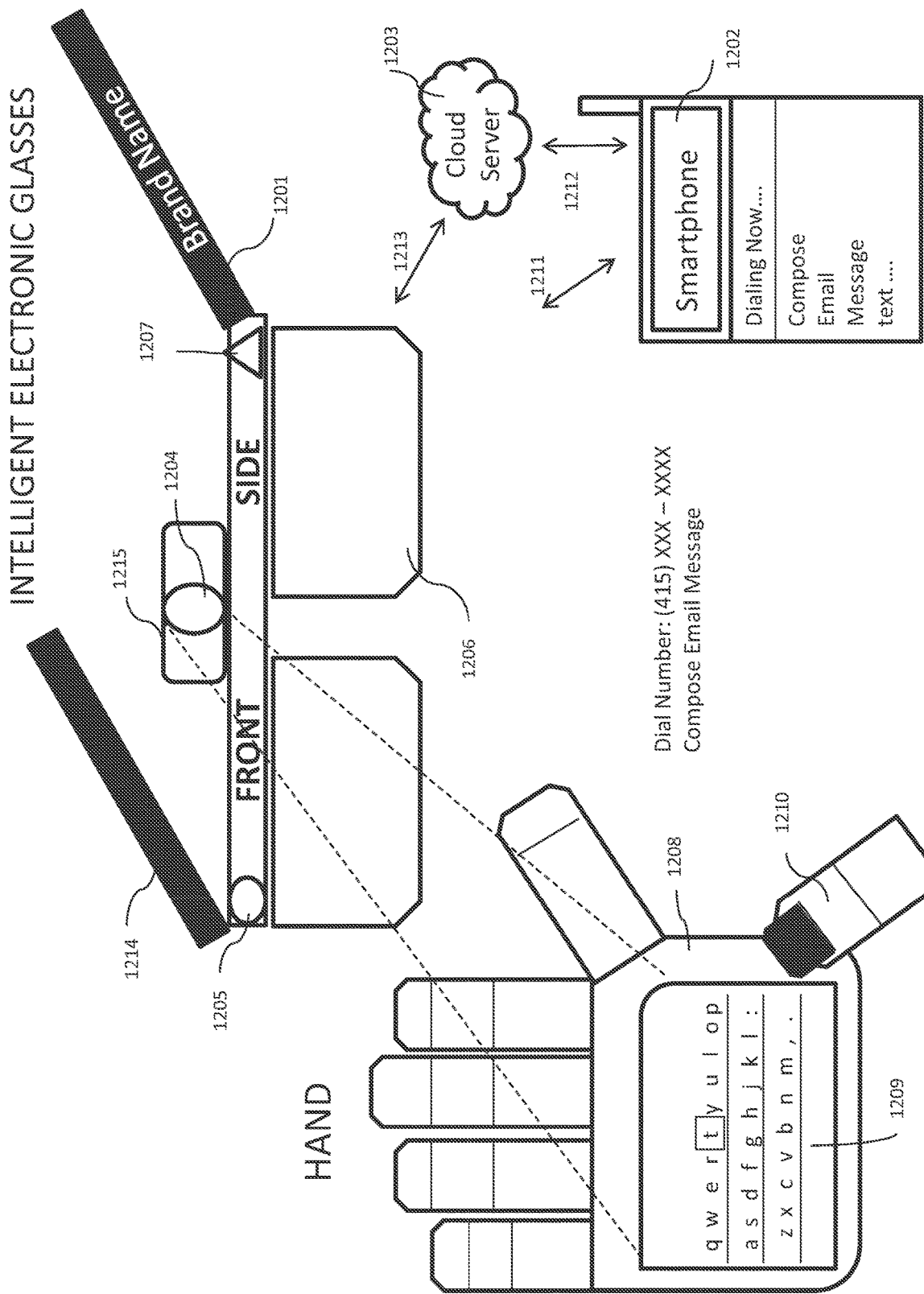

FIG. 12. shows an intelligent electronic glasses and smartphone configured with a camera, laser, and projector in communication with a smartphone. The glasses may project a keyboard onto a hand or surface and allow a user to compose a message on a non-touch surface.

Figure 13:
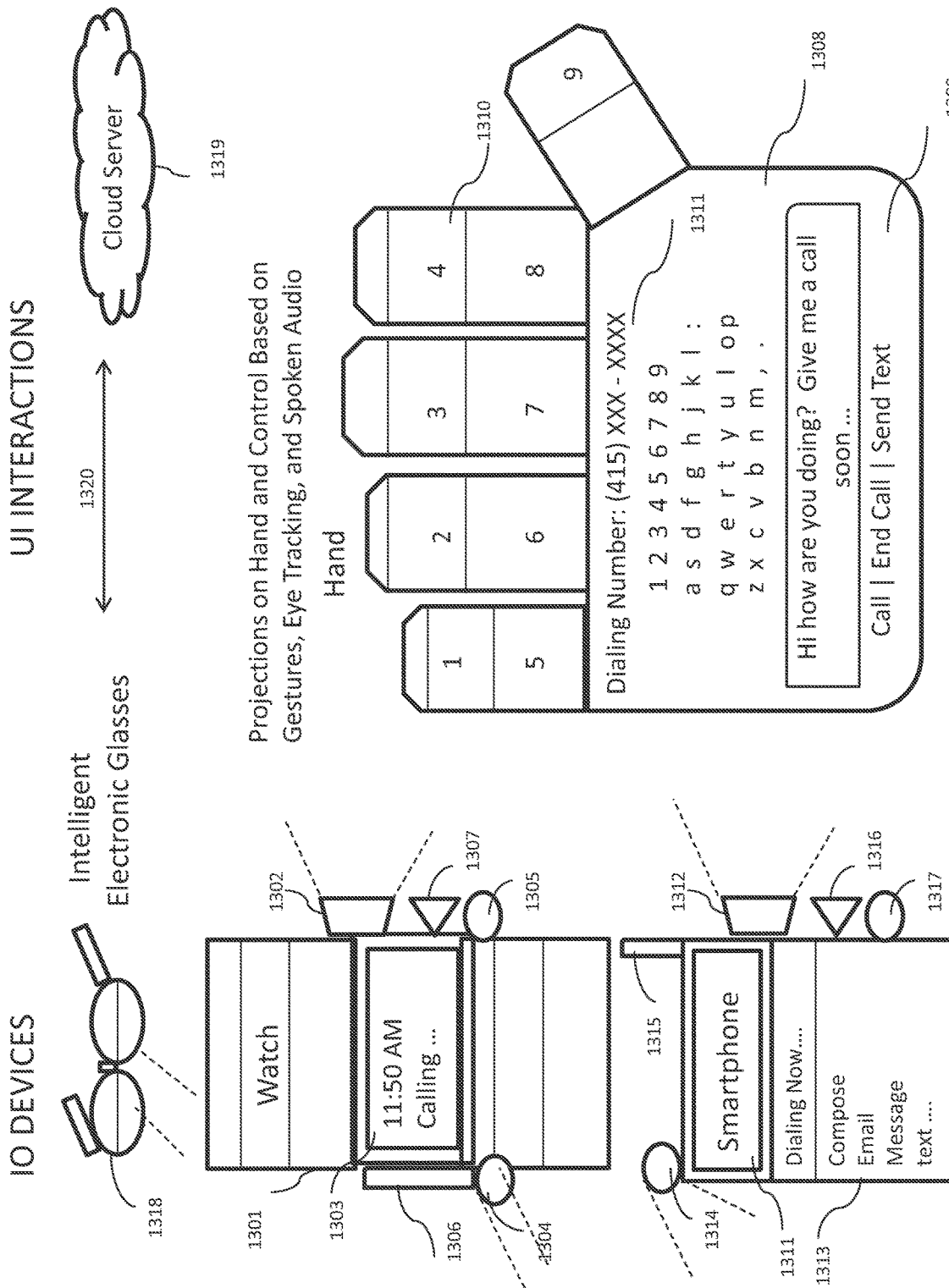

FIG. 13. shows a watch and cellular telephone projecting a keyboard on a hand of an individual. An individual may make contact with the skin or proximate area of the hand to initiate a call.

Figure 14:
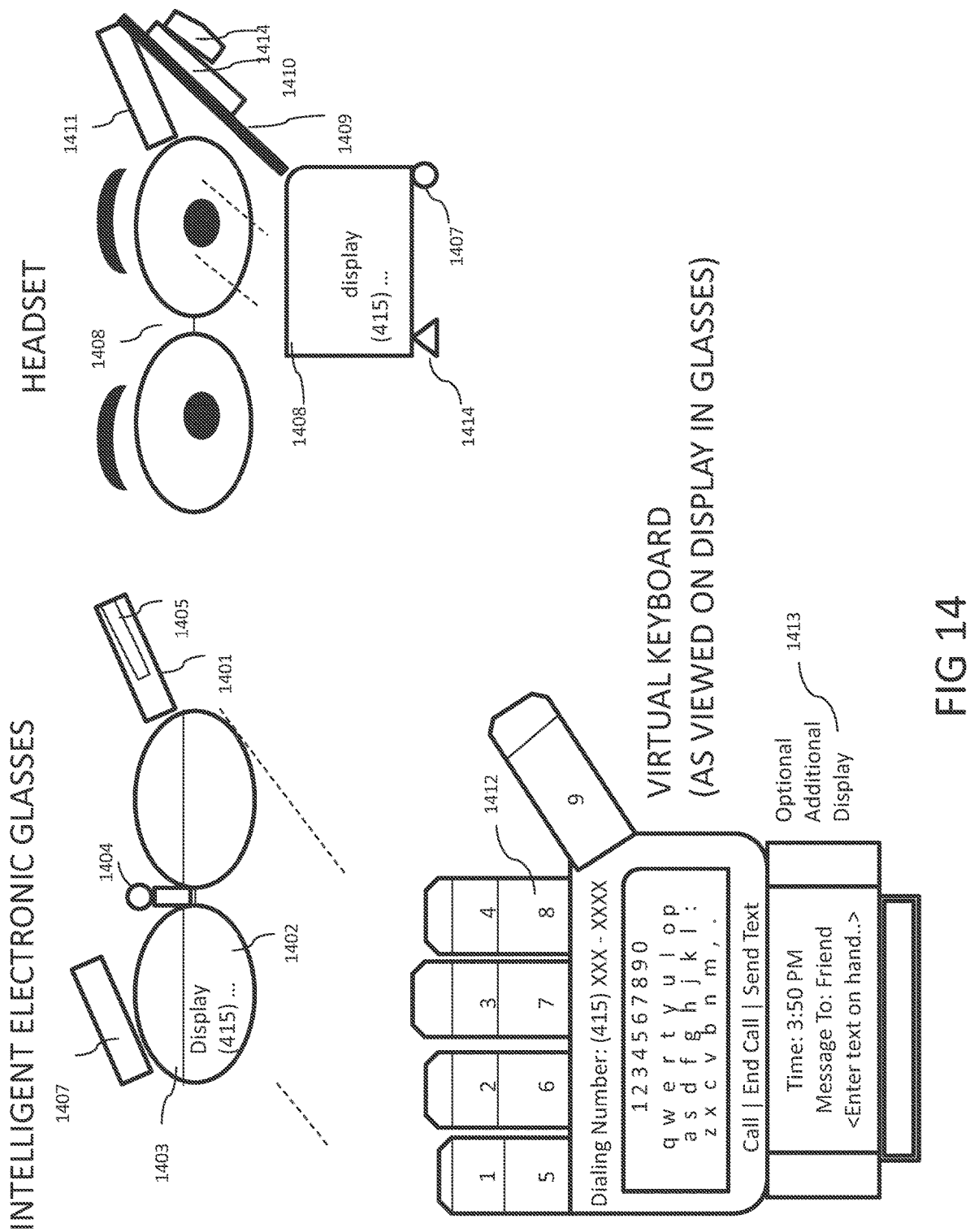

FIG. 14. shows a hand of an individual as viewed through the display of an intelligent electronic glasses or headset. The keyboard may be shown in the display and not actually projected onto the hand, thereby enabling a virtual projection onto the hand in which the keyboard as shown is super-imposed onto the image of hand and viewed through a display. The interaction with this keyboard may be using a finger or pen. The finger or pen movement may be tracked by a camera or laser housed on the mobile device/intelligent electronic glasses/headset. This may enable a private interaction on the hand since the keyboard is only viewable on the display and not on the physical hand.

Figure 15:
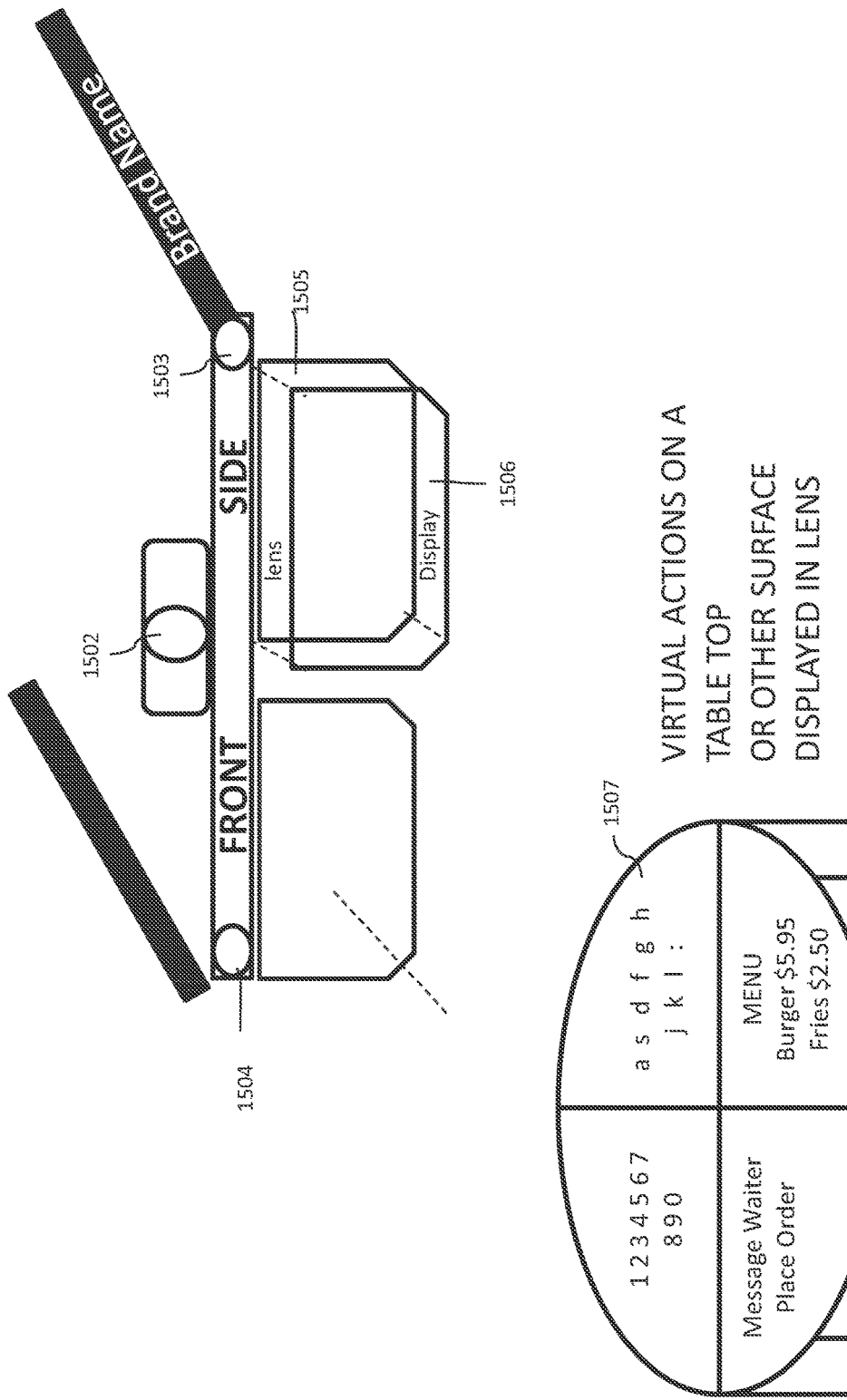

FIG. 15 shows the intelligent electronic glasses viewing a virtual keyboard, menu, or other menu command action in a display area of the glasses.

Figure 16:
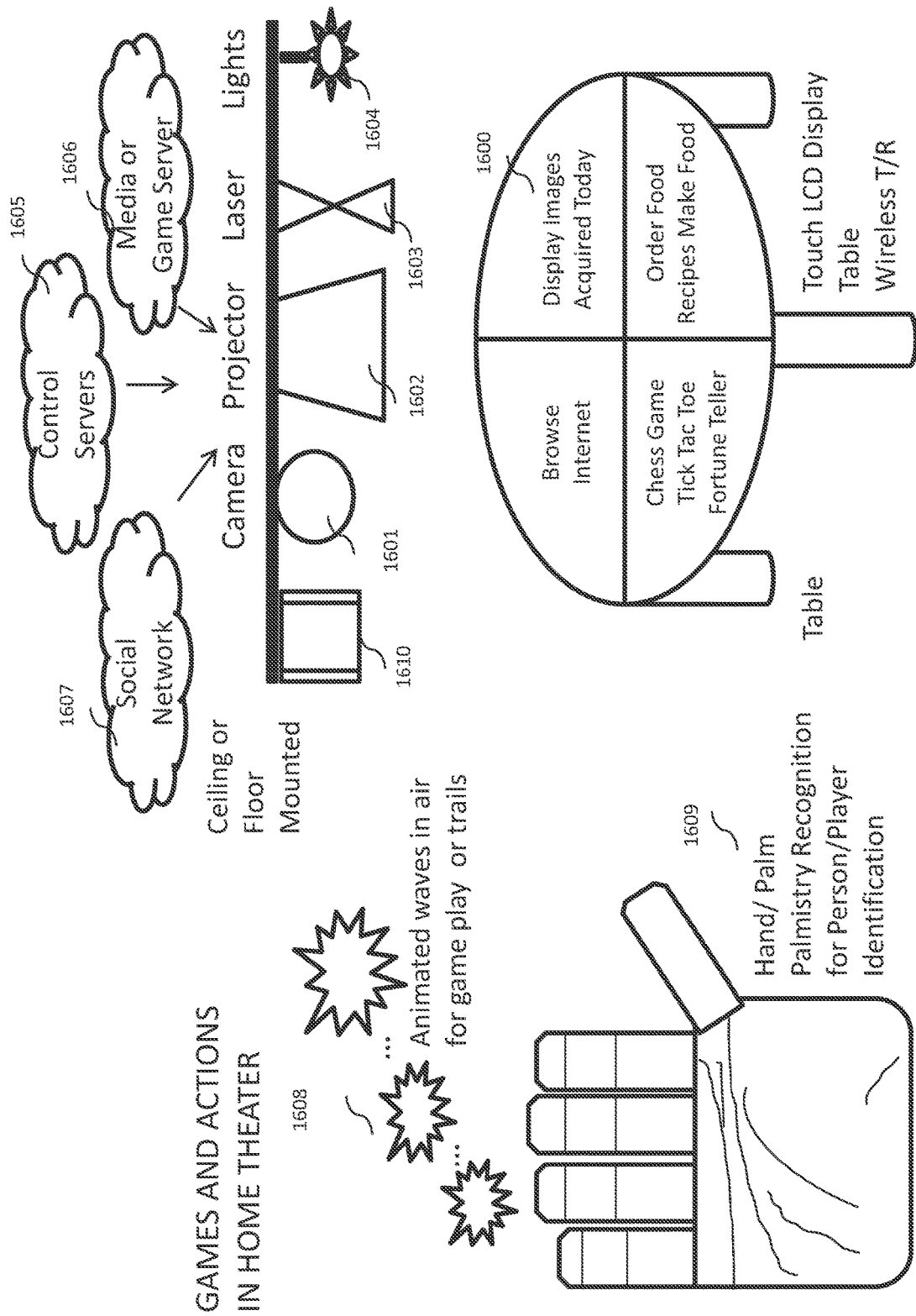

FIG. 16 shows a hand interacting with an intelligent table, where the table has a touch sensitive display. The movement of the hand may be tracked by a camera or laser. Alternatively a person in a room may be tracked using the camera and engaged with games. As an example, the system may allow for a baby to be monitored by the camera and interacted with a remote person such as a parent, baby sitter, or teacher using a local projector. The intelligent table may be used for interacting with people in the room. A projector in the conference room may further create a hologram of a person or object.

Figure 17:
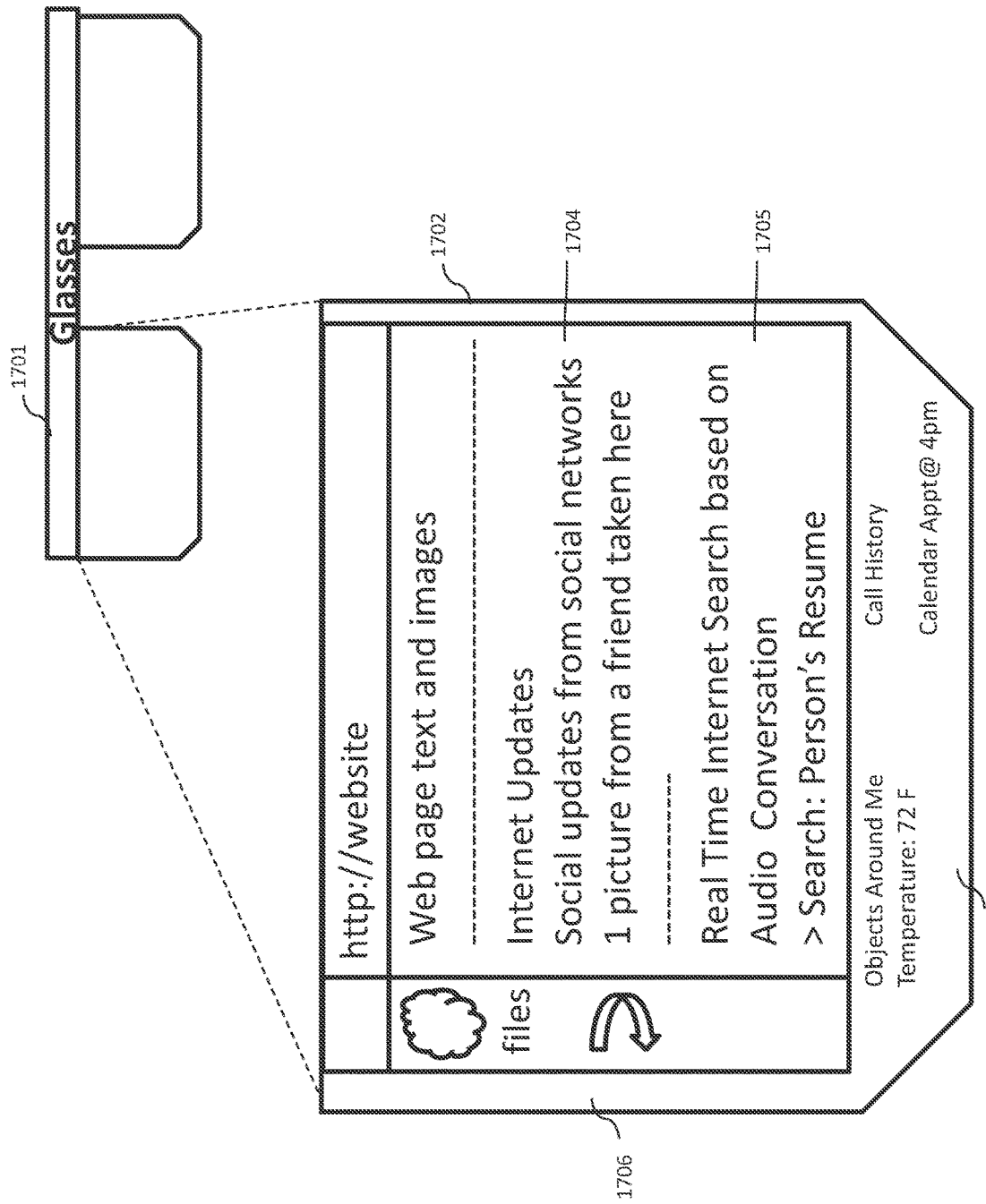

FIG. 17 shows the display of the glasses with Internet and web based content. The content obtained and displayed is related to the audio obtained from a microphone. A text message may be sent to a mobile device or intelligent electronic glasses or headset.

Figure 18:
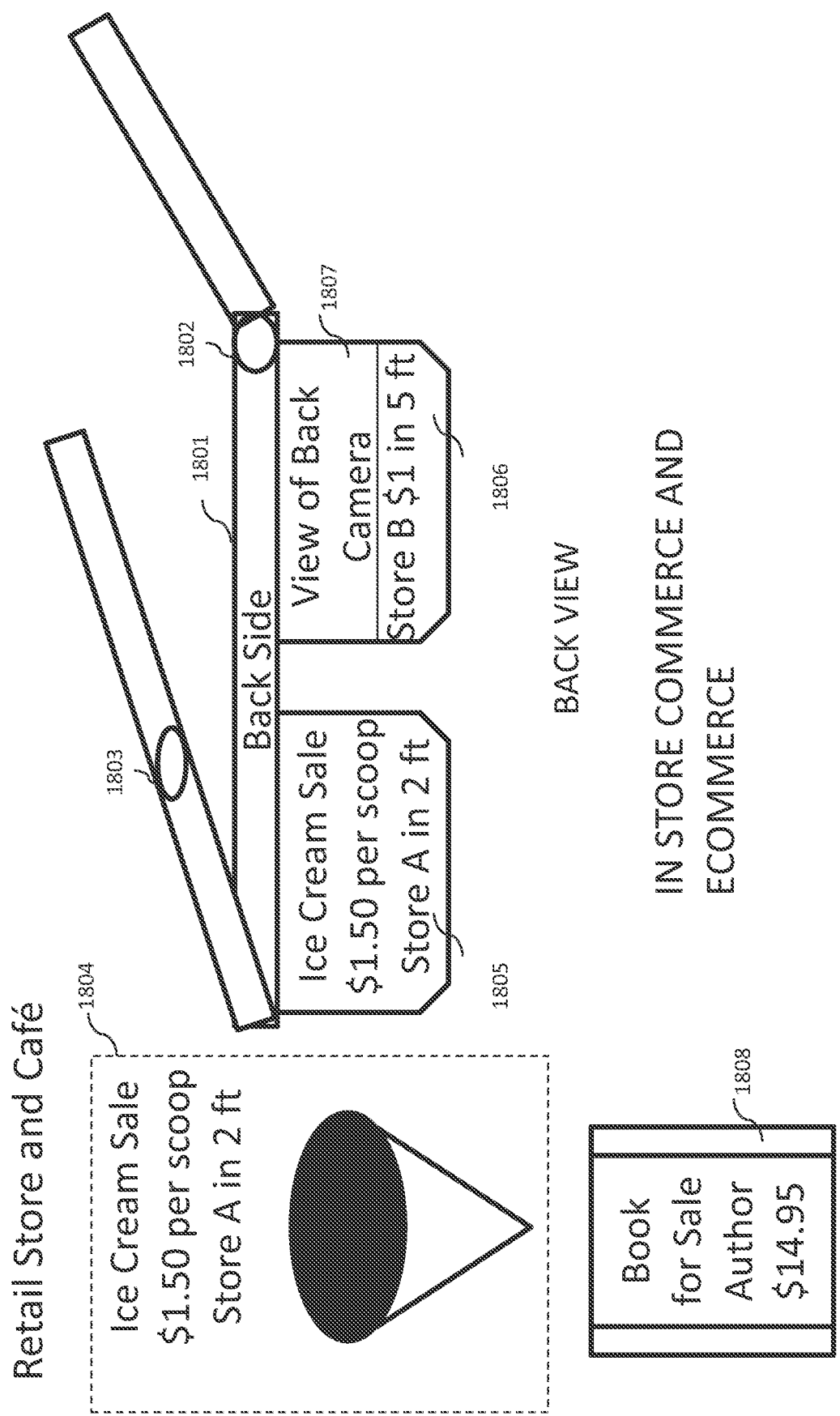

FIG. 18 shows the rear view of the glasses where the display is integrated into the lens. The content showed in the left lens includes shopping data about an ice cream product. The actions that a person does may be linked to a game and allow for badges, rewards, loyalty points, and coupons. As an example, a person that looks at an ice cream cone multiple instances may then be offered a coupon for 10% off to a competing ice cream shop located nearby. The augmented reality system may be linked to a virtual scavenger hunt in which brands advertise and reward individuals for competing tasks including trying on physical or virtual goods.

Figure 19:
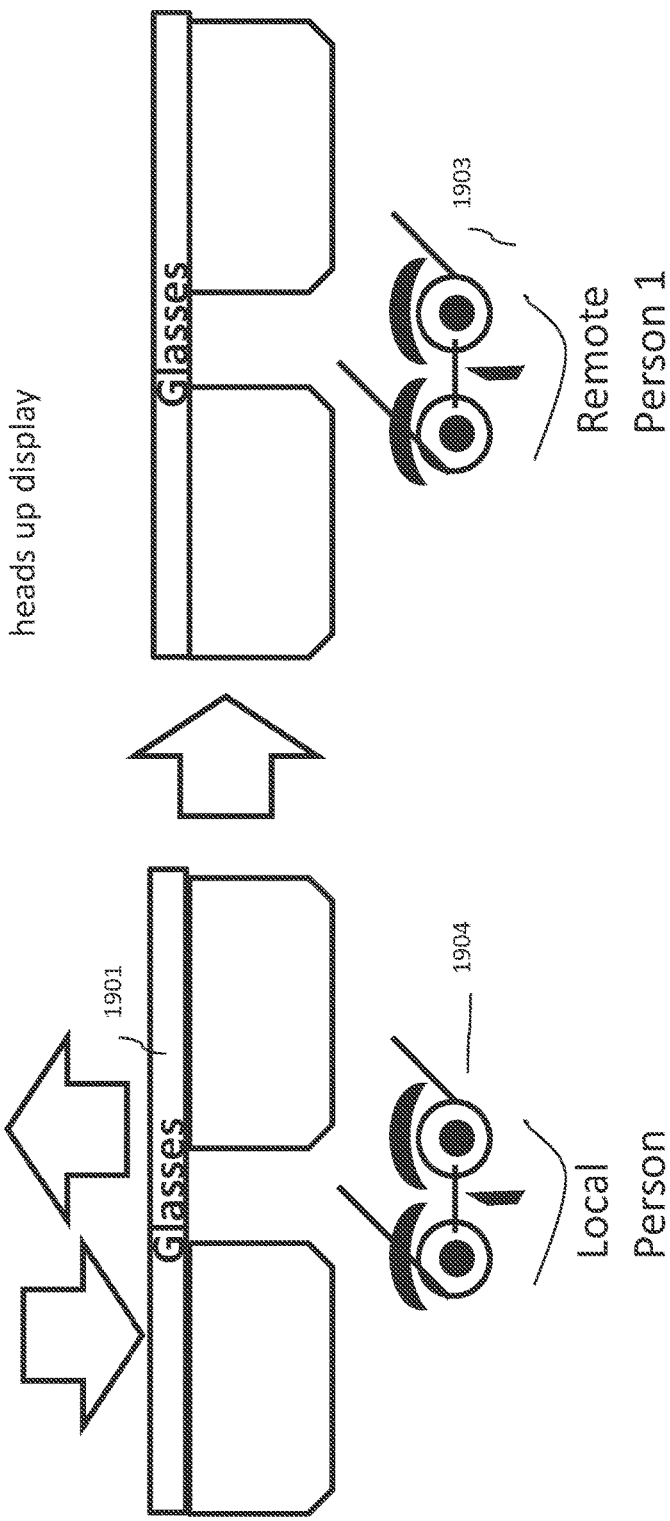

FIG. 19 shows content obtained from the intelligent electronic glasses being sent to a first television for display on the television. The glasses camera may further capture content from the television and stream the content to a remote person. This allows a remote person to be patched into the viewing experience.

Figure 20:
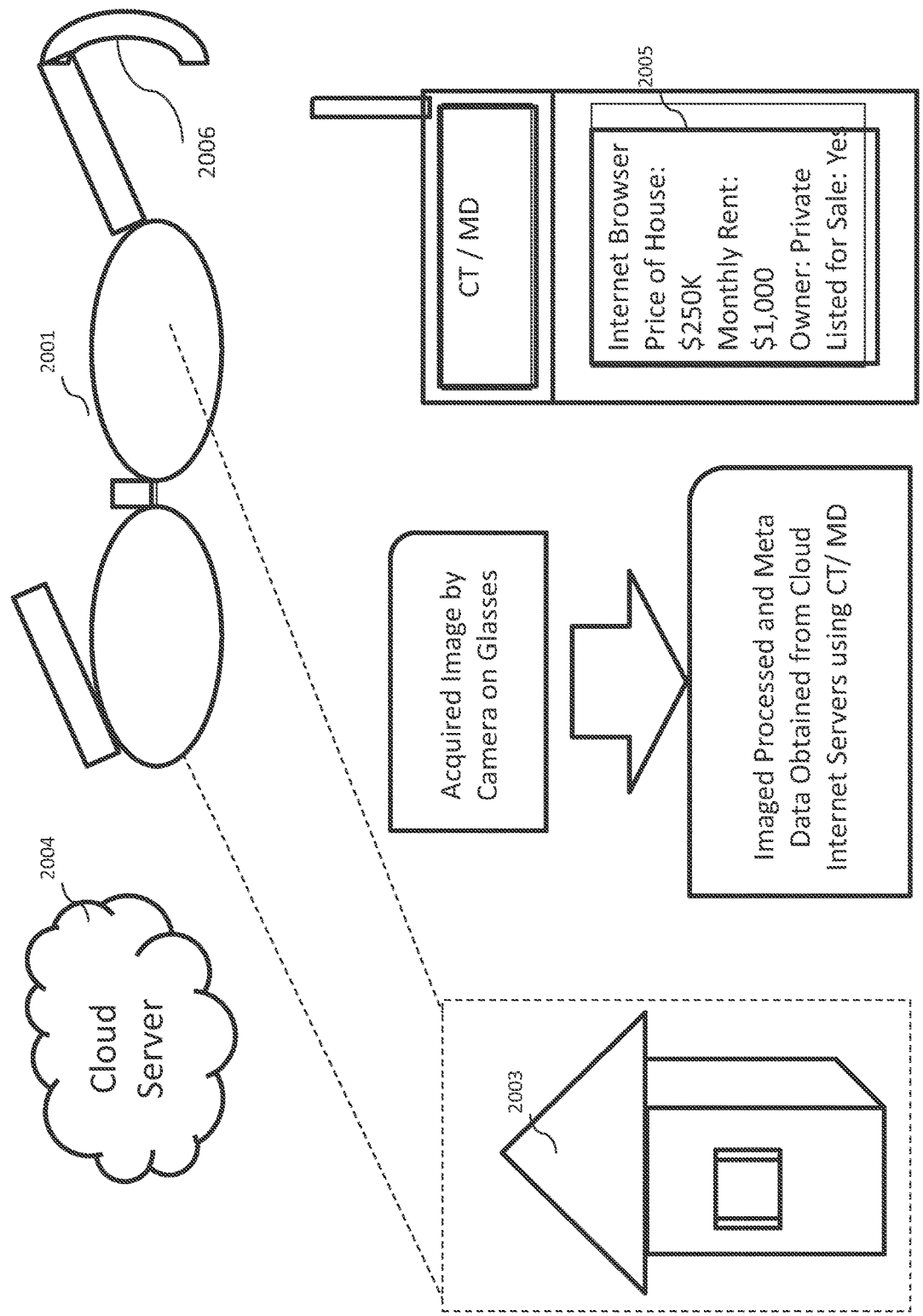

FIG. 20 shows an intelligent electronic glasses with a camera where the camera captures an image of a house, processes the image using a smartphone. The information may be displayed on the smartphone.

Figure 21:
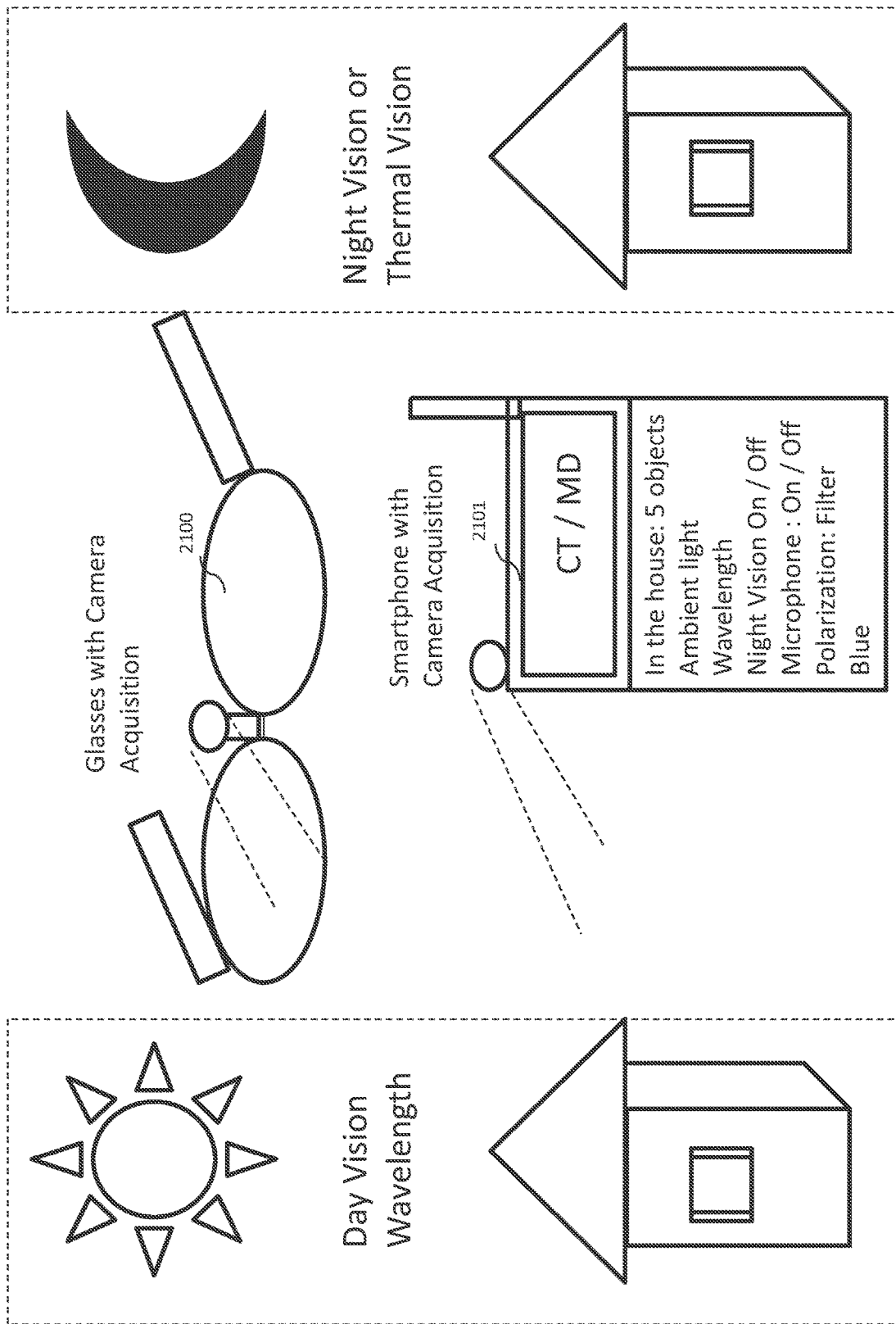

FIG. 21 shows an intelligent electronic glasses obtaining an image of a house, send the image data to a CT/MD, and the CT/MD further displaying this information on the display of the CT/MD. The glasses may also be used for night vision or thermal vision.

Figure 22:
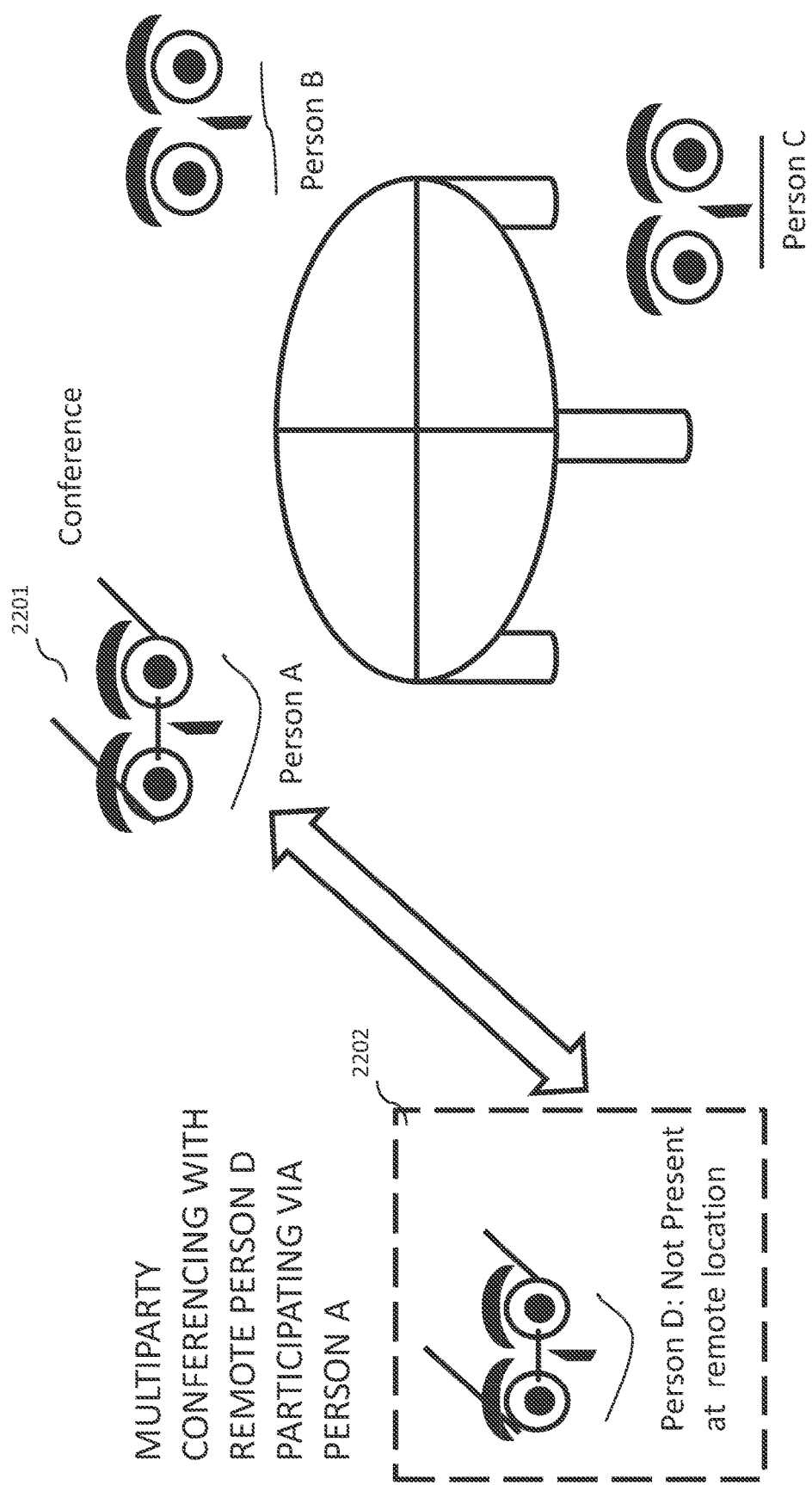

FIG. 22 allows for an intelligent electronic device used in a multi-party conferencing system. Person 1 has an intelligent electronic device with a camera that obtains video and images of two other persons. This content is then streamed to a remote person 4 which can then advise and participate in the conference. This may allow a local or remote person to look at an environment from the vantage point of another person. This may be useful for a negotiation. If multiple image/video capture devices are used, a person can request to participate in an experience or view a recorded experience (including a live action conference, theater or movie experience) from the vantage point of another person. A remote person may log-in to the view of another person's glasses.

Figure 23:
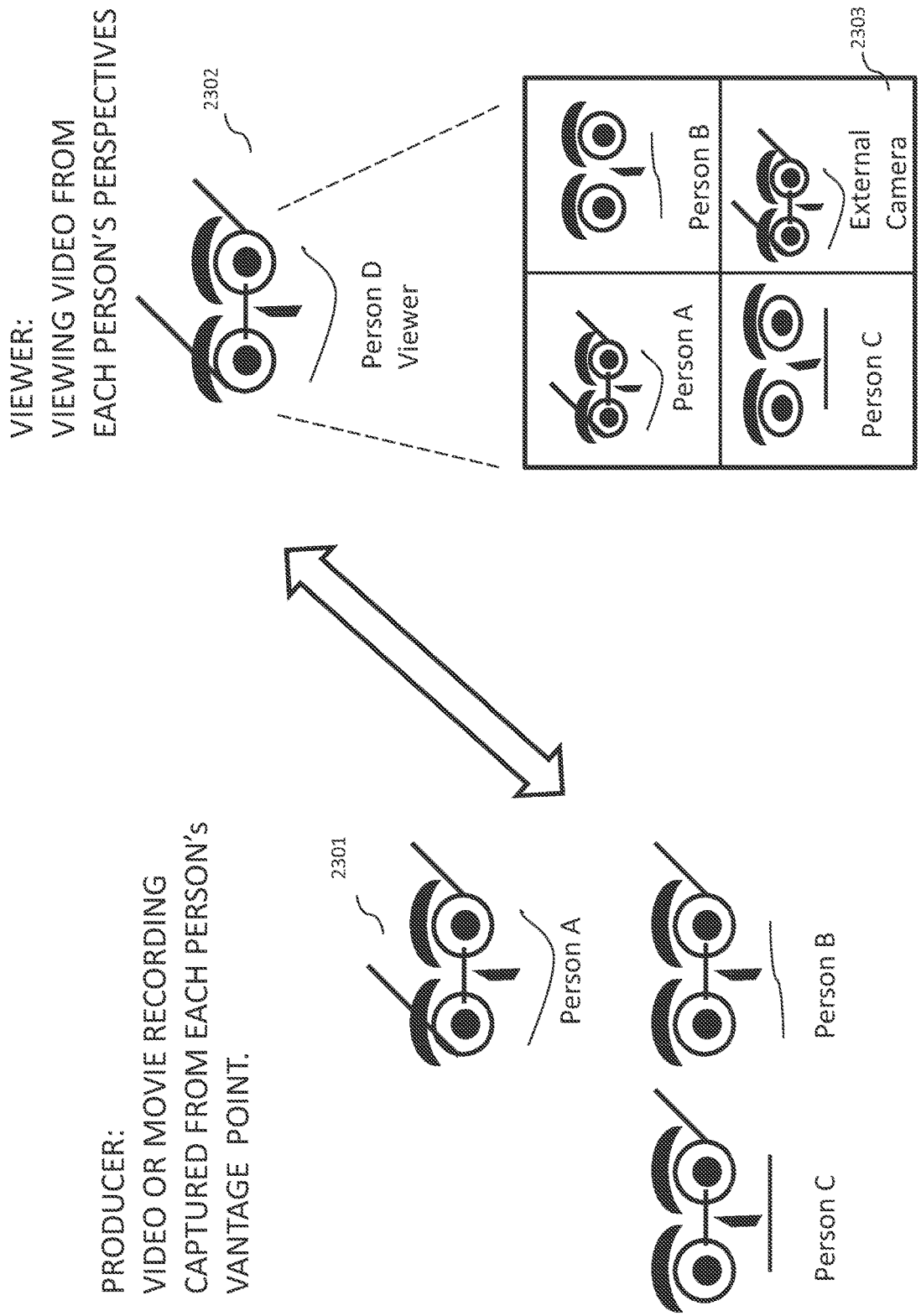

FIG. 23 shows a set of participants in a recording environment in which multiple people are wearing intelligent glasses. All the participants are viewable in one screen on the lens of a glasses. Alternatively, a person viewing the experience at a later time may switch vantage points.

Figure 24:
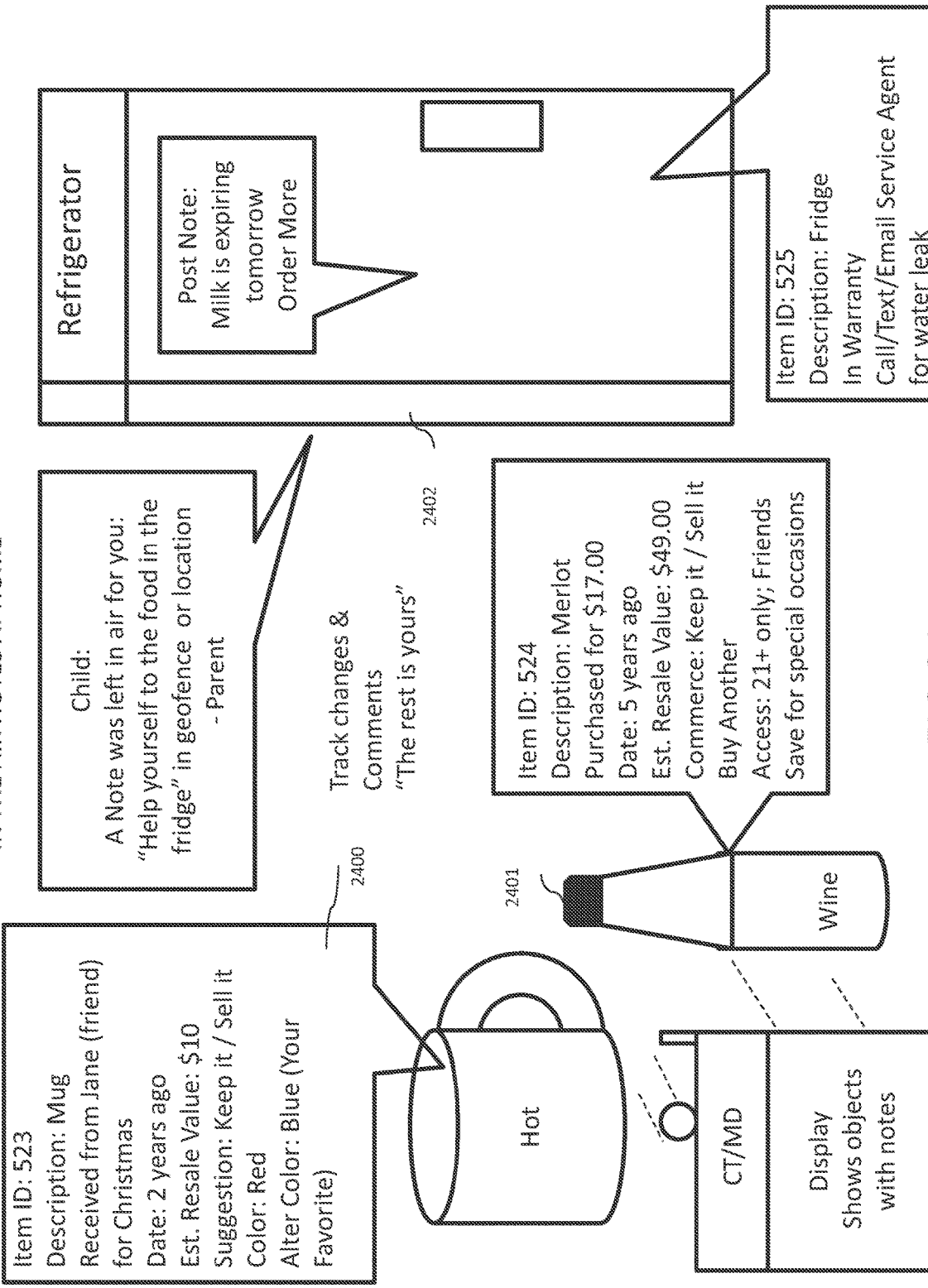

FIG. 24 shows a description of virtual notes being associated with a device. Items may be highlighted, bold, changed in color in a virtual context. These notes and environments may be saved by a user and viewable by anyone in the geofenced area or all users. This may allow for a personal diary of continuous data to be created. A series of questions and answers may be created to help facilitate structured and unstructured data. Notes may also be reminders that are generated based on predictive analytics of a person's behavior. The consumption of food may be tracked and the calories consumed may be calculated. A camera may image food as a chef is preparing or while a person is consuming the food. Food imagery may be processed for image recognition and nutritional value using a local or network server. A report on nutritional value of food consumed and recommendations on behavioral improvements may be created and delivered daily. Fitness information may also be gathered from movement data. An individual may view the object in the display of a smartphone or table computer or the display of the intelligent electronic glasses or the headset display.

Figure 25:
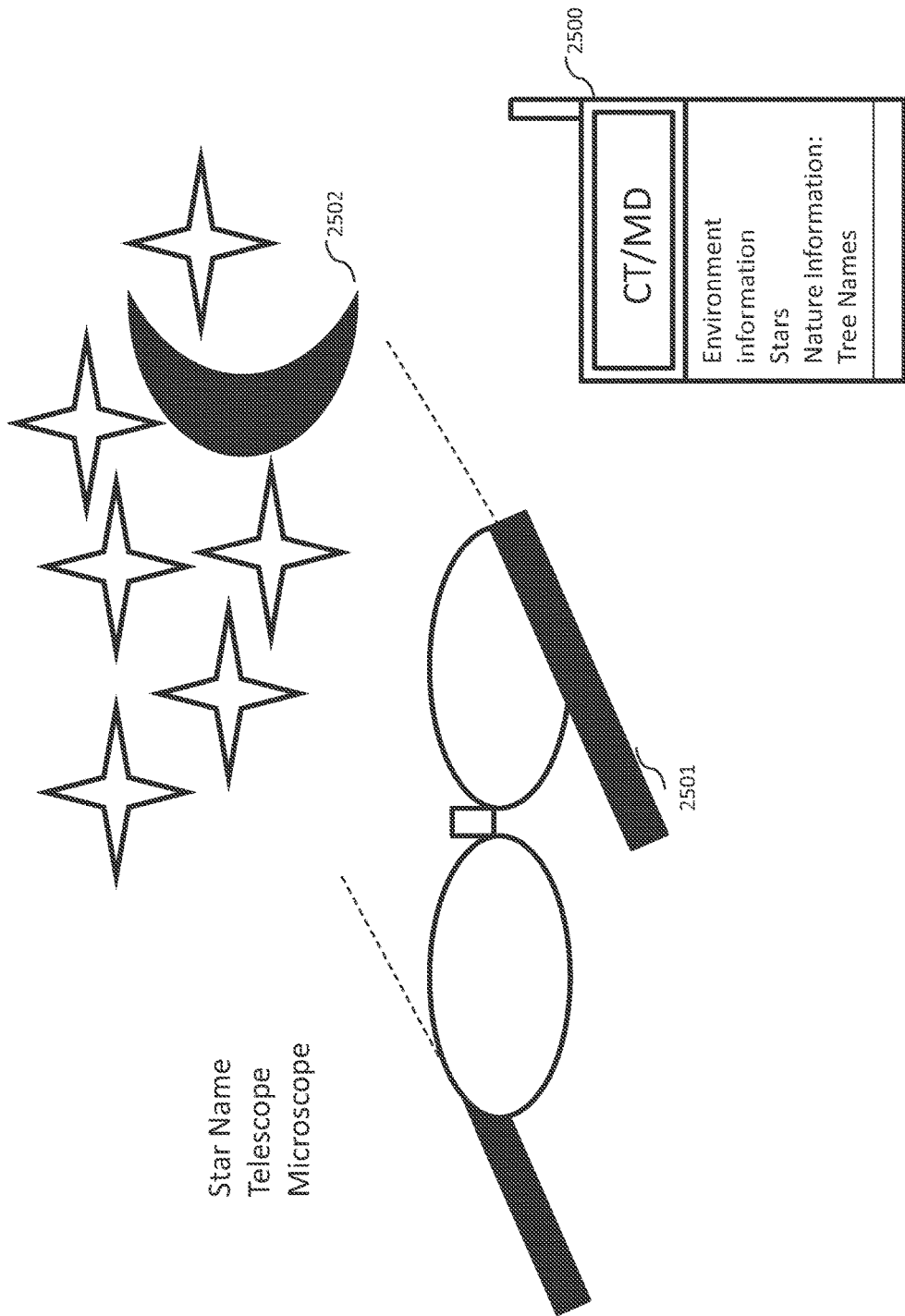

FIG. 25 shows the glasses being used outside to focus and recognize distant and proximate objects. This information may be displayed on the cellular telephone and mobile devices. The mobile devices/intelligent electronic glasses/headsets may be used in other outdoor contexts and underwater. As an example, underwater the glasses may be configured as underwater goggles and image fish and plants around the person.

Figure 26:
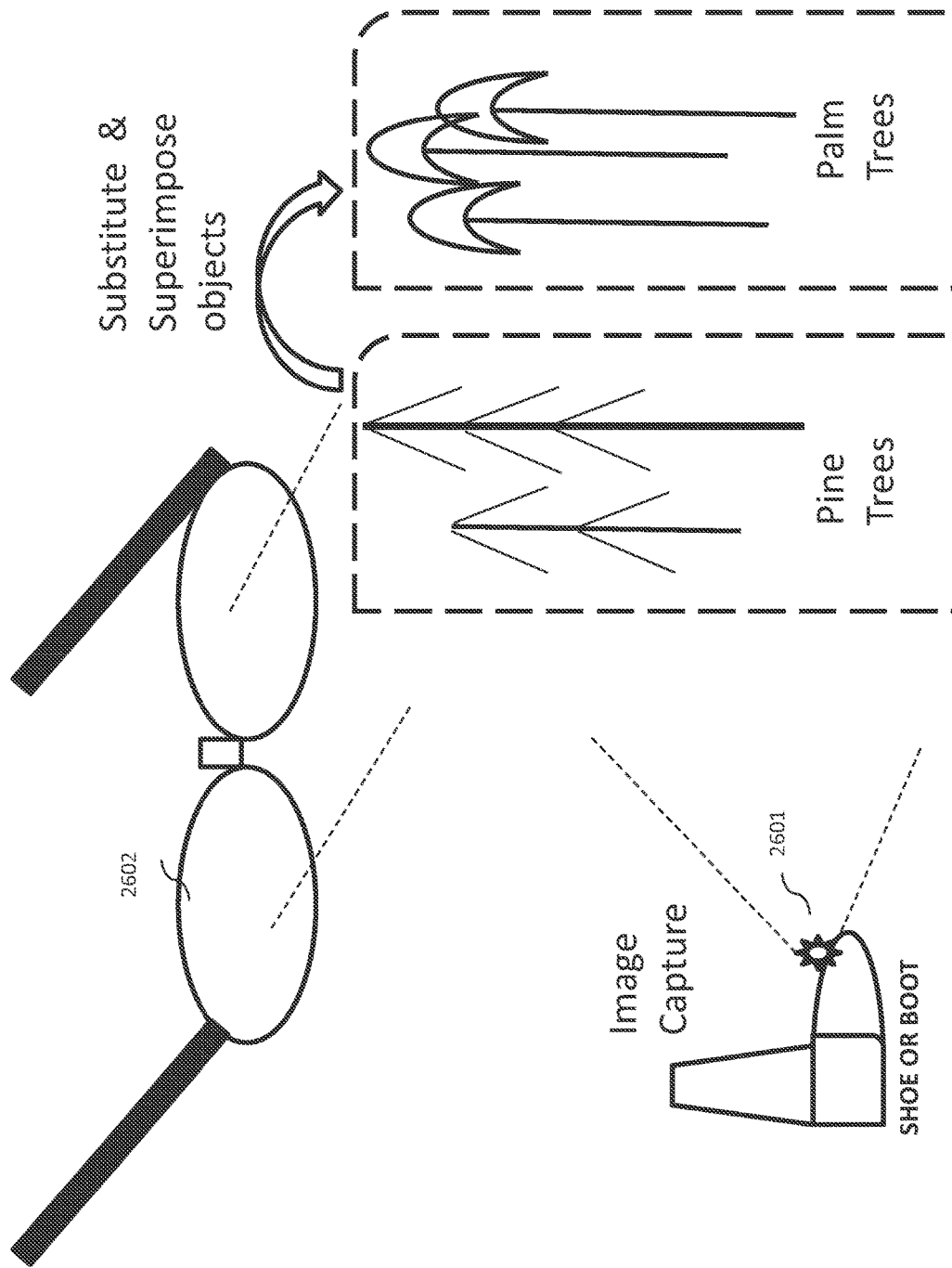

FIG. 26 shows image capture of objects and the transformation of those objects in the display. The images obtained may be processed and changes may be enacted such that they are displayed virtually different than they are physically. As an example, an individual that wishes to be at a beach environment in Hawaii but instead is in a forest environment in Lake Tahoe may substitute the images displayed. A person may also be patched into a vacation by viewing the experience of an individual. Alternatively, the substation may be of people, allowing a person such as a family member that is not present or an avatar of a person who has passed away may be added to the environment. Alternatively, the background images may be changed to allow a dreary dark day changed into a bright sunny day.

Figure 27:
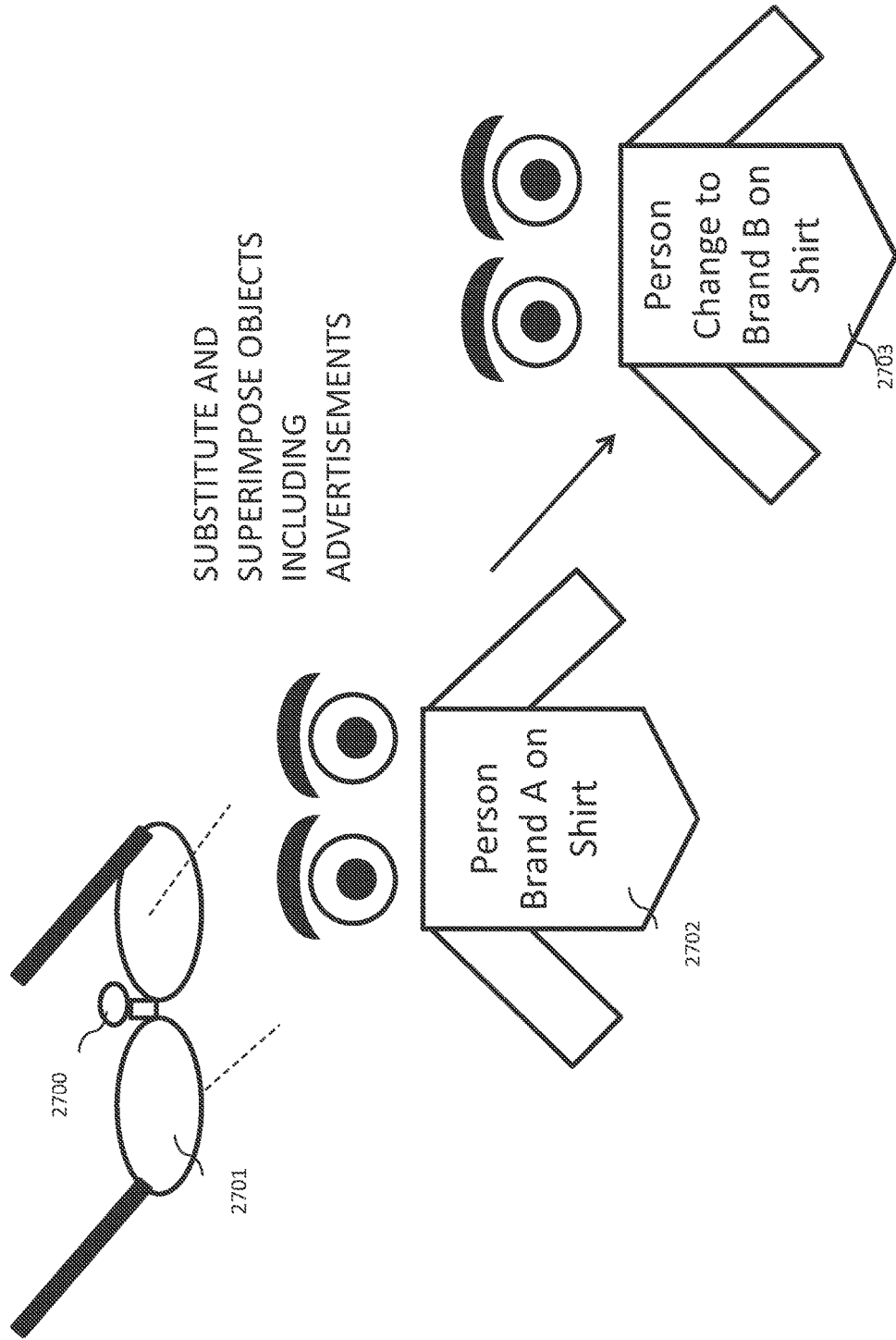

FIG. 27 shows images obtained from a camera may be processed and displayed differently in a virtual image versus the physical appearance. A brand may be modified from a first brand to a second brand based on user settings or advertising bidding. Additionally, a second person wearing the products of a competing brand may be displayed in the augmented reality system when an individual is look at a first physical product. This may further enable virtual shopping assistants in malls or stores. The virtual shopping assistants may be configured to connect to a call center. Shipping of a physical product may be enabled based on the purchase of a product in a augmented reality system or virtual world.

Figure 28:
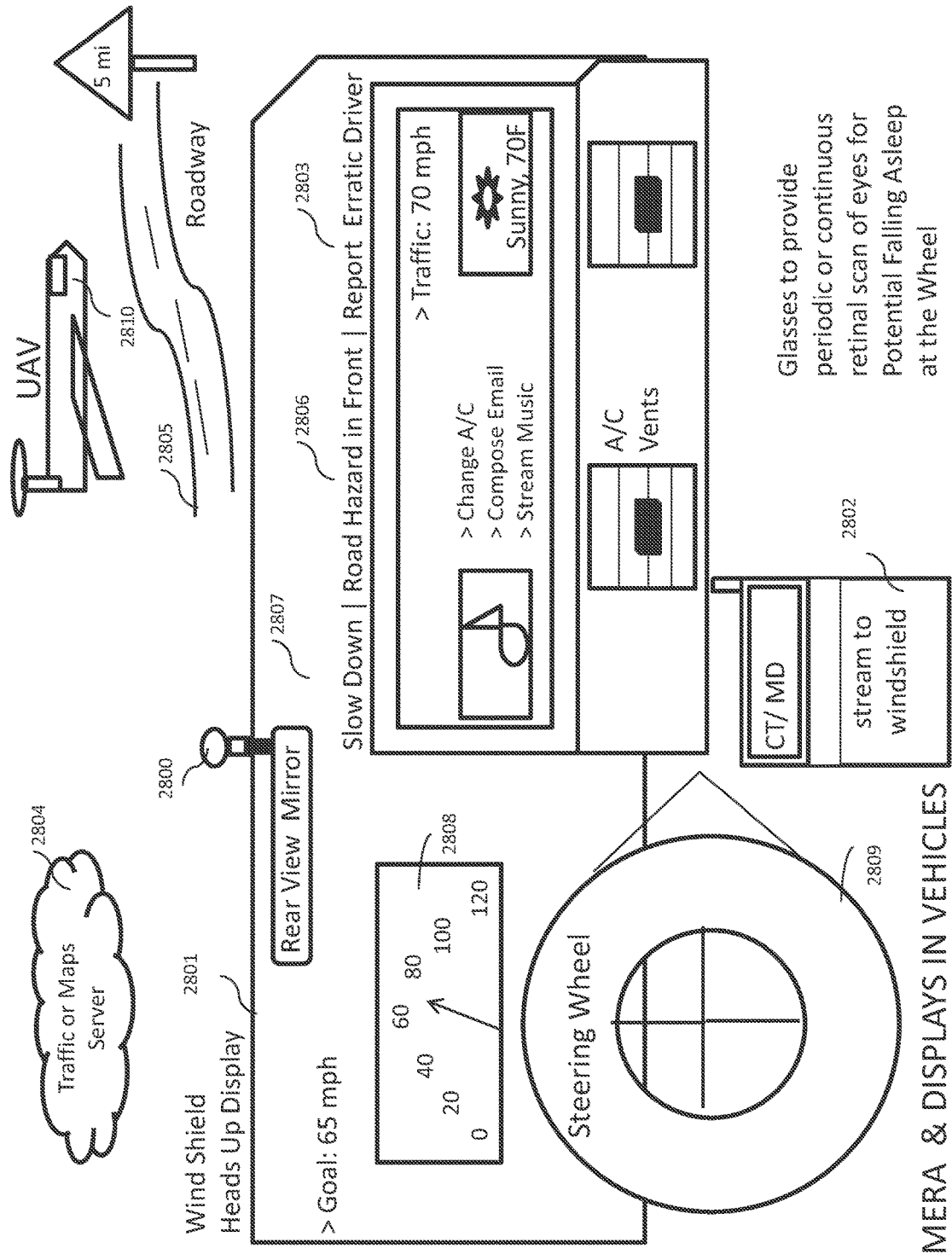

FIG. 28 shows various information presented on the display of a car. This information may be obtained from the camera which images a road and environment and displays the information in the glasses, on the dashboard of the car or on the display of a mobile device. The information may further be helpful to police and emergency services. A camera in the car or the glasses itself may be used to image a person's eyes or other body functions and prevent drunk driving or driving while sleepy by measuring eye fatigue.

Figure 29:
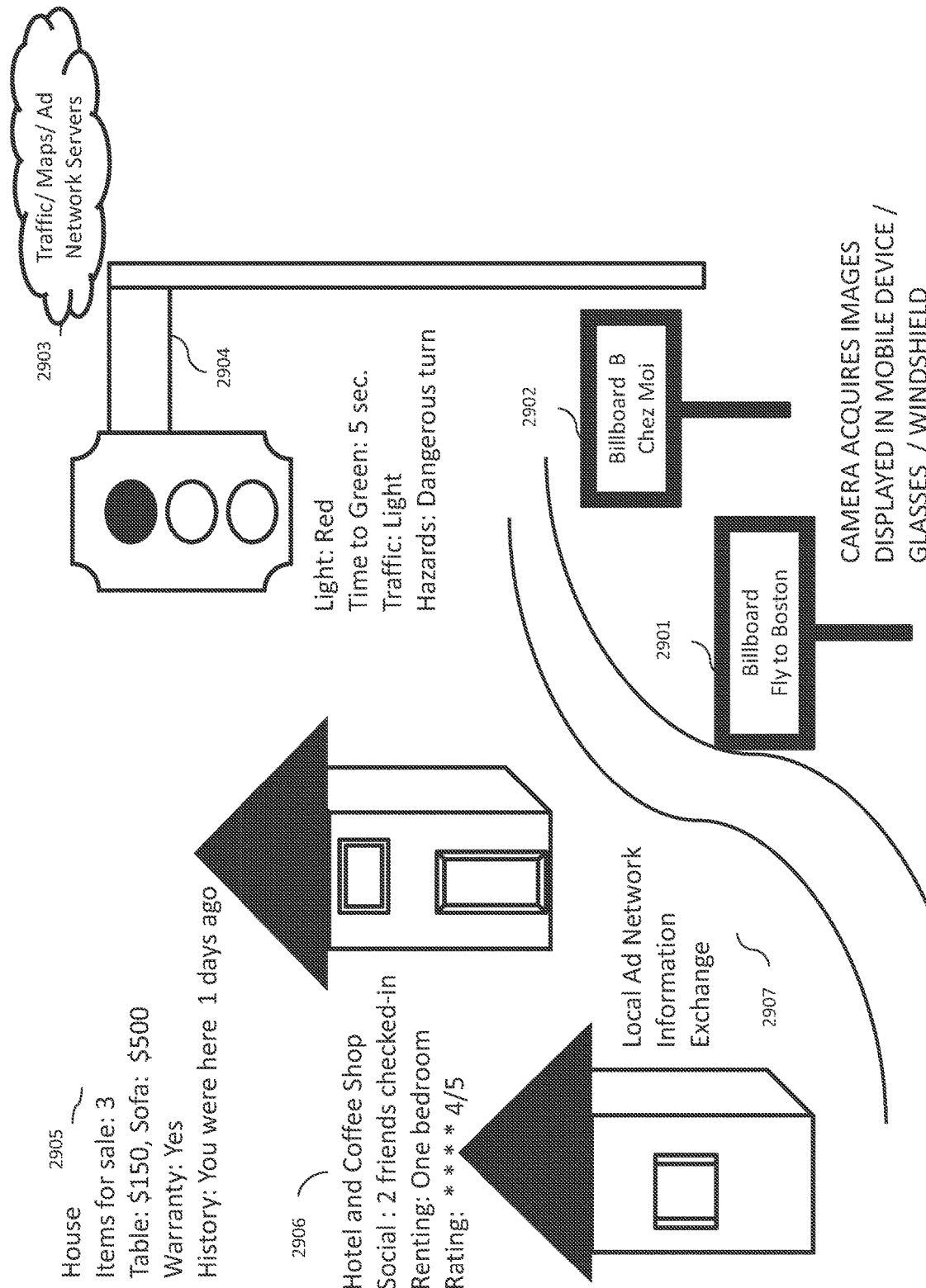

FIG. 29 shows notes and information about various houses, stores, traffic lights from the view of a display. These notes are obtained in response to the images obtained from a camera on the mobile device/intelligent electronic glasses/ headsets. The billboards viewed by a user may change in response to the person viewing the objects.

Figure 30:
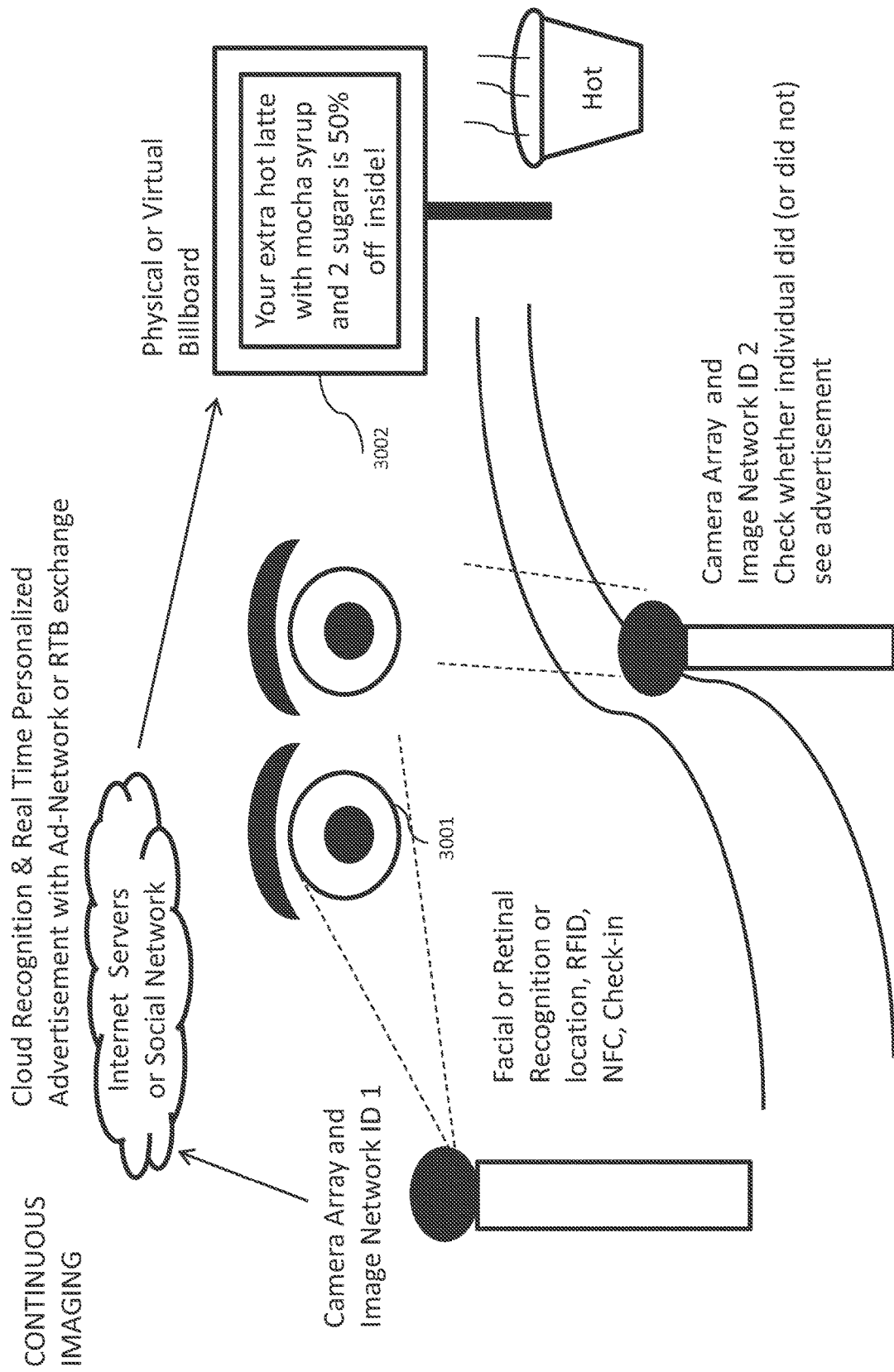

FIG. 30 shows a camera array network positioned in an environment that captures images of people and objects. For example, a person's eyes may be captured from the camera array, the information may be processed by cloud server for image recognition purposes, and physical billboard ads may change in response to the person identified. This may allow for real time physical world changes in response to the people identified. Alternatively, the billboards may change based on location, GPS, WiFi, NFC, RFID or other location targeting information.

Figure 31:
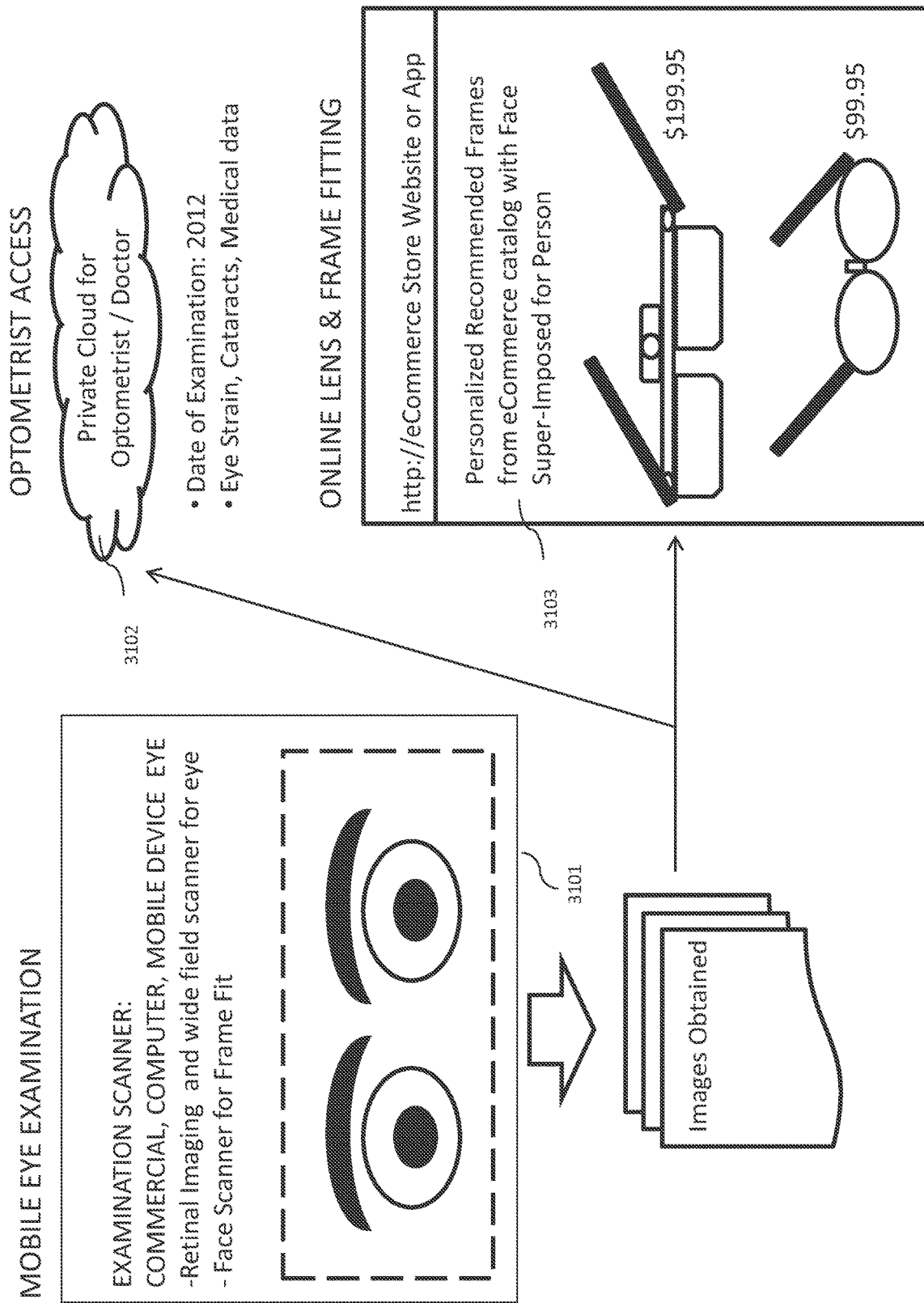

FIG. 31 shows an imaging and diagnostic scanner which scans the eye of an individual to check the health of the individual. The scanner may allow for an individual be retrofitted virtually with a variety of frames and allow a person to shop for frames customized to the person's face.

Figure 32:
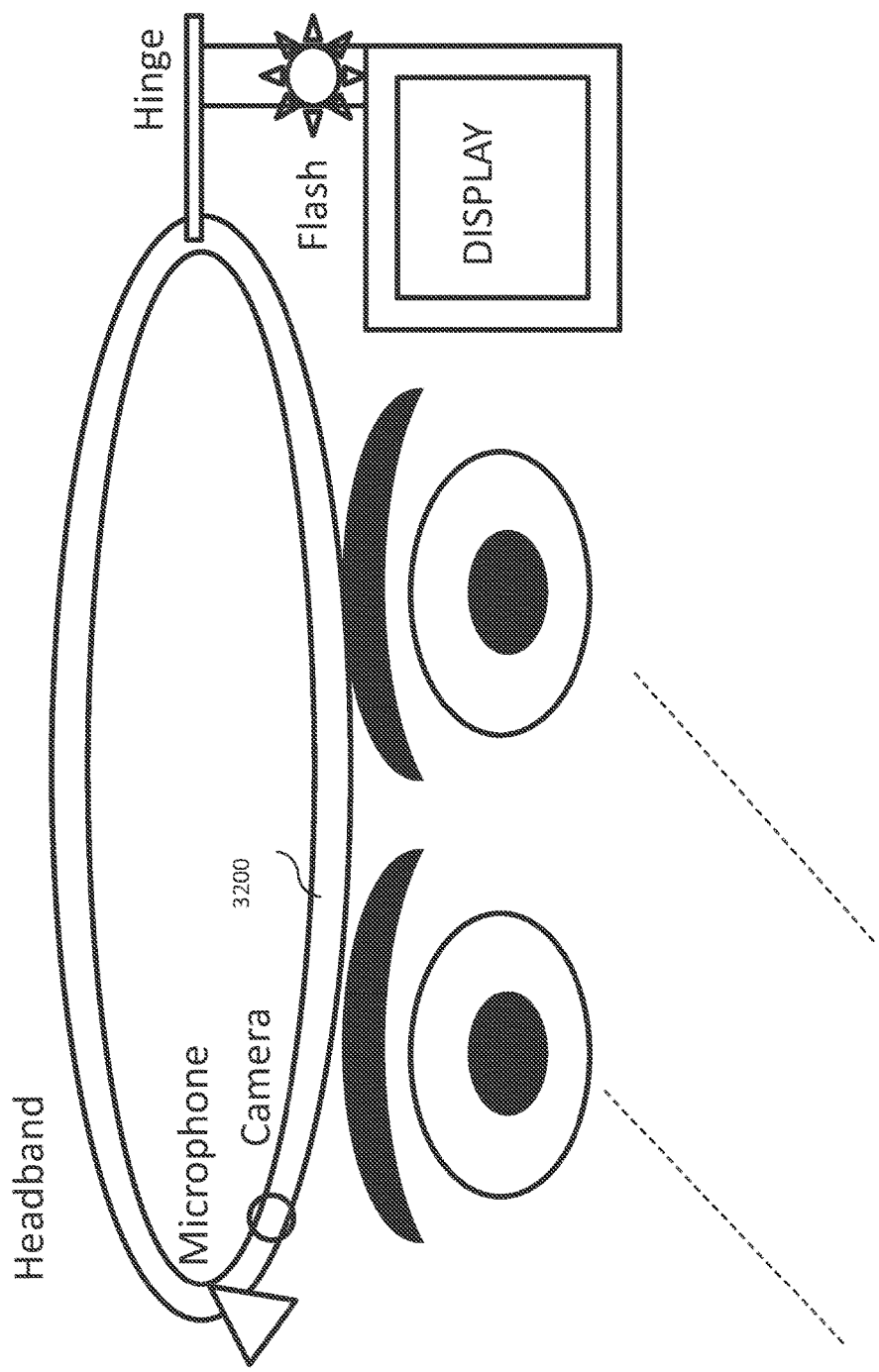

FIG. 32 shows a headset with a display, flash, camera and microphone.

Figure 33:
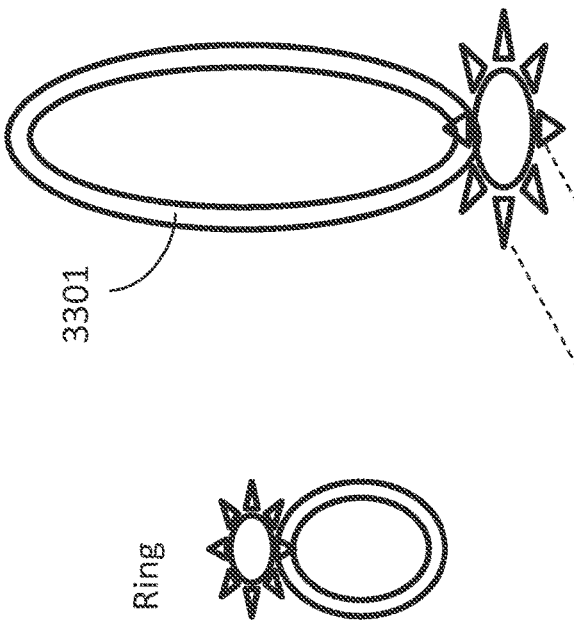

FIG. 33 shows a variety of items fashioned to be worn on the body that may contain various continuous input capture items including cameras and microphones.

DETAILED DESCRIPTION OF THE INVENTION

These features and other novel features are described in detail to further illustrate and explain with reference to the appended figures.

Figure 1:
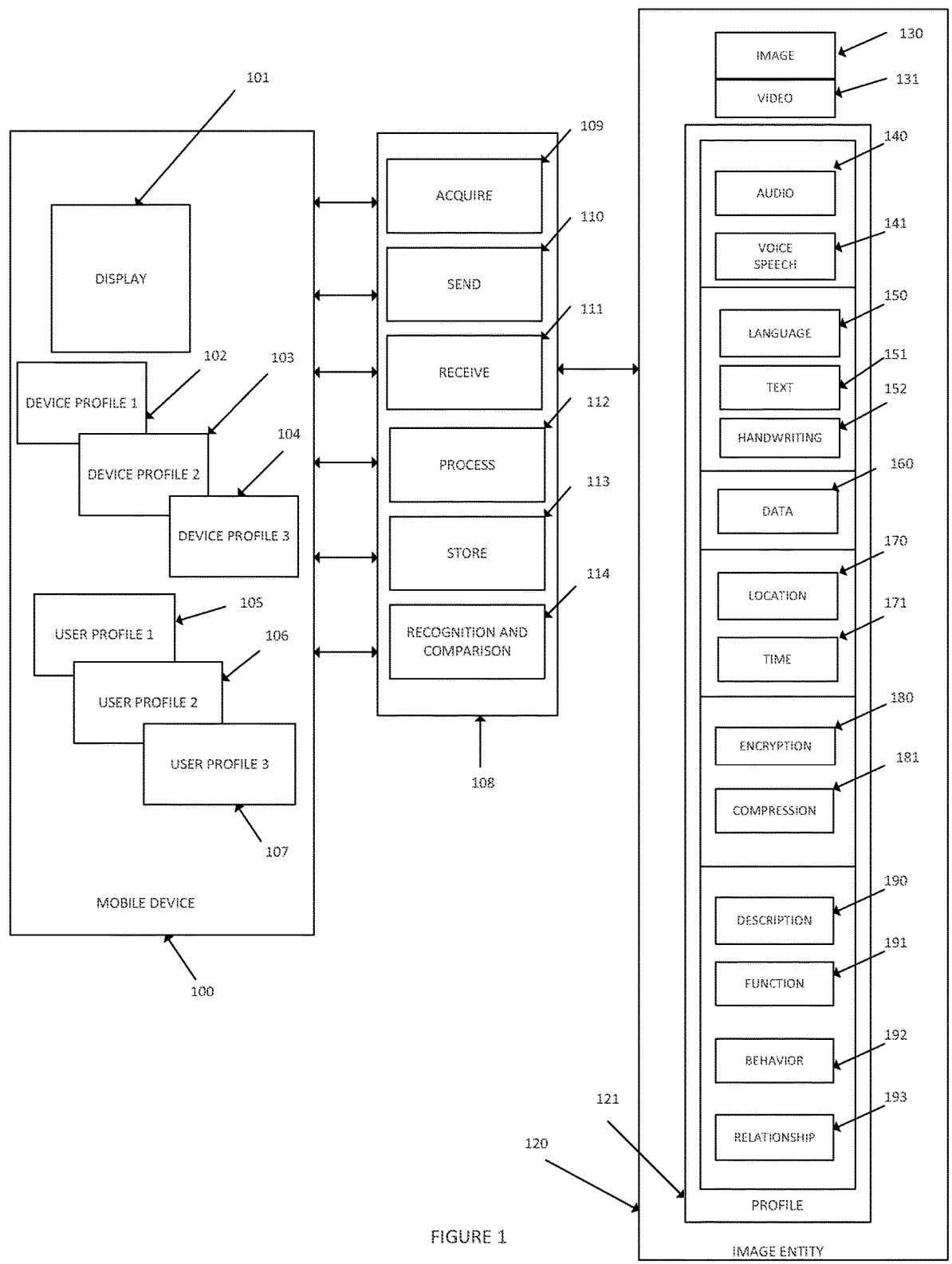

Referring now to FIG. 1 in detail, describes a mobile device/intelligent electronic glasses/headset 100 configured with standard features and or additional special features that define and enable the functionality of cell phones, laptop computers, personal digital assistant PDA, and other mobile device/intelligent electronic glasses/headsets. The mobile device/intelligent electronic glasses/headset 100 is configured with a display 101 which may be touch sensitive or alternately not touch sensitive. The mobile device/intelligent electronic glasses/headset 100 may be configured with a plurality of display windows and display types. The mobile device/intelligent electronic glasses/headset is characterized by one or more device profiles, 102, 103 and 104. The device profile comprising of information such as device model, device identification number, one or more mobile telephone numbers to empower the user to program and or select the desired device profile for the desired purpose and at the desired time. The mobile device/intelligent electronic glasses/headset user is further enabled to establish, modify and enable a plurality of user profiles, 105, 106 and 107 for use by itself and or in conjunction with the selected device profiles for the desired purpose.

The mobile device/intelligent electronic glasses/headset is enabled with the capability to acquire images by built in camera or external means 109, send 110, receive 111, process with a built in processor 112, store information locally 113, recognize and compare image and other patterns 114, with the composite functions being represented by 108 for providing the needed functionality for wired or wireless communication of images and other information.

The image entity 120 describes the relationship between the image 130, and video 131 and other collateral and associated information which is defined as an image profile 121. The image profile 121, comprises of audio 140, voice/speech 141, language 150, text 151, handwriting 152, data 160, location 170, time 171, encryption 180, compression 181, description 190, function 191, behavior 192 and relationship 193.

The image 130 and video 131 can be expressed as purely digital data and all of the other information associated with the image profile 121 may also be represented as purely digital data. The digital rendering of the composite data creates a purely digital image entity 120 comprising of an image and an image profile. Thus an image entity can be efficiently communicated across a wired or wireless physical network, received and sent and further processed for the desired utility to form a virtual network composed of images and associated image profiles. As an example an image entity can be viewed just as an image only or activated to deliver voice, music or other functions by selecting the functionality by appropriate interface means such as touching a portion of the image, by voice command and or other means.

Efficient communication is achieved through compression and decompression as may be appropriate at the send or receive side of a device in the physical network. The conversion of voice, speech, text and handwriting is enabled by digital processing of the data at the mobile device/intelligent electronic glasses/headset level, the local server level, the central server level, the network server level and or the network server level to provide enhanced utility to the mobile device/intelligent electronic glasses/headset user based on mobile device/intelligent electronic glasses/headset profiles and or user profiles. The behavior of an image by itself and or in relation to other images is capable of being modeled. The dynamic construction, storage and use of a virtual image entity is enabled by software means using the software, processing power/databases/lookup-tables resident within the mobile device/intelligent electronic glasses/headset and or in conjunction with the software, processing power/databases/lookup-tables resident in a physical network at the local, central, escrow and or the network server by fully leveraging the wired or wireless connectivity.

In the present system a plurality of device profiles and user profiles, with the capability to acquire images and related information by mobile device/intelligent electronic glasses/headset means, capability to recognize the images and compare the images, and the capability to send, receive, process and store by wired or wireless communication means is described. The image further being described as a virtual image entity by software means wherein the image entity comprises of an image profile that associates the image with collateral information such as audio, voice, text, speech, location, time data, handwriting, encryption/decryption, compression/decompression, description, behavior, function and relationships to other images/aspects to form an image profile.

An image entity thus is unitized as a distinct and identifiable digital entity, said unitized image entity having embedded multimedia capabilities, location, security and executable functions that are inherently associated with the image with the added ability to launch the desired multimedia method for rendering and or actuating a desired virtual or physical function. The unitized digital image entities are linked together to form an image network/augmented reality network with the ability to send the selected unitized image entity across a physical network or across one virtual image network/augmented reality network to another and or propagate an entire image network/augmented reality network across a physical network to a mobile device/intelligent electronic glasses/headset, servers and other devices for delivering utility to the user based on device/user profiles. The linking of image entities to form a image network/augmented reality network is relationship based, where the user defines the relationship or the relationship is learnt by software means based on the past user behavior patterns and potential user behavior patterns.

A mobile device/intelligent electronic glasses/headset is enabled in the present disclosure to digitize and unitize an image entity by means of the software/processing power, storage/databases/lookup-tables resident on the mobile device/intelligent electronic glasses/headset and or in conjunction with the software/processing power, storage/databases/lookup-tables resident on the local, central, escrow and or network servers leveraging the high speed wired or wireless connectivity between mobile devices, intelligent electronic glasses and stationary devices. Currently, transmission across a digital network is by means of digital packets. The image entity is composed of digital data packets. However, these packets of digital data have a pre-existing relationship in the form of an image entity that is digitized and unitized. The image entity may be described as a super sized packet of digital data enabling the transmission of image entities efficiently across a network to dynamically construct/deconstruct and switch and rout image entities in an image network/augmented reality network.

Figure 2:
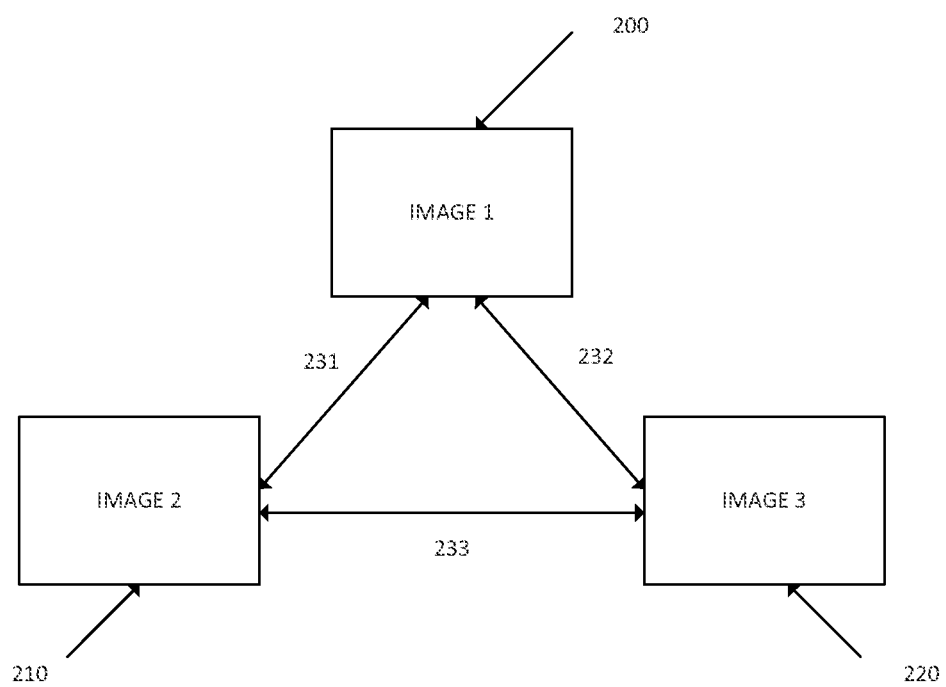

Referring now to FIG. 2 in detail, the image entity 200, the image entity 210 and the image entity 230 form a basic image network/augmented reality network wherein the image entities are virtually connected by means of the relationship 231, 232 and 233. The relationship between image entities is defined and executed in software which is resident on the mobile device/intelligent electronic glasses/headset and or the servers. The relationship data is further stored in lookup-tables for enabling dynamic lookup of a relationship between images for providing efficient routing and delivery of the image and the image profile across an image network/augmented reality network.

Figure 3:
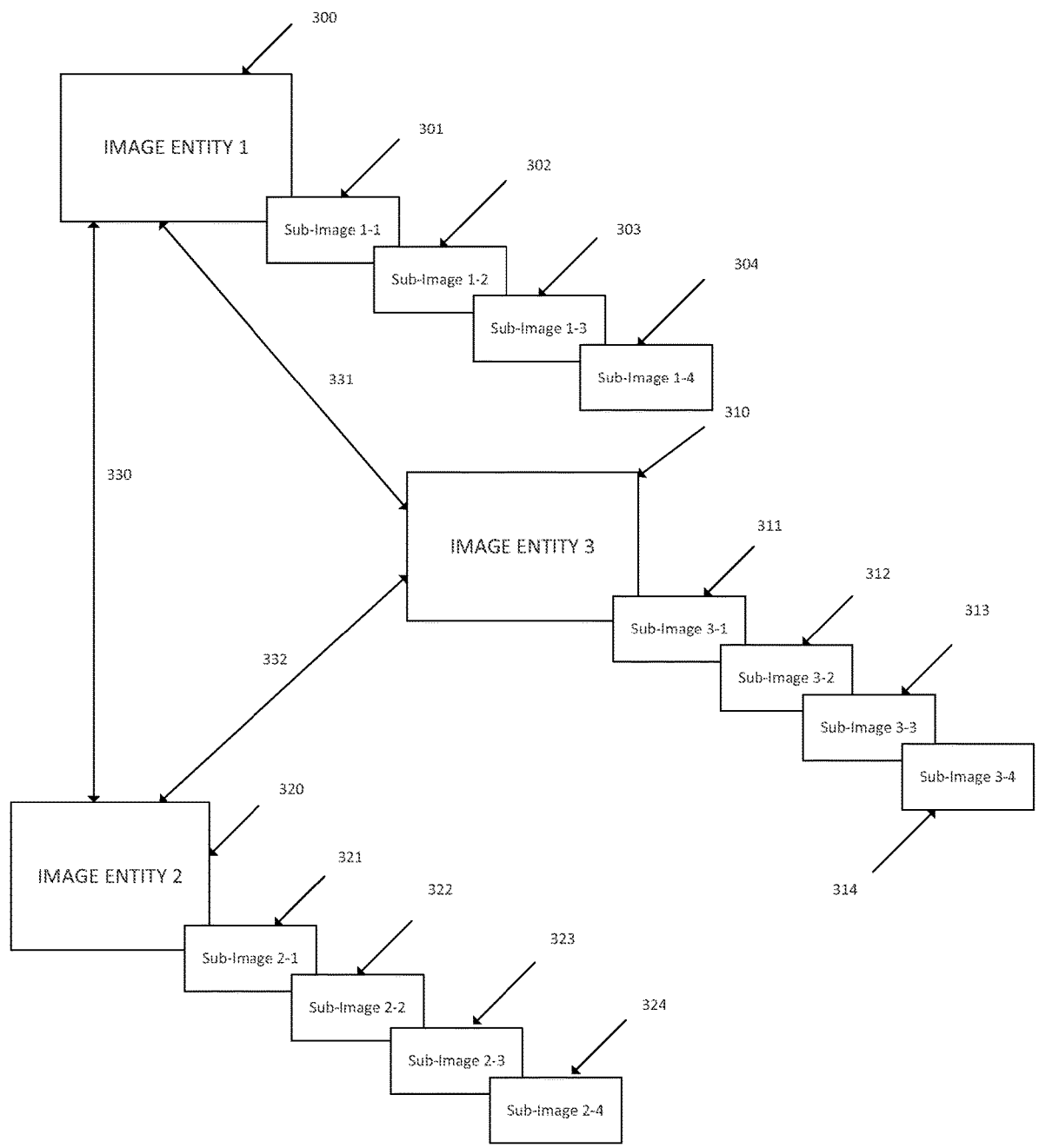

Referring now to FIG. 3 in detail, a plurality of image entities, 300, 310 and 330 comprise an image network/augmented reality network with defined relationships 330, 331 and 332 which describe the detailed and specific relationships between each image entity. The image entity 300 comprises of sub image entities 301, 302, 303, and 304 that share a relationship with each other in addition to the parent image entity 300. The image entity 310 comprises of a set of constituent sub image entities that are labeled as 311, 312, 313, and 314. These sub-image entities share a relationship to portions of the larger image entity 310. The image entity 320 comprises of a set of constituent sub image entities 321, 322, 323, and 324. These sub image entities derive properties from sections of the larger image entity 320 and include certain attributes and parameters that are not explicitly part of image 320.

Figure 4:
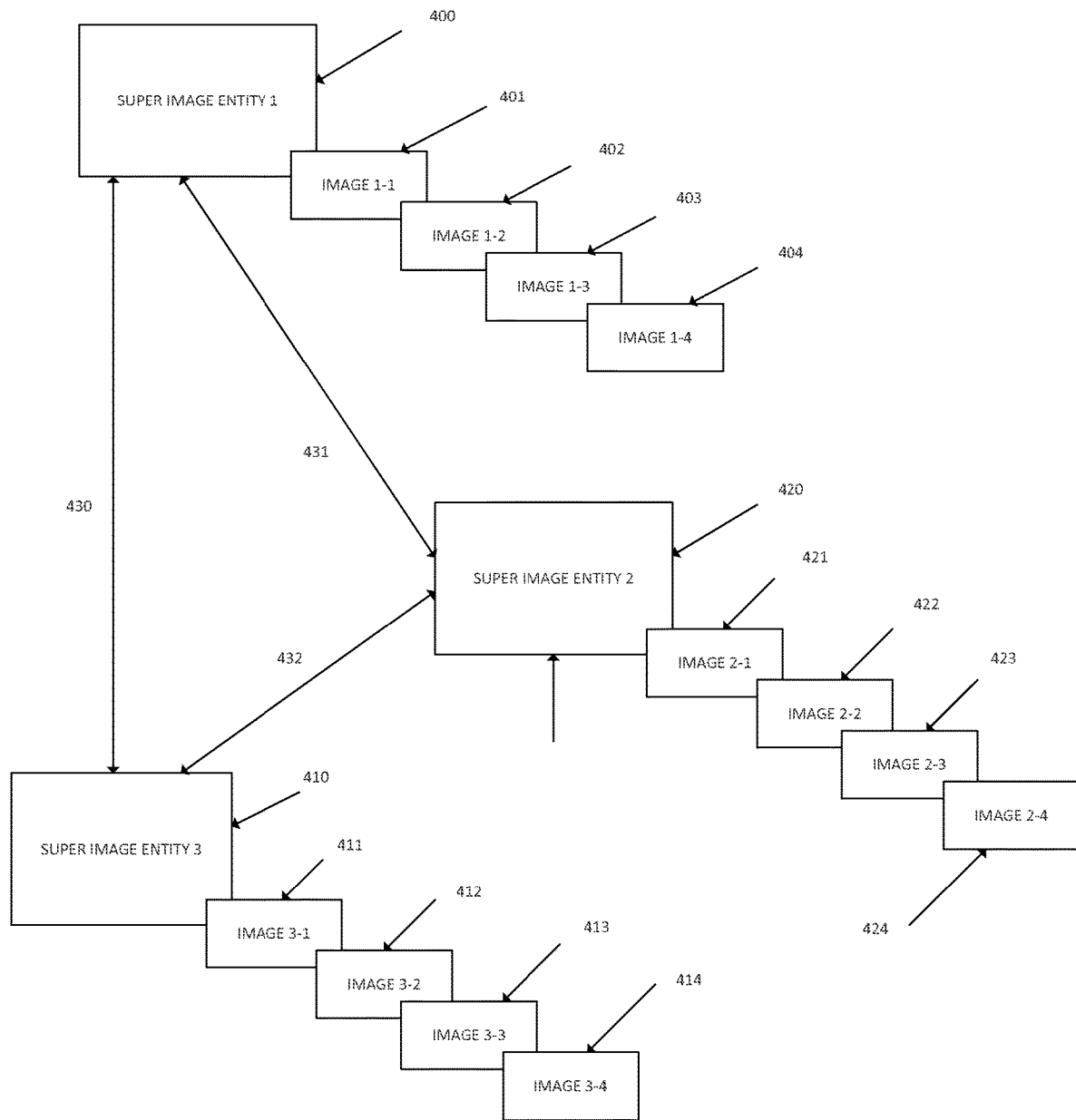

Referring now to FIG. 4 in detail, a plurality of super image entities, 400, 410, 420 comprise an image network/augmented reality network with defined relationships 430, 431, and 432. The super image entity 400 maintains relationships with image entities 401,402,403, and 404. The relationship between image entity 400 and 402 is determined by the relationship between image entity 400 and 401 and the relationship between image entity 401 and 402 and or other combinations. The image entity 420 and 430 may maintain similar or other types of serial, combinational and or hierarchical relationships with their respective constituent images.

Further referring now to both FIG. 3 and FIG. 4, the foregoing architecture, system of organizing and establishing virtual relationships between various super image entities, image entities and sub image entities enables the dynamic construction of highly useful and relevant image network/augmented reality networks. The software for constructing, deconstructing, modifying and enabling of the image network/augmented reality networks may be reside within the mobile device/intelligent electronic glasses/headset and or the servers with specific protocols and complex algorithms being employed using the processing power and data bases of one or more mobile device/intelligent electronic glasses/headsets by itself, in combination and or in conjunction with a local, central, escrow and or network server. The image network/augmented reality network may be transformed or modified automatically, based on device and user profiles and rendered for a specific purpose and or for a specific duration with the desired security levels. The security key for a virtual image network/augmented reality network may be dynamically enabled by a mobile device/intelligent electronic glasses/headset acting alone and or in conjunction with an escrow server.

Figure 5:
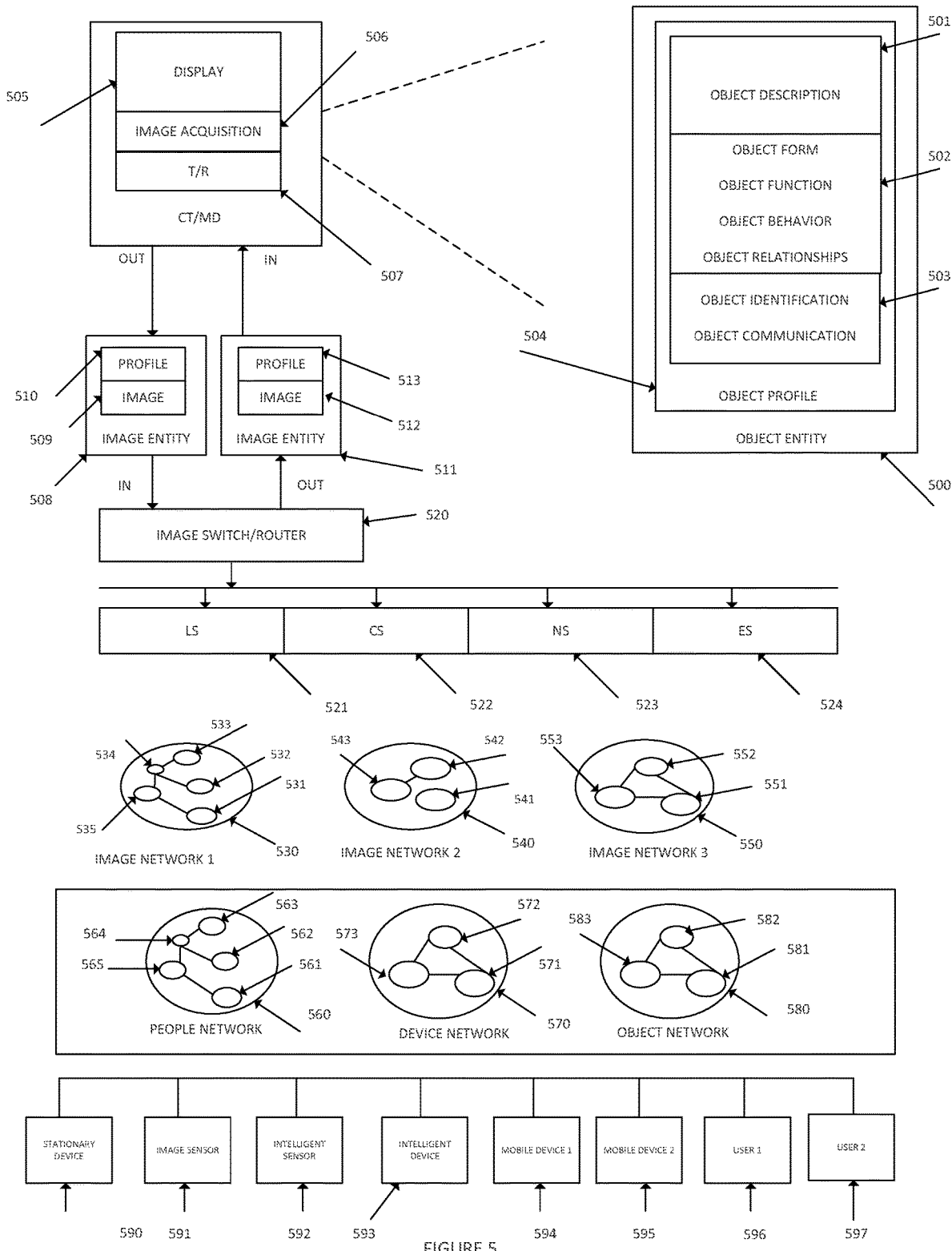

Referring now to FIG. 5 in detail, the mobile device/intelligent electronic glasses/headset represented by the legend CT/MD and comprises of one or more display windows and display types inclusive of a touch screen enabled display 505, an image acquisition unit such as a built in or external camera 506, a transmit/receive unit for enabling wired or wireless communication 507. The mobile device/intelligent electronic glasses/headset acquires the image of an object dynamically and in real time. The object entity 500, describes the object in detail by means of an object profile 504. The object profile comprises of object description 501, object form, object function, object behavior, object relationships together represented as a group 502 and the object identification and object communication together represented as 503. Additionally, the object may be identified by one or more identification methods inclusive of radio frequency enabled tags and embedded chips that enable either one way or two way communication between the object, the mobile device/intelligent electronic glasses/headset and or the servers. Another method of object identification and communication is by sound based methods wherein an audible signal is emitted or received. The RF and or other methods enable specific digital information to be transmitted and or received. The present disclosure enables the integration and intelligent combination of the object identification object profile data rendered in digital form to be associated with an object, object network, an image and an image network/augmented reality network.

Referring once again to FIG. 5 in detail, the mobile device/intelligent electronic glasses/headset is configured to create and output and send by wired or wireless means an image entity 508 comprising of an image 509 and an associated image profile 510. The image entity may be transmitted by wired or wireless means to an image switch/router 520, further processed within the image switch/router and sent across the physical network to a local server 521, central server 522, escrow server 524 and or a network server 523; or to other mobile device/intelligent electronic glasses/headsets 594/user 596 and mobile device/intelligent electronic glasses/headset 595/user 597, stationary device 590, image sensor 591, intelligent sensor 592 and intelligent device 593. The image sensor is enabled for acquiring and transmitting/receiving image providing a real time response to actual image, change in images and other related information wherein the information may be rendered as an image entity by the image switch, the mobile device/intelligent electronic glasses/headset, the servers and or the image sensor itself.

The mobile device/intelligent electronic glasses/headset user by means of the mobile device/intelligent electronic glasses/headset is enabled to dynamically construct and deconstruct various types of image networks/augmented reality networks 530, for the desired utility and associate these networks with a desired user profile and or a mobile device/intelligent electronic glasses/headset profile. The image network/augmented reality network comprises of constituent image entities 531,532,533,534 and 535. Similarly another image network/augmented reality network 540 and 550 may be constructed. Similarly a virtual object network 580 is enabled comprising of related objects and sub objects.

The utility of an image network/augmented reality network is derived when the virtual image network/augmented reality network is accessible by one or more mobile device/intelligent electronic glasses/headsets 573, 572, and 571 comprising a device network 570 which in turn is connected by wired or wireless means to other stationary devices, intelligent devices, intelligent sensors, image sensors, local servers, central servers, escrow servers, and network servers. The physical network formed in this manner enables the innovative software to be deployed at one or more devices/servers providing the means for constructing and implementing image networks/augmented reality networks by leveraging the processing power/databases/lookup-tables at the desired nodes in the physical network and or a combination of nodes in the network.

The utility to one or more individual users 596 and 597 is further enabled when the virtual image network/augmented reality network is the either a preferred or necessary medium of communication between users because of ease of use. Additionally, individuals may form a virtual network of people joined together for a specific purpose such as social networks, professional networks, enterprise networks, family networks, friends networks and other networks. Such virtual people or social networks are represented by 560 with specific individuals and their relationships with each other being represented by 561,562, 563, 564 and 565. Each user in such people or social networks has one or more profiles and is enabled to form multiple people or social networks.

The present disclosure teaches the means for propagating an image entity to a specific device/user and or to a plurality of devices/user enabling the people or social networks to be a viable means for a rich and meaningful communication and interaction. An image entity or a series of image entities may be propagated to the desired devices/users at the desired time and for the desired purpose enabling image network/ augmented reality network based multimedia communication that is relevant in a highly interconnected digital world. Further the image entity is replicated and delivered and placed in specific nodes of one or more people or social networks of a user and or one or more people or social networks of a plurality of users.

Figure 6:
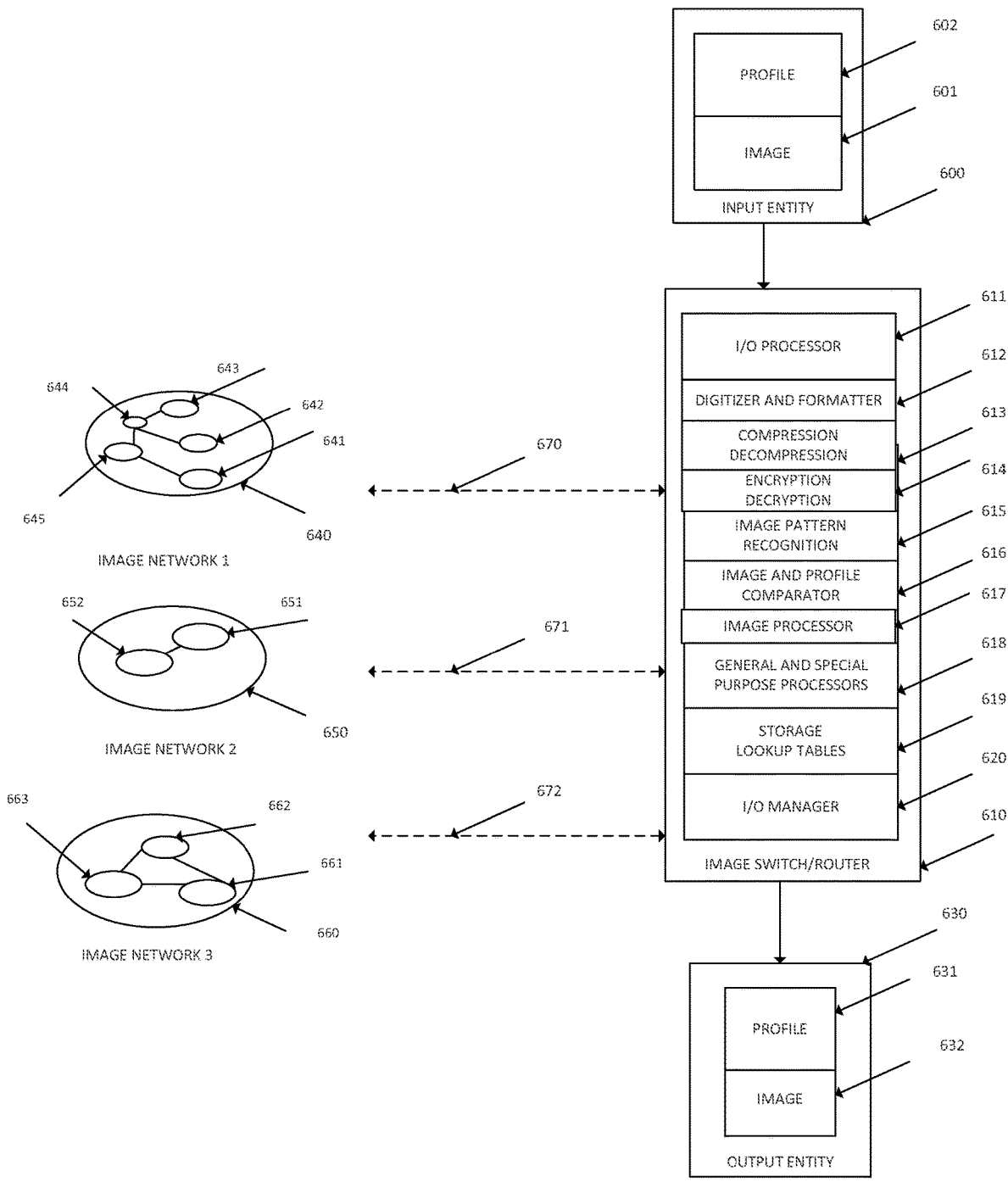
FIG. 6 shows a detailed view of an image switch/router wherein the image switch/router is capable of taking inputs of an image entity and outputting same or a transformed image entity for the construction of and communication with different nodes in an image network/augmented reality network.

Referring now to FIG. 6 in detail, the Image Switch/ Router 610 comprises of an I/O processor, 611 for the processing of image entities as inputs and outputs; a digitizer and formatter 612 to enable the inputs/outputs to be digitized as needed and formatted as needed for further processing/ send/receive/storage. Means for encryption/decryption, 614 of outgoing image entities, wherein each image entity may be encrypted at one or more levels of security and various sub image entities may be encrypted at one or more different levels of security for providing granular security.

The image switch/router further comprising the capability for pattern recognition of images by the image processor, 615, a means for comparison of images and image profiles 616, a general purpose processor and one or more special purpose processors, 618 for processing audio and other digital signals, a means for storage and means for establishing lookup-tables, 619 and an I/O manager for enabling the desired switching and routing across a physical network or the virtual image network/augmented reality network.

The inputs to the image switch/router consist of an image entity, 600 that further comprises of an image, 601 and an image profile, 602. The outputs to the image switch/router consist of an image entity, 630 that further comprises of an image, 631 and an image profile, 632. The foregoing architecture is for illustrative purposes and the novel features of processing an image entity may be executed by software by a single processor and other modifications to form an image switch/router for switching and routing of images in an image network/augmented reality network.

The image network/augmented reality network, 640 comprising of sub image entities 641 through 645; the image network/augmented reality network, 650 comprising of sub image entities 651 through 652 and the image network/ augmented reality network, 660 comprising of sub image entities 661 through 663 are virtual entities that exist on the network at one or more nodes and storage devices. The entire image network/augmented reality network such as 640, 650 and 660 and or a specific image entity within these image individual image network/augmented reality networks may be swapped from one network to another by image switching and routing; and or generally sent across a physical network to a physical device by means of routing tables/protocols 670, 671 and 672.

The novel system of the present disclosure thus enables an image to be linked with its associated profile, the profile further having audio, text, data and other information to form an image entity that is purely digital and virtual; enabling the image entities to be linked together by a user defined relationship to form a virtual image network/augmented reality network which can be propagated across a physical network to a physical device for the desired display format and or further utility to the user based on device profiles and user profiles. The utility may be derived by visual means only and or coupled with other mediums such as voice, text and others since the image entity comprises of such collateral forms of information.

The actuation of the image entity may be executed by a plurality of interface methods to access the specific digital data individually and or in combination inclusive of the capability to launch an application that performs a specific function and or action, said functions and actions being virtually executed and or physically enabled. An example of this is by clicking on an image of a garage door the door may be opened or closed. Another example is the image entity may be associated virtually with another image entity. For example the image of a car, a car whose image is characterized and related to the home owner, that is approaching the garage from the outside may cause the garage door to open, since these two images are linked by a relationship that was previously defined and approved by the user. The garage door was physically opened in this example since the software caused a function to be executed. The behavior can also be learned based on user defined profiles. Thus image based networks of the present disclosure are of great utility and practical applications. An image based network may include still images and video.

Figure 7:
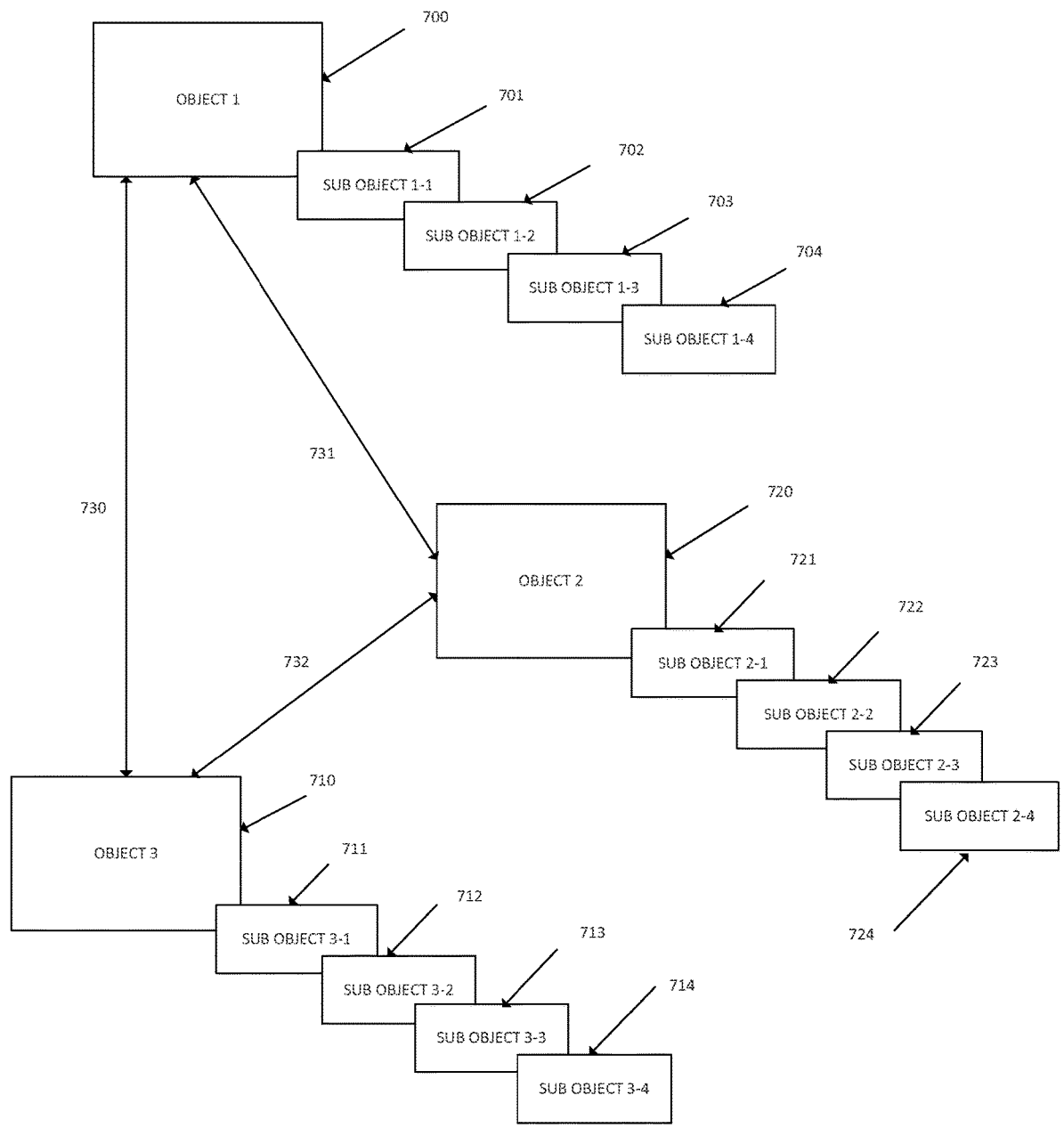
FIG. 7 shows a virtual object network described in software comprising of one or more objects wherein each object has a defined relationship to another. Additionally, each object is related to one or more sub-objects.

Referring now to FIG. 7 in detail, a plurality of objects, 700, 710 and 720 comprise an object network with defined relationships 730, 731 and 732 which describe the detailed and specific relationships between each object. This forms an object network describable in software as an object network. The object when coupled with its associated descriptions, identification, parameters and relationships is defined as an object entity. The object entity 700 comprises of sub object entities 701, 702, 703, and 704 that share a relationship with each other in addition to the parent image entity 700. An example of this is a side chair of a dining table ensemble with four legs wherein the chair and the legs of the chair have a defined relationship that may be described in software as an object sub-network. The image entity 710 comprises of a set of constituent sub object entities that are labeled as 711, 712, 713, and 714. These sub-image entities share a relationship to portions of the larger image entity 710. As an example this object sub-network may represent in software an arm chair within the same dining table-chair group. The image entity 720 comprises of a set of constituent sub image entities 721, 722, 723, and 724. These sub image entities derive properties from sections of the larger image entity 720 and include certain attributes and parameters that are not explicitly part of image 720. The object entities 700, 710 and 720 form an object network that is virtually defined by a software program. The object network may be linked to various real images of the different objects to enable a real visual representation forming a virtual image network/augmented reality network that is of utility as explained elsewhere in the present teaching.

Figure 8:
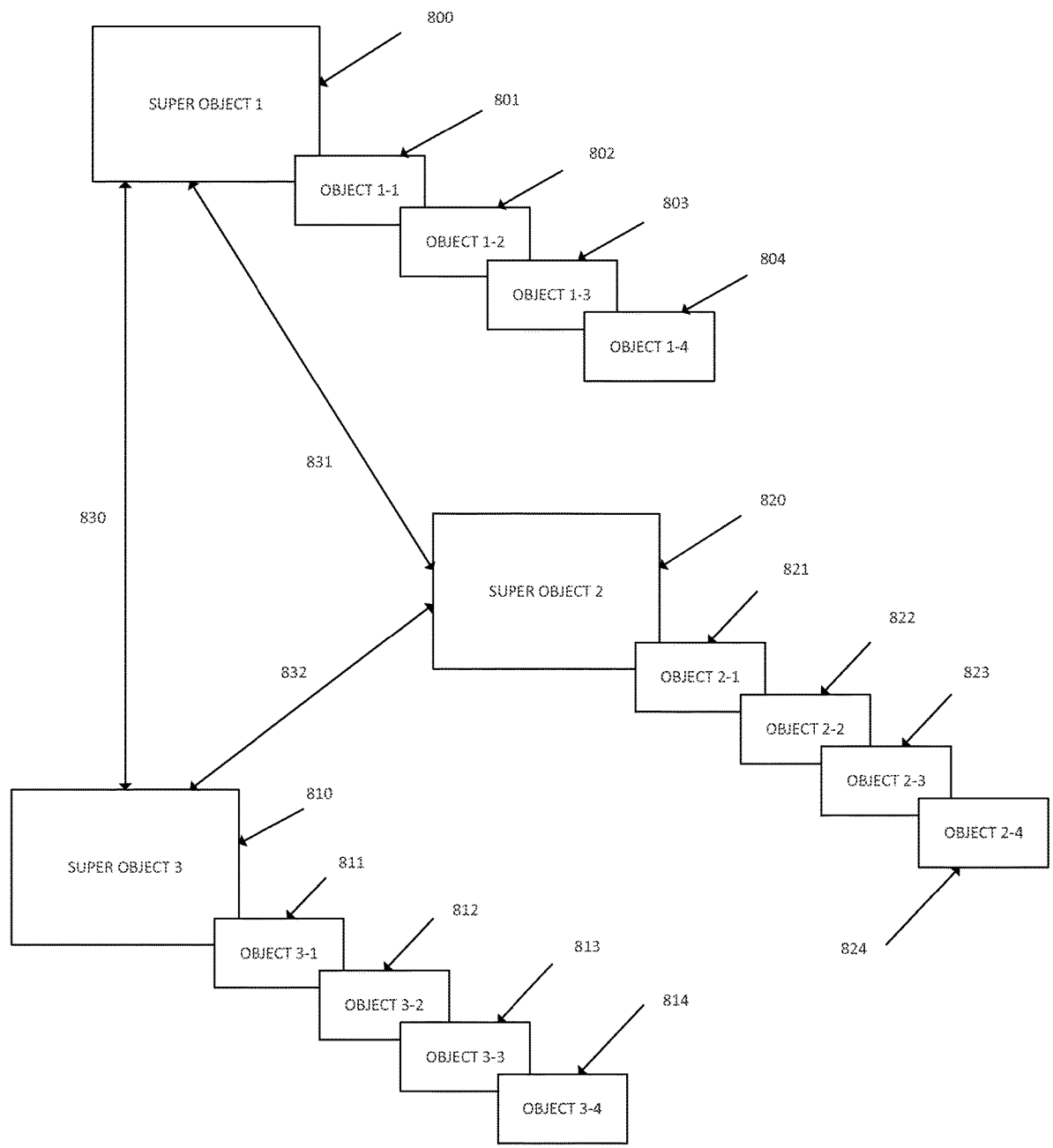
FIG. 8 shows a virtual super object network described in software comprising of a super object that comprises of one or more other but related objects.

Referring now to FIG. 8 in detail, a plurality of super object entities, 800, 810, 820 comprise an object network with defined relationships 830, 831, and 832. The super object entity 800 maintains relationships with object entities 801, 802, 803, and 804. The relationship between object entity 800 and 802 is determined by the relationship between object entity 800 and 801 and the relationship between object entity 801 and 802 and or other combinations. The object 820 and 830 may maintain similar or other types of serial, combinational and or hierarchical relationships with their respective constituent objects.

Further referring now to both FIG. 7 and FIG. 8, the foregoing architecture, system of organizing and establishing virtual relationships between various objects that may be animate or inanimate is of great utility especially when associated with a real image or a virtual computer generated image enabling the user to visualize, design and even actuate the desired function of an object or cause a desired transformation of form and function of a physical object by remote network access means. Ability to establish an intelligent relationship between super object entities, object entities and sub object entities enables the dynamic construction of highly useful and relevant object networks. The software for constructing, deconstructing, modifying and enabling of the object networks may be reside within the mobile device and or the servers with specific protocols and complex algorithms being employed using the processing power and data bases of one or more mobile devices by itself, in combination and or in conjunction with a local, central, escrow and or network server. The object network may be transformed or modified automatically, based on device and user profiles and rendered for a specific purpose and or for a specific duration with the desired security levels. The security key for a virtual object network may be dynamically enabled by a mobile device acting alone and or in conjunction with an escrow server. The object networks may be interrelated with the associated image network/augmented reality network.

Figure 9:
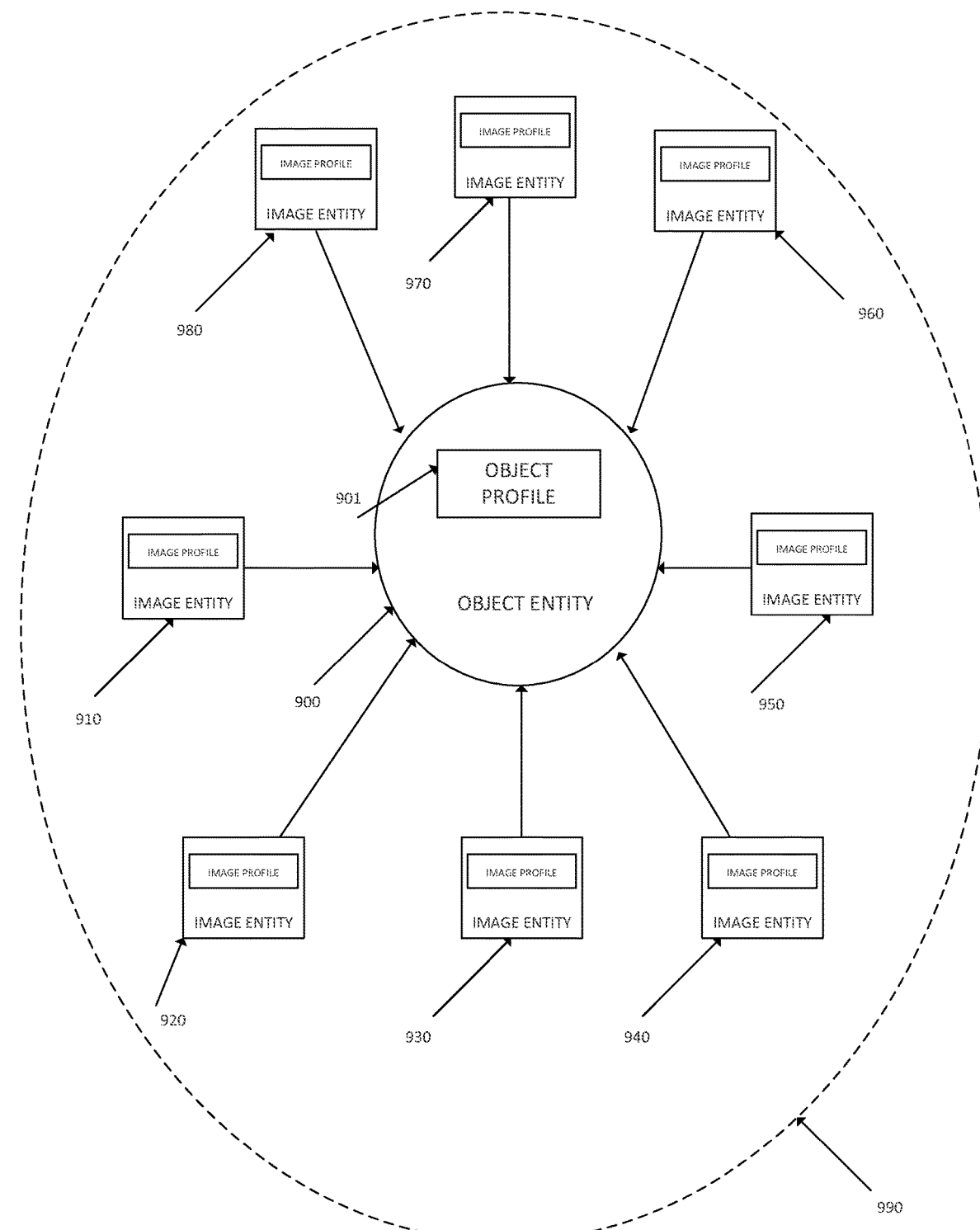
FIG. 9 shows an object entity that is defined as an object with an associated object profile. The figure further shows the 3 dimensional external view of the object, with images being acquired from one or more spherical angles wherein an image entity is generated for each view.

Referring now to FIG. 9 in detail, an object may be viewed from the outside from all 360 degrees of angle to present the best visual representation of its characteristics. At times it is not possible to obtain a full 360 degree view and a visual representation must be rendered by extrapolation means. A mobile device and or other devices may be used for image acquisition for obtaining a full or partial real and visual representation of the object. The object 900 with the associated object profile 901 forms an object entity. The object profile contains detailed information about the object such as object type, object identification by RF tag or other means, object relationships and other relevant information.

The object entity 900 may be viewed by a camera, image sensors or other image acquisition methods from all angles when physically possible to get an image with an associated image profile to form an image entity that best describes the object when viewed from that particular angle or vantage point. The Image entities 910, 920, 930, 940, 950, 960, 970 and 980 represent the view from different angles. The representation is intended to be 3D spherical and not two dimensional.

Example of an object that may be viewed from the outside is a home. In the event the full view from all angles is not possible due to lack of access, then it is possible by software means to extrapolate using various algorithms to render an image that is most representative. The ability to generate image entities with a mobile device and or other means is enabled, to represent an object and construct an object network and or an image network/augmented reality network. The image network/augmented reality network is represented as 990 showing an image network/augmented reality network of all the images thus generated with their respective image profiles.

Figure 10:
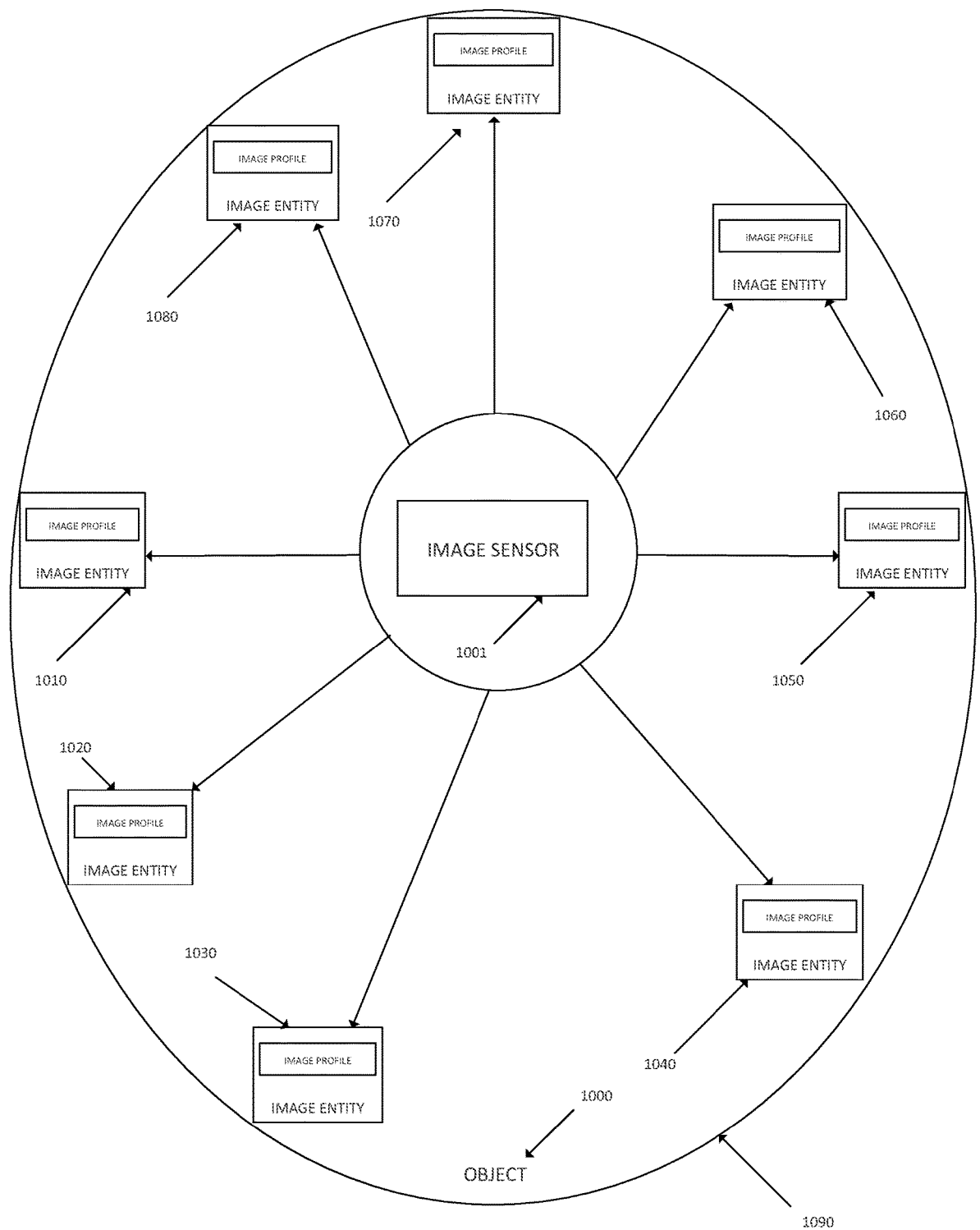
FIG. 10 shows the view of an object from an internal to the object perspective. The image sensor located internal to the object generates one or more image entities to form a image network/augmented reality network that establishes a relationship that best describes the object.

Referring now to FIG. 10 in detail, an object may be viewed from the inside from all 360 degrees of angle to present the best visual representation of its characteristics. At times it is not possible to obtain a full 360 degree view and a visual representation must be rendered by extrapolation means. A mobile device, image sensor and or other devices may be used for image acquisition for obtaining a full or partial real and visual representation of the object. The object 1000 with the associated object profile forms a super object entity that is being represented from the inside. The mobile device, image sensor and or other means for image acquisition is represented by 1001.

The object entity 1000 may be viewed by a camera, image sensor or other image acquisition methods from all angles when physically possible, to get an image with an associated image profile to form an image entity that best describes the object when viewed from that particular inside angle or vantage point. The Image entities 1010, 1020, 1030, 1040, 1050, 1060, 1070 and 1080 represent the view from different angles. The representation is intended to be 3D spherical and not two dimensional. The image network/augmented reality network image network is represented as 1090 showing an image network/augmented reality network/augmented reality network of all the images thus generated from the inside with their respective image profiles.

The image network/augmented reality networks generated from the inside and or the outside represent the object enabling these virtual image network/augmented reality networks to be stored, further processed or sent to the desired mobile device, stationary device and or the servers in a physical network. The ability to construct/deconstruct/modify/store and generally render the image network/augmented reality networks to be useful is enabled by means of the mobile device acting by itself and or in conjunction with other mobile devices/intelligent electronic glasses/headset, sensors and servers leveraging the software, processing power, storage, databases, lookup-tables and wired or wireless connectivity in a desired manner by the user at the desired node in a physical network. The image acquisition may be means of light in any wavelength, by sound, by electromagnetic means such as RF and other methods.

Each physical object and subsets of an object may be uniquely identified and represented by a plurality of characteristics, relationships and behavior patterns. The identification of an object and or subsets of an object may be by attached or embedded RF tags or chips wherein the tags and chips contain the relevant information such as form, function, colors, size, relationships and other parameters. Additionally sound based methods may be used for location determination in an environment. Location may be determined by GPS, global positioning means. The ability to time stamp and location stamp the original object entity definition coupled with the precise location and time of the construction of an object network is enabled. The objects transmit/receive data by means of the communication tags/chips enabling the data to be characterized and enabling placement of the object entity in a virtual object network. The construction, deconstruction, modification and storage of the object network is also time stamped, location stamped and author stamped by software means. Similarly, the original definition of the virtual image entity is, author, time and location stamped by software means. The placement of each image entity in a virtual image network/augmented reality network is also author, time and location stamped by software means enabling the discovery trail of one or more actions. The construction, deconstruction, modification and storage of the image network/augmented reality network is also time stamped, location stamped and author stamped by software means.

The object may be defined as an object entity with a plurality of object profiles or no object profile. The object network may be defined with a plurality of object network profiles or no object network profiles. The image may be defined as an image entity with a plurality of image profiles or no image profile. The image network/augmented reality network may be defined with a plurality of image network/augmented reality network profiles or no image network/augmented reality network profiles. The foregoing teaches the means for object and image network/augmented reality networks to be enabled dynamically and in real time.

Figure 11:
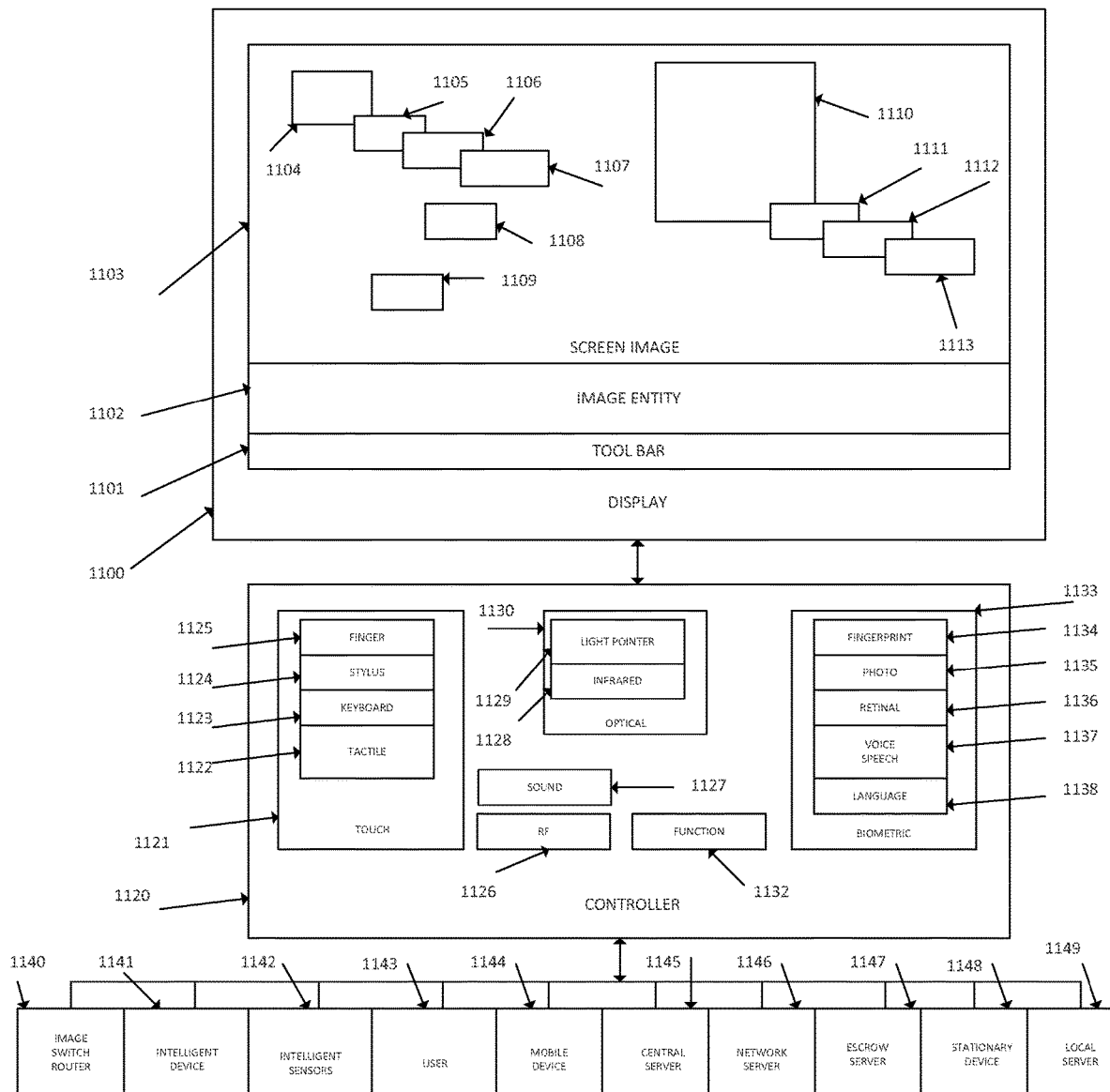
FIG. 11 shows a network composed of mobile device/intelligent electronic glasses/headsets/users, local, central, network and escrow servers, image switch router, a controller that enables actuation and functionality by a plurality of interface methods, and a touch screen or non touch screen display that comprises of a tool bar. Various image entities are enabled for display.

Referring now to FIG. 11 in detail, the physical network located locally or on an extended network or the Internet with wired or wireless communication capabilities comprises of an Image switch router 1140 for enabling the switching and routing of image entities and image network/augmented reality networks, a intelligent device 1141 such as a TV and other devices, a intelligent sensor 1142 for sensing and transmitting/receiving one or more conditions such as images, temperature, radiation levels and other conditions, one or mobile devices 1144, one or more users 1143, central server 1145, network server 1146, escrow server 1147, stationary device 1148 and local server 1149.

The controller 1120 may be a remote controller or a mobile device/intelligent electronic glasses/headset that performs the additional functions of the controller in an image network/augmented reality network and or a standard non image network/augmented reality network. The mobile device/intelligent electronic glasses/headset may be configured to perform the functions of a controller 1120 by itself and or in conjunction with the processing power of the local, central, escrow, the network server and the image switch/router. Alternately some or all of the functions of the controller may be incorporated in one or more devices and the display. The controller comprises of different types of actuation, command, control and function enabling features and serves as a means for interfacing with one or more devices, servers and the display. The controller function may be embedded in a mobile device/intelligent electronic glasses/headset.

One type of interface is by means of touch 1121 further comprising of tactile 1122, keyboard 1123, pen or stylus 1124, and finger 1125. Another type of interface may be by optical means 130 inclusive of light pointer 1129, infrared 1128 and other types of laser and optical methods, wherein the act of pointing at an image activates the image entity and launches an application. Other gesture level controls may be created and mapped to functions. In addition another interface means is sound based 1127 by one or more methods. Another type of interface and command and control is by RF means, 1126. The image entity or the image network/augmented reality network is enabled to execute certain desired functions by the appropriate command and control interface methods by means of the function selector 1132.

The biometric command, control and authentication features 1133 are enabled by means of fingerprint 1134, photo identification 1135, retinal scan means 1136 and speech/voice recognition means 1137 with language translation 1138. The controller function is enabled by wired or wireless methods of communication. The controller enables a high degree of personalization to the profiles of different devices and users with the added capability for behavior modeling and response by means of the processing capability of the controller by itself and or in conjunction with a local, central, escrow and network server. The escrow server or the central server performs trusted authentication for a desired action or activity related to any network or any function thus providing a high level of security to the user and the integrity of the network.

The display 1100 may be a standard non touch screen display such a CRT, plasma, LCD or other methods. The display may be touch screen enabled. The display may be integrated into a lens of a intelligent electronic glasses. The display may be a small display with high resolution that is may be placed in front of one or two eyes. The display may comprise of one or more physical or virtual display areas for the desired utility. Different windows are enabled within the display of same or different types of interface. These windows may be dynamically updated by the glasses, other mobile devices, or servers.

The display is part of the physical network enabled for communication by wired or wireless means with other devices. In another novel embodiment of the present disclosure, the display is configured with one or more processors, storage, databases, lookup-tables and software to enable dynamic adjustments of the entire display area and or the adjustments of any localized area down to the pixel level for delivering images, image networks/augmented reality networks and video to the personalized viewing preference of the user.

In another novel embodiment of the present disclosure, the display configuration and settings may be learned to the behavior patterns of the user for a specific type of image, image network/augmented reality networks and video. In another embodiment of the present disclosure the spatial distortions across the display area, the aberrations in color and intensity of different images is also dynamically managed by local processing within the display and or in conjunction with the tremendous processing power of one or more servers. These features are dynamically and in real time enabled by means of the software, processing power, storage, databases and lookup-tables resident on the display itself and or in conjunction with the software, processing power, storage, databases and lookup-tables resident on the mobile device/intelligent electronic glasses/headset, controller, local, central, escrow and or network server.

Referring to FIG. 11 in detail once again, the display area is configured with an optional tool bar 1101. The tool bar is actuated by one or more interface methods as described with reference to the controller 1120. The tool bar as an example may be activated by voice, speech, light pointer, touch and other means as preferred and selected by the user for close-up or remote activation by means of the controller, mobile device/intelligent electronic glasses/headset or another device. The tool bar is enabled to launch and activate one or more applications such as show an image, play video, audio, music and or launch a command and control function such as see what is in the refrigerator and display the contents of the networked intelligent refrigerator or other intelligent devices. The tool bar is further enabled to launch one or more functions to access web servers located on the Internet and or servers located on the Intranet, for surfing, content and or other activities. The tool bar is capable of performing the functions of a traditional Internet browser of the prior art and other enhanced functions and being activated by multimedia command and control features.

The display configuration described in the embodiment of the present disclosure is all digital communication and processing enabled and relates to mobile device/intelligent electronic glasses/headsets and also stationary intelligent devices such as a Television or a monitor to provide a very high definition and high fidelity multimedia experience.

Referring to FIG. 11 once more in detail, the images and their associated image profiles form an image entity rendered digitally as a unique entity. The display is configured to show a series of images only or image entities separately or as an image network/augmented reality network. As an example the entire display area is denoted by the image entity 1102, and the actual image being displayed is denoted by Screen image 1103. The viewer sees the super image which gets updated periodically with another super image at the desired rate for best visual experience. The visual experience is formed by viewing a series of super images that are refreshed and updated at an optimal frequency. As an example the image entity 1104 comprises of a series of sub image entities 1105, 1106 and 1107 with a defined relationship to the image entity 1104. The image entities 1108 and 1109 are shown separately as being part of screen image 1103. Another super image entity 1110 comprising of image entities and sub image entities 1111, 1112 and 113 are shown. These features are shown for illustrative purpose whereas in reality the screen image is comprised of a large number of image entities of varying sizes and characteristics with a defined relationship to each other and another defined relationship to the screen image. These images are dynamically rendered, delivered, modified and updated to deliver the best screen image. The screen image is by this means configured as a image network/augmented reality network that gets updated at the desired periodicity. The control over the viewing experience is achieved by enabling granular control over image entities in this image network/augmented reality network wherein the image entities may also be updated at the desired periodicity or desired attributes. This feature enables the screen image or portions of the screen image to be dynamically tuned for the preferences of the user. The granular control of delivering image entities efficiently makes the quality superior. Additionally, the image entities may be modified to fit the desires and viewing experience of the user. The ability to do these transformations in real time is enabled by means of the software, processing power, databases and lookup-tables resident within the display and or in conjunction with the software, processing power, databases and lookup-tables resident within the controller, mobile device/intelligent electronic glasses/headset, to provide a high quality multimedia viewing experience. Additionally functions and applications may be launched by touching and or pointing at certain images and or the entire screen. Additionally the touch and or pointer and or other means of activation is enabled to show relationships to the image in the form of text, voice and other attributes related to that specific image or subsets of the image or the entire screen.

Referring now to FIG. 12, the camera and display may be integrated into an intelligent electronic glasses 1201. The glasses may be in communication a mobile device 1202 and cloud servers 1203 for local or network processing. The glasses may be enabled with a projector 1204, a front facing camera 1205, lens 1206, and laser 1207. The projector 1204 may project an image such as a keyboard or dialpad 1209 on to a surface including a hand 1208. The camera 1205 or laser 1207 may track the movement of another object such as a finger 1210 to determine where the contact was made with the surface of the hand. Multiple communication paths between the devices may be enabled as in 1211, 1212, and 1213 using WiFi access points, Cellular towers, or other communication links. A plurality of antennas 1214 may be integrated into the frame or other aspects of the glasses. Processors, wireless radios, and sensors may be integrated into a common housing built-in or attachable/detachable from the glasses. A display may be added to the housing 1215 that is rotatable and position-able in front of the lens 1206. Alternatively the housing 1215 may be positioned on the side frame and rotated in front of the lens 1206. The glasses may be customized with various frames and brand names. The smartphone 1202 may further provide the same functions as the glasses when integrated with a projector and camera or laser.

Referring now to FIG. 13, a watch 1301 with a projector 1302, display 1303, camera 1304, second camera 1305, antenna 1306, laser 1307, and radio may be used to project a keyboard image onto a surface including a hand 1308 and capture interaction with the projected item. Alternatively, a smartphone 1311 with a projector 1312, display 1313, camera 1314, antenna 1315, laser 1316, second camera 1317, and wireless radio may be used to project onto a surface including a hand 1308 and capture interaction with the projected item. The projected items may include keyboards. The projection may be done after recognizing areas of the surface such as the palm 1309 and fingers 1310. The projected characters may be updated as actions are taken on the hand. For example, as digits are entered the telephone number to call may be displayed progressively. A second camera on the device such as 1305, 1317 may be used for eyetracking purposes to further capture the focus area of the eye and map that to the specific coordinates of the projected item on the surface. Multiple cameras or lasers may be used in conjunction to improve the fidelity including components available on intelligent electronic glasses 1318 if available. In addition, the local processing power of proximate devices 1301, 1311, 1318 or cloud based servers 1319 may be used for image recognition. The actions may further result in API calls, two way communication and other data updates between the local devices 1301, 1311, 1318 and servers 1319.

Referring now to FIG. 14, a pair of glasses 1401 is configured with a display 1402 integrated into the lens 1403, a camera 1404, and microphone 1405. The lens 1403 is split in two areas. The top area is a traditional see through glass, a prescription glass, clear plastic, or other material used for lenses. The bottom area 1402 is a display integrated into the lens 1403. This allows an individual to look without obstruction through the top part of the lens and look at digital content in the bottom half of the lens 1402. This bifocal lens, trifocal, or nth-focal lens approach may be in one or both lens. The lens 1403 may be removed from the frame 1407.

A different format for the glasses is displayed in 1408. These glasses have a camera 1407 and a LCD, LED, high zoom, or other type of display 1408. This display may be of varying sizes such as a square 1 inch by 1 inch display, longer widescreen display, or smaller or larger displays. The display 1408 may be fastened to a 1409 band, frame plastic item or another material and further connected to the frame 1411 of the glasses or wrapped around the ear or neck of an individual. The band may contain additional electronics 1410 including a processor, memory, antenna, battery, and wireless transmit and receive radios and control the display 1408. This approach may allow a traditional pair of glasses to be retrofitted with intelligent electronics. Items 1407, 1408, 1409, 1410 may be built-in to the glasses or detachable from the glasses. Alternatively, items 1407, 1408, 1409, 1410 may be used as a headset and without the glasses.

Still referring to FIG. 14, a keyboard, keypad, image, icons, or other items may be virtually placed on to a surface such as a hand. In this instance, the keypad is not physically projected onto the hand. Instead the keyboard is superimposed or placed on top of a surface currently being viewed. In this case, they keyboard or keypad 1412 is superimposed onto a persons hand. Various arrangements may be configured such as placing numbers on specific fingers or placing numbers on the palm. A person may interact with the hand by using a finger or other item, to make contact with the virtual image on a physical hand or virtual hand. The physical hand may be useful to a viewer since it allows the viewer a surface for tactile feedback. However, the physical hand is not needed to type since gestures and contact with the virtual images in the display may serve as a contact or actuation of a specific area. The camera 1407 or a laser 1414 may track the hand movement to appropriate capture the selection of the virtual items. This approach further enables privacy since the actual keyboard is not show. The content may be displayed though on another display such as the miniaturized display 1413 or on a mobile device, smartphone, or remote server. A microphone 1414 may continuous capture sound that is recorded in the memory or streamed to a remote server. A speaker may be positioned in the ear and/or external to the headset.

Referring to FIG. 15, shows an intelligent electronic glasses 1501 with a front facing digital still or video camera 1502, side facing camera 1503, second side facing camera 1504, and a lens 1505 and a display 1506 layered on top of the lens 1505. A standard table 1507 may be made into an intelligent surface with the intelligent electronic glasses 1501. The augmented information is displayed on the table top. The cameras 1502, 1503, and 1504 capture the gestures of a person's finger and map the actions to the contact areas of the augmented images. Various actions can be made including actions that involve Internet resources and servers. This may be applied to restaurants where individuals may access a menu and message a waiter. The device may act in a standalone capacity by communicating directly with servers using a built-in wireless radio and antenna.

Referring now to FIG. 16, a room may be configured with a camera 1601, projector 1602, laser 1603, and lights 1604; all of these objects may be mounted on a wall floor or other surface. These items may each be wirelessly enabled and addressable over Internet Protocol with an IP address. A local or network control server 1605 may control the functions of the device including the on/off state. The control server 1605 may be accessed using a mobile device/intelligent electronic glasses/headset. A media or game server 1606 may be enabled to send content wirelessly or using an HDMI or other wired cable to the projector, mobile devices, intelligent electronic glasses or headset. This content may in turn be projected on to the table top if the table top is non-touch enabled.

Alternatively, the table top may be enabled with a touch screen display, wireless transmit and receive radio, camera, and other electronics. Projected content may be positioned on the table and allow for games, Internet content, and actions to be actuated by touching the area of the table. For game play, players may be able to animate their moves such that hand movement produces trails of movement similar to dust in the air or slow motion movement so that others can follow the gesture. Each player may be recognized by the image of their hand 1609. Alternatively, content such as images acquired during the day from a mobile device or intelligent electronic glasses or headset and posted to a social network server 1607 may be displayed on the table 1600. The lights 1604 and speaker may be synchronized to the digital media including video, images and audio. The digital media may be streamed from a media server 1606. These activities may be applicable to home theaters, bars, restaurants, and other locations. The functions described may also be enabled by a mobile device if appropriately positioned around a table.

Referring now to FIG. 17, a view from the inside of the glasses 1701 is shown. The display 1702 may be configured to show black and white, color, grayscale images, videos, and text. The glasses 1701 are able to access local content available on a proximate mobile device and distant content available on network or Internet servers. Various notification services are available that automatically update specific areas of the display 1703. For example, weather changes may automatically be updated on the display. Alternatively, activity feeds from social networks 1704 may additionally be available. The device may further be display may further provide related data such as recent call history and calendar appointments. In a fully standalone mode, the intelligent electronic glasses may function as a cellular telephone. In a paired mode, the intelligent electronic glasses may function in collaboration with a mobile device including a cellular telephone. In this instance the intelligent electronic glasses requests specific data from the mobile device using an API and communication protocol such as Bluetooth or WiFi.

The glasses 1701 may further be enabled with a microphone. The audio captured from the microphone may be automatically converted from spoken audio to text using the processing power resident on the intelligent electronic glasses, a mobile device, or a local or network server. The text of the audio conversation may be shown as translated in the display. This may be valuable for individuals that are hearing impaired. Further, as words are translated, content may be dynamically searched on the Internet or another server to provide related information to the spoken audio. This search and relation may be performed automatically or manually and may be predicted using behavioral models. These behavioral models may suggest related conversation topics or perform internet searches during the conversation. For example, when a new person is encountered, the audio system may recognize the voice of the person or the camera may recognize the face of an individual and identify the person using a database located on a social network. Further, the device may automatically search keywords from the conversation and present results in the display 1705. A user may browse the internet and use spoken commands to control the display. Various commands may be available in one or more toolbars 1703 and 1706. Content in the display may further be updated dynamically based on the context including location.

Referring now to FIG. 18, is the back side of the intelligent electronic glasses 1801. The glasses 1801 may be configured with a rear view camera 1802 that captures video and images behind the glasses. A side camera 1803 may capture peripheral imagery. These images and video may be combined together to provide 3D and 360 degree video experiences for future playback. The rear camera 1802 may further be used so that an individual need not look behind themselves to see what is occurring.

The glasses may further be used in a shopping experience. Offers and coupons may appear in the display 1805, 1806, and 1807. Advertisers may bid on space on the lens in real time using real time bidding exchanges and platforms. Advertisers may also make bids to offer discounts, deals, and coupons based on the location of the glasses and the object being viewed. In FIG. 18, an ice cream cone is being viewed in the glasses. The price of the product may appear in the left display 1805. A competing offer from a related vendor may appear in the bottom right display 1806. Alternatively, a camera may capture an image of a book, send the image to a local or network server for processing, and the server in turn may return data and meta data about the book including price comparison shopping data. This meta information may be viewable on the display or projected. A person may purchase the book using a mobile device or the intelligent electronic glasses or headset using the display or spoken audio commands.

Referring now to FIG. 19, a mobile device or intelligent electronic glasses may stream content to a television or other display. Content may be streamed directly from the mobile device or glasses 1901. The content may also be streamed to a remote person or server. In another instance, content may be displayed on a television or streamed from a television server to a variety of devices. When content is displayed on a television, a person may view the content through the glasses unobstructed. The glasses 1901 may record the displayed content and send the content to a remote person 1903 to view the displayed content on the television. The remote person may view the content in a web browser or television or mobile device or intelligent electronic glasses. The remote person 1903 may further stream content to a local person's glasses 1904 and the local person can stream the content to the television 1902. The television may be a smart television, 3D television, projector and screen. Alternatively, interactive content related to the viewing experience may be displayed in the glasses 1901. Marketers may wish to provide additional information about the cast and crew of a television show for example. Alternatively, marketers may wish to track the advertising effectiveness of campaigns. The glasses may provide an inward facing camera that can track eye movement and focus to provide better reporting on whether ads were viewed. Participants may opt-in to this tracking and receive promotions and related discounts.

Referring now to FIG. 20, an intelligent electronic glasses 2001 or a mobile device 2002 may capture video and images of an object such as a house 2003 using a camera or cameras. This digital content may be processed locally on the intelligent electronic glasses 2001 or mobile device 2002. Certain intelligent electronic glasses 2001 may not have robust processing capabilities. In this instance the glasses will send content or stream content wirelessly to the mobile device 2002 or a cloud server 2004. Related content may appear in the display of the mobile device including price and commerce related information 2005. Alternatively, the content may be made into spoken audio and played in an in-ear speaker 2006.

Referring now to FIG. 21, the cameras on the mobile device 2101 or intelligent electronic device 2100 may function in daylight and night time. The devices may be fitted with various computer vision capabilities and night vision capabilities. Various filters and polarizations may be implemented in software or hardware to alter the images.

Referring now to FIG. 22, the mobile devices/intelligent electronic glasses/headset may be used in multiparty conferencing. In this instance only person A, 2201, is wearing intelligent electronic glasses. Person A 2201 is in communication with a remote person D 2202. The images obtained from the camera on Person A 2201's glasses capture the audio, video, images and expressions of Person B and Person C. This data is transmitted wirelessly to Person D 2202. Person D is then enabled to participate in the conference by speaking and transmitting spoken audio to the glasses of Person A 2201. The audio may then be emitted from the speakerphone on Person A 2201's glasses. Alternatively, the audio may be only played for Person A 2201. This latter scenario may be useful if Person A 2201 and Person D 2202 are in a special private collaboration relationship. This may occur when multiple people from different organizations join together for a conference.

Referring now to FIG. 23, all participants, persons A, B, C, and D are wearing glasses. A remote person D 2302 may rotate into the vantage point or view point of Person A, B or C. This may allow for enhanced collaboration as each person can better view the expressions and emotional states of each other. Alternatively, Person D 2302 may view all participants simultaneously on one screen 2303. The rotation into another vantage point of a person may enabled for recording movies in addition to conference collaborations. As an example, actors may wear cameras that record each seen from each actor's view point. During the viewing experience, viewers may switch into the vantage points of different characters to have uniquely different movie experiences.

Referring now to FIG. 24, various digital notes and digital comments 2400 may be saved and associated with objects. These notes may be specific to visible to specific users based on authentication and access control lists. Notes may have a certain time to live and expire based on actions completed or time completed. An physical environment with digital notes may be saved, edited, or deleted. An individual may capture an image of an object using a mobile device/intelligent electronic glasses/headset, tap an the object on the display screen, and write or speak notes regarding the object. A person may view the environment using the display of a mobile device/intelligent electronic glasses/headset as part of an augmented reality view. Each object may be identified using image recognition software. Alternatively, labels or bar code images may be affixed physically to each object and then mapped in a table. Comments may be geofenced to particular GPS areas or regions. Each object may have various macros and functions associated with them. As an example, a milk object may be imaged for an expiration date automatically. A wine object 2401 may be locked for consumption by individuals over 21 years of age. A camera in a room may track the consumption of the object. An alert may be sent to an owner if the object is consumed. An individual may be identified using location, audio, retinal recognition, or facial recognition. Appliances 2402 may be locked physically based on the person in a room. If the appliance is recognizes an individual or is notified of a specific criteria, the door may be locked. As an example, a family that wishes to prevent children from eating too much ice cream may set a configuration to lock the fridge door if the person in the room is a child between certain hours of the day. The child may be imaged by a camera on the refrigerator 2402.

Referring now to FIG. 25, a camera affixed to a mobile device 2500 or intelligent electronic glasses 2501 may be used in conjunction. Various objects in the distance such as stars 2502 may be identified by a telescope lens. Alternatively, nearby objects may be identified by a microscopic lens. The information obtained from a camera may be show on a display such as the display on a CT/MD.

Referring now to FIG. 26, cameras may be affixed to a number of items including shoes. The camera may image various items. An intelligent electronic glasses may be configured using a toolbar or a software application resident on a mobile device to substitute various images. For example, certain objects such as pine trees may be substituted with palm trees in the display. A remote database of related images may be accessed. Alternatively, a search engine may be used.

Referring now to FIG. 27, a camera 2700 may capture real world content which may be displayed in a mobile device/intelligent electronic glasses/headset 2701. This content may be modified in real time. As an example, when an individual is viewing content including a person 2702 wearing brand A shirt is seen, the image or video displayed may be altered to show brand B. Other factors such as shirt color or physique may be modified. These modifications may be based on user preferences. Alternatively, advertisers may bid for certain people's viewing experiences or to replace certain brands with other brands.

Referring now to FIG. 28, a camera 2800 may be used in a driving context. The camera 2800 may be integrated into the car, affixed to the car, integrated into the intelligent electronic glasses, or part of a mobile device. Multiple cameras may be used. The digital content obtained from the camera may be processed by a integrated car electronics or server or on the mobile device/intelligent electronic glasses/headset. The car may be enabled with a heads up display or other projected content for images and processed content to appear on the windshield 2801 of the vehicle. Alternatively, content may appear in the lens of the glasses or the display of the mobile device 2802.

A driver may be able to interact with various touch screen controls in the vehicle. Alternatively, the user may control the on-board electronics using gestures or the CT/MD or spoken audio commands. These spoken commands may include control of the A/C and other on-board features. Content may be streamed directly from the mobile device to the windshield display. The windshield 2801 may further feature ads from nearby businesses. A video conference may be held and positioned in a separate area of the windshield such as 2807 to allow for in vehicle conversations that allow the driver to focus on the road. Alternatively, the car may be set into a self-driving mode where an onboard driving computer or the mobile device controls functions of the car including speed 2808, acceleration, braking, steering 2809, and vehicle maintenance. Cars may be enabled with remote vehicle control where a server can control all the functions of the car.

Still referring to FIG. 28, the roadway may be imaged and scanned by one or more cameras for potential hazards, traffic data, or other purposes. The hazards and traffic information may appear in a selected area 2803 of the windshield 2801. The traffic information may further be sent to a maps, traffic, or location tracking server 2804. The GPS system and navigation system may be used from the car, mobile device, glasses, or headset. The cameras may also send data to a crowd-sourced traffic and mapping data base to improve maps of roadways. The driver, license plate, make, and model of the car in review may be captured and sent to a database.

Still referring to FIG. 28, an individual may receive predicted driving information such as the need to slow to a specific speed based on turns, traffic, and hazards 2806. The mobile device/intelligent electronic devices/headset may be used to access an image or video stream several miles ahead so that a driver is aware of potential traffic. The driver may be personally imaged by inward facing cameras to track driver fatigue. The driver may also report other drivers such as potential drunk drivers to police, emergency services, or a crowd sourced database of suspected drivers. Major traffic violators may have a conditional driving license which allows for police or emergency to login remotely to the vehicle and control all the driving actions of the vehicle from a remote operations center. This remote control may be done programmatically by a computer or by a human on standby. The human in the remote center may see the entire view from the car on a display on a wall, mobile device, intelligent electronic glasses, or headset. Alternatively, a police car or aerial vehicle, such as a helicopter, plane, aerial vehicle, manned aerial vehicle, unmanned aerial vehicle (UAV) 2810 or drone may be sent to obtain information about the vehicle provided that the appropriate cities and municipalities have approved such usage. These rules may be stored in a network server.

Alternatively, an aerial vehicle may be used for electric vehicle wireless charging using induction, resonant magnetic coupling, or other means. In this case, the vehicle may be fitted with a wireless charging pad, battery, AC/DC, converter, controller, and other components and system. A UAV 2810 may fly slightly above the vehicle to allow for transfer of energy from the UAV 2810 to the vehicle using focused beams or transmitting pads. The UAV may use radar, lasers, or cameras to gauge speed or distances. This may allow for a driver to avoid stopping at an electric charging station. Alternatively, charging towers on the roadway may be used to charge the vehicle. A UAV 2810 may allow for package and mail delivery, restaurant, or fast food delivery to a stationary or moving vehicle through a sunroof or window. The UAV 2810 may use a plurality of cameras, wireless transmit and receive units, lasers, sensors, and remote displays for communication. The UAV 2810 may broadcast these images and videos to a traffic server. These UAV 2810 may also be used for elderly care or personal security by tracking and following specific individuals and further recording associated events. Alternatively, the UAV 2810 may be dispatched for managing logistics and inventory, delivering packages from a store to a home, following a friend, and searching for people in the area, signaling for help to authorities, and providing a actuated map of the area to a phone, watch, intelligent electronic glasses, headset or server. Multiple UAVs 2810, manned vehicles, self driving cars, ground based vehicles, may coordinate for lane changes, landings, or other activities with each other using a peer to peer connection or remote server.

Drivers in manned aerial vehicle including low-altitude aerial vehicles may also use the mobile device/intelligent electronic devices/headset for navigation signs, road markers, and lane markers. The line markers may controlled by a traffic server or central transportation server such that augmented and virtual road signs can be displayed in regions above the air. This may allow aerial vehicles to travel on freeways above land based vehicles. Various vehicles including manned aerial, unmanned aerial, self-driving, ground based vehicles may further contain a server coupled with wireless transmit and receive capabilities to notify and negotiate traffic, lane changes, and driving with other local cars.

Referring now to FIG. 29, advertisements on billboards may be modified based on the cars on the roadway or people walking on a street. Billboard 2901 may change its display based on the people around. These ads may be changed in real time using auctions, exchanges, and real time bidding advertising platforms. Alternatively, virtual billboards 2902 may be created and displayed on the car's windshield, individual's mobile device, intelligent electronic glasses, or headset. The virtual billboards 2902 may be animated and increase or decrease in magnification. The ads may be delivered by a server 2903. Other objects such as a traffic light 2904 may be annotated with information including time till the light changes and traffic conditions. These annotations may be sent in to the car, mobile device, glasses, or headset. Alternatively, an object such as a traffic light may broadcast a beacon of information. The traffic light 2904 itself may be in communication with a Internet, network, or Department of Transportation private server 2903. This traffic light may be able to receive remote software updates and maintenance from a server 2903. The traffic light may further be enabled with a wireless charging beam to allow for vehicle charging from the traffic light to an electric vehicle. The traffic light may be connected to a ground power supply and therefore be enabled to acquire power relatively cheaply. Drivers may pay additional fees to access these wireless charging networks.

Still referring to FIG. 29, various shops, hotels and restaurants may be augmented with annotations during the driving or walking experience. A house may appear with objects for sale or a sale price listing 2905. The data for the price of the house may come from an online real estate side or a real estate ad network 2903. A history associated with the individual may further be appended to the data. This data may comprise check-in data, GPS tracking information or other related data. Recommendations from friends and colleagues may additional be integrated into the augmented reality comments 2906.

For example, a location tracking server may capture the routes travelled by an individual and auto-checkin the individual to various stores. Alternatively, advertisers may bid on the routes 2907 for a specific or aggregate set of people based on time of day, demographics, or other factors. Various routes may be suggested to an individual by prediction software resident on a server that accounts for the drivers needs. For example, the driver may seek the shortest time, scenic route, likelihood of finding products/objects that they need to purchase, or ad supported monetization route. Advertisers may bid on these routes. Alternatively, a driver may make money by choosing an ad supported monetization route over a non ad supported route. An ad supported route may take a person through an up and coming district of shops. Traffic and maps servers and data may be used to assist in the routing.

Referring now to FIG. 30, an individual need not wear a camera, mobile device, intelligent electronic glasses, or headset to be imaged. An array of stationary or mobile cameras may operate as part of an image network continuously imaging people and collecting audio data with a microphone. These cameras may capture people's body, face, or retina or eyes 3001. The cameras may be in stores, cafes, malls, roadways, home, office and other locations. Each camera may be addressable with a unique IP address. The cameras may send acquired image and video content to a central server for processing and recognition. Other data sources including social networks may be used for facial recognition. The camera network may be used for a variety of purposes including tracking missing people, delivering targeted advertisements 3002, or providing directions to a person. The advertisements 3002 may be physical changes to a display for a person not wearing a display or virtual changes to a display for a person wearing a display. A second camera in the camera network may track whether a person actual saw a given advertisement to improve reporting and ad targeting. Various privacy settings may further be enabled and individuals may be able to opt-in or out of the network in return for certain promotions and benefits. As an example, a person who has opts in to the network may receive daily deals or targeted personalized offers 3002. Alternatively, the camera networks may be equipped with wireless power charging stations and allow individuals to charge devices. Larger cameras may also be placed on top of vehicles or on roadways to target drivers in a car.

Referring to FIG. 31, a stationary or mobile eye examination scanner 3101 may be used to appropriately provide glasses, frames, and lenses to an individual. Software on a mobile device in addition to a camera may be used to image a person. This data may be sent to a private cloud server for an optometrist or doctor to review. The optometrist may then send data to an eCommerce website 3103 so that a person may purchase prescription intelligent electronic glasses or headsets personalized to the individual. Alternatively, a person who does not need a prescription may image his or herself using the mobile scanner 3101 and have the data sent directly to the eCommerce website or mobile application 3103. The eCommerce site may suggest and personalize frames and lens to the preferences and desires for the user. A person may view his or herself with a super imposed image of a pair of glasses on their face. A crowd or set of specialists may vote on which frame looks the best on a superimposed image of the person. The person may purchase the product and have it shipped directly to their current address using a new or stored credit card. Shipping may be done by traditional shippers, self-driving vehicles, UAVs 2810 focused on different distances such as last mile delivery, or people. A server that tracks the routes of people may be able to find the best person to deliver a product from a store to a person. People can agree to be personal shippers in this network. A server can assign shipments to people based on their travel routes. For example, a person that drives by a store on the way home from work may agree to deliver products for that store to neighbors in the person's zipcode or neighborhood social network. People and purchasers may pay for shipment using a payment network or digital wallet. This same payment system may be associated with a person's glasses such that credit card information is stored on a server to enable shopping with their glasses.

Referring to FIG. 32, shows an alternative version of the headset fashioned as a headband 3200. The headband has a hinged display, flash, microphone, speaker, and camera. This headband may be more appropriate for athletes or bikers.

Referring now to FIG. 33, a variety of fashion items including a necklace or medallion 3301, earrings, ring, or belt may be fitted with micro-cameras, antennas, wireless transmit and receive radios, battery, and memory to aid in acquiring information about the environment. Other devices may have GPS monitors or accelerometers. These devices may work together and stream data to a mobile device, glasses, or a remote server. Each device may broadcast their capabilities including megapixels for the camera, camera orientation, storage capacity, battery life, and processing power. A mobile device may prioritize the various devices for collecting inputs.

It is anticipated that the various components disclosed herein including cameras, displays, sensors, wireless T/R may be integrated into a variety of devices and environments. The disclosure herein has applicability to a variety of contexts including travel, transportation, shopping, auctions, banking, emergency services, visually impaired, crowdsourcing, peer to peer communication, video and audio conferencing, education and learning, negotiations and auditing, sports, news, and other domains.

The foregoing descriptions of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed:

1. A wearable device comprising:
one or more image acquisition devices configured to capture a set of one or more images including a video;
one or more microphones to capture an audio;
one or more processors;
a wireless transmit and receive unit;

a conferencing module to enable the wearable device to communicate the one or more images and the audio to a remote device and a second wearable device as part of a multiparty conference;

further a display to show in a field of view of the wearable device one or more received images communicated to the wearable device from the remote device;

wherein the remote device is enabled to view from the vantage point of the wearable device;

wherein the remote device is enabled to simultaneously view from the vantage point of the second wearable device; and wherein the wearable device is enabled to view from the vantage point of the second wearable device.

2. The wearable device of claim 1, further comprising placing in the field of view of the wearable device a video of a person received from the remote device.

3. The wearable device of claim 2, further comprising an eye tracker configured to monitor one or more eyes of a user of the wearable device.

4. The wearable device of claim 3, further displaying in the field of the view of the wearable device a virtual keyboard.

5. The wearable device of claim 4, further configured to receive audio commands from a user.

6. The wearable device of claim 5, wherein the one or more image acquisition devices are further configured to track one or more gestures of a user to determine interactions with a displayed virtual image.

7. The wearable device of claim 1, wherein the one or more image acquisition devices are configured to capture the face of a user of an inside of the wearable device; and wherein the one or more image acquisition devices are configured to acquire the field of view of the wearable device on the outside side.

8. The wearable device of claim 7, wherein the one or more processors are further configured to generate a three-dimensional view of a virtual object using a set of images.

9. The wearable device of claim 8, wherein the one or more image acquisition devices is further configured to assist with detecting a user's interactions with the virtual object.

10. The wearable device of claim 9, wherein the user's interactions with a physical object results in historical information being shown on the one or more displays.

11. The wearable device of claim 10, wherein a social network data is displayed corresponding to a detected person.

12. A non-transitory computer readable storage medium that stores a set of instructions that are executable by at least one processor of a wearable device to cause the wearable device to perform a method comprising:

acquiring a set of one or more images;

capturing an audio using one or more microphones;

communicating the set of one or more images and the audio to a remote device and a second wearable device as part of a multiparty conference;

displaying in a field of view of the wearable device one or more received images as received from the remote device;

wherein the remote device is enabled to view the environment from the vantage point of the wearable device;

wherein the remote device is enabled to simultaneously view from the vantage point of the second wearable device; and wherein the wearable device is enabled to view from the vantage point of the second wearable device.

13. The non-transitory computer-readable storage medium of claim 12, wherein displaying the one or more received images includes:

placing in the field of view of the wearable device a video of a person received from the remote device.

14. The non-transitory computer-readable storage medium of claim 13, wherein displaying the one or more received images includes:

displaying an annotation in association with an object in the field of view of the wearable device.

15. The non-transitory computer-readable storage medium of claim 14, wherein the set of instructions that are executable by the at least one processor of wearable device to cause the wearable device to further perform:

acquire information to detect an object in the field of view of the wearable device.

16. The non-transitory computer-readable storage medium of claim 15, the one or more received comprising overlaying the one or more received image within the vicinity of a detected object entity in the field of view.

17. A method performed by a smart glasses device having one or more processors and one or more cameras, the method comprising:

capturing a set of one or more images of an environment;

capturing an audio using one or more microphones;

communicating the set of one or more images and the audio to a remote device and a second wearable device as part of a multiparty conference;

displaying in a field of view of the smart glasses device one or more received images as received from the remote device;

wherein the remote device is enabled to view from the vantage point of the smart glasses device;

wherein the remote device is enabled to simultaneously view from the vantage point of the second wearable device; and wherein the smart glasses device is enabled to view from the vantage point of the second wearable device.

18. The method of claim 17, wherein displaying one or more received images includes displaying information regarding the one or more image entities for overlaying the one or more image entities within the vicinity of a detected object entity in the field of view.

19. The method of claim 18, further wherein a plurality of virtual objects are enabled to be placed within the smart glasses device.

20. The method of claim 19, wherein the plurality of objects are created by a first user of the smart glasses device to be viewable by a second user of a second wireless device.

* * * * *